United States Patent
Ogawa et al.

(10) Patent No.: US 9,938,463 B2
(45) Date of Patent: Apr. 10, 2018

(54) LIQUID CRYSTAL COMPOSITION AND LIQUID CRYSTAL DISPLAY DEVICE USING THE SAME

(71) Applicant: DIC CORPORATION, Tokyo (JP)

(72) Inventors: Shinji Ogawa, Saitama (JP); Yoshinori Iwashita, Saitama (JP); Joji Kawamura, Saitama (JP); Makoto Negishi, Saitama (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/384,317

(22) PCT Filed: Mar. 26, 2013

(86) PCT No.: PCT/JP2013/058810
§ 371 (c)(1),
(2) Date: Sep. 10, 2014

(87) PCT Pub. No.: WO2014/155531
PCT Pub. Date: Oct. 2, 2014

(65) Prior Publication Data
US 2016/0075946 A1    Mar. 17, 2016

(51) Int. Cl.
*C09K 19/30* (2006.01)
*C09K 19/44* (2006.01)
*C09K 19/54* (2006.01)
*C09K 19/12* (2006.01)
*G02F 1/00* (2006.01)

(52) U.S. Cl.
CPC .......... *C09K 19/3003* (2013.01); *C09K 19/44* (2013.01); *C09K 19/542* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/548* (2013.01); *G02F 1/0045* (2013.01)

(58) Field of Classification Search
CPC .. C09K 19/3003; C09K 19/44; C09K 19/542; C09K 2019/123; C09K 2019/3009; C09K 2019/301; C09K 2019/3027; C09K 2019/3004; C09K 2019/3016; C09K 2019/548; G02F 1/1333; G02F 1/0045

USPC ............. 252/299.01, 299.6, 299.63; 428/1.1
See application file for complete search history.

(56) References Cited

U.S. PATENT DOCUMENTS

| | | | | |
|---|---|---|---|---|
| 7,351,453 B2* | 4/2008 | Ichinose | ................ | C09K 19/12 252/299.63 |
| 8,906,472 B2* | 12/2014 | Kuriyama | ............ | C09K 19/062 252/299.5 |
| 2006/0115606 A1 | 6/2006 | Ichinose et al. | | |
| 2006/0263544 A1 | 11/2006 | Klasen-Memmer et al. | | |
| 2008/0291347 A1 | 11/2008 | Kim et al. | | |
| 2011/0193020 A1 | 8/2011 | Klasen-Memmer et al. | | |
| 2012/0305843 A1 | 12/2012 | Klasen-memmer et al. | | |
| 2013/0183460 A1* | 7/2013 | Klasen-Memmer . | | C09K 19/062 428/1.4 |

FOREIGN PATENT DOCUMENTS

| | | |
|---|---|---|
| JP | 2006-169518 A | 6/2006 |
| JP | 2006-328395 A | 12/2006 |
| JP | 2008-144135 A | 6/2008 |
| JP | 2008-202049 A | 9/2008 |
| JP | 2010-535910 A | 11/2010 |
| JP | 2012-513483 A | 6/2012 |
| WO | 2011/098224 A1 | 8/2011 |

OTHER PUBLICATIONS

International Search Report of PCT/JP2013/058810, dated Jun. 18, 2013, w/English translation.

* cited by examiner

*Primary Examiner* — Geraldina Visconti
(74) *Attorney, Agent, or Firm* — Westerman, Hattori, Daniels & Adrian, LLP

(57) ABSTRACT

There is provided a liquid crystal display device that uses such a liquid crystal composition is also provided. Provided is a liquid crystal composition that includes a first component which is at least one selected from the group consisting of compounds represented by general formula (1) and a second component which is at least one component selected from the group consisting of compounds represented by general formula (2). Also provided is a liquid crystal display device that uses a liquid crystal composition that contains the first component and the second component.

9 Claims, 2 Drawing Sheets

US 9,938,463 B2

LIQUID CRYSTAL COMPOSITION AND LIQUID CRYSTAL DISPLAY DEVICE USING THE SAME

TECHNICAL FIELD

The present invention relates to a liquid crystal composition and a liquid crystal display device that uses the liquid crystal composition.

BACKGROUND ART

Liquid crystal display devices are being used in watches, calculators, various measurement instruments, automobile panels, word processors, electronic organizers, printers, computers, televisions, clocks, advertising boards, etc. Typical examples of the liquid crystal display mode include TN (twisted nematic) mode, STN (super twisted nematic) mode, and VA (hereinafter may be referred to as vertical alignment) mode and IPS (in-plane switching) mode that use TFTs (thin film transistors). Liquid crystal compositions that are used in these liquid crystal display devices are required to be stable against external factors such as moisture, air, heat, and light, stay in a liquid crystal phase in a temperature range as wide as possible about room temperature, exhibit low viscosity, and operate at a low drive voltage. A liquid crystal composition is constituted by several to dozens of compounds in order to optimize dielectric anisotropy ($\Delta\varepsilon$), refractive index anisotropy ($\Delta n$), and other physical properties for individual display devices.

For example, in VA-mode displays widely used in liquid crystal televisions and the like, liquid crystal compositions having a negative $\Delta\varepsilon$ are typically used. In TN-mode displays used in PC monitors and the like and IPS-mode displays widely used in touch panels and the like, liquid crystal compositions mainly having a positive $\Delta\varepsilon$ are typically used. Naturally, in displays of all drive modes including these IPS and VA modes, a liquid crystal composition that enables a low-voltage drive, high-speed response, and a wide operation temperature range is sought after. In order to meet these needs, a liquid crystal composition that has $\Delta\varepsilon$ with a high absolute value, a low viscosity ($\eta$), and a high nematic phase-isotropic liquid phase transition temperature (Tni) is required.

Moreover, because of the setting of $\Delta n \times d$, which is the product of $\Delta n$ and a cell gap (d), the $\Delta n$ of the liquid crystal composition needs to be adjusted to be within a range appropriate for the cell gap. In addition, when a liquid crystal display device is applied to a television or the like, high response speed is important and thus a liquid crystal composition with a low $\gamma 1$ is required. Currently, high response speed is achieved by adding a dielectrically neutral compound with a relatively low molecular weight to a liquid crystal composition so as to decrease the viscosity of the entire liquid crystal composition.

However, PTL 1 discloses that a dielectrically neutral compound added to ensure high speed response is a cause of an image ghosting phenomenon (also called burn-in phenomenon and covers linear afterimages and planar afterimages) in televisions (refer to paragraphs 0020 and 0021 in PTL 1). In other words, according to PTL 1, because a problem of image fixing occurs due to an interaction between an alignment layer and a liquid crystal composition containing a neutral alkenyl compound, a bicyclohexyl-(benzene) skeleton (refer to formula (I) in PTL 1) having alkyl groups at two ends is used as an essential component of the liquid crystal composition to eliminate or significantly reduce image fixing after long hours of operation, thereby resolving this problem.

Another technologies of suppressing or preventing ghosting in a system that contains a dielectrically neutral compound is disclosed in PTL 2. PTL 2 discloses a composition that contains, as essential components, a neutral compound that does not show dielectric anisotropy and a fluorine-containing compound (refer to general formula (I) in PTL 2) having a skeleton in which a benzopyran ring and a cyclohexane ring are bonded to each other via an ether bond. According to PTL 2, the content of the fluorine-containing compound having one cyclohexyl ring is limited or the content of a neutral compound having alkenyl groups as terminal groups is limited so as to reduce the reaction between a liquid crystal composition and ion impurities.

CITATION LIST

Patent Literature

PTL 1: Japanese Unexamined Patent Application Publication (Translation of PCT Application) No. 2012-513483
PTL 2: Japanese Unexamined Patent Application Publication No. 2008-144135

SUMMARY OF INVENTION

Technical Problem

Both of the technologies disclosed in PTL 1 and PTL 2 address the problem of image ghosting and afterimage by limiting the content and type of a neutral compound having alkenyl groups as terminal groups when adding a dielectrically neutral compound to a liquid crystal composition. In particular, when a large amount of ion impurities are contained in a liquid crystal layer, the ion impurities that have migrated along a plane are likely to converge onto a particular site such as a boundary with an electric field-generating electrode and this site with a high ion impurity concentration is observed as an afterimage from outside, which is a problem that PTL 2 resolves. According to the invention set forth in PTL 2, not only the content of the fluorine-containing compound having one cyclohexane ring relative to the entire liquid crystal composition but also the content of a neutral compound having alkenyl groups as the terminal groups is limited, and, as a result, the liquid crystal composition according to PTL 2 did not cause emergence of linear afterimage even after about 2400 hours (PTL 2, paragraphs 0041 and 0052 to 0054).

PTL 1 provides no experimental data related to ghosting such as linear afterimage. However, in paragraphs 0020 to 0023 in PTL 1, examples of a neutral compound having alkenyl groups as terminal groups are listed as examples of the compounds with which the reliability problem such as burn-in is frequent despite short response time. Moreover, Experimental Examples in PTL 1 disclose a composition that contains, as an essential component, 26 to 46% of a bicyclohexyl-(benzene) compound in which alkyl groups are bonded to two ends. This component is also contained in the liquid crystal composition described in PTL 1 where the component is indicated as (3) or (5).

However, when a bicyclohexyl-(benzene) compound in which alkyl groups are bonded to two ends is added to a liquid crystal composition as in PTL 1 and PTL 2, the low-temperature storage is degraded and it has been confirmed that a new problem arises in which the bicyclohexyl-(benzene) compound becomes evaporated.

The "low-temperature storage property" referred here is the length of time for which a liquid crystal composition or a liquid crystal compound maintains a nematic phase under low-temperature conditions near the solid-liquid crystal phase transition temperature and is an indicator of how long the composition or compound retains a nematic phase. For example, the low-temperature storage property can be examined by confirming absence of solid or crystalline precipitates by using a microscope or by measuring absorbance.

In general, a liquid crystal composition is a mixture of plural liquid crystal compounds as described above. The respective liquid crystal compounds in a standard ambient temperature and pressure (SATP) are not necessarily in a liquid crystal phase. Some liquid crystal compound exhibits a liquid crystal phase due to a decrease in freezing point when mixed with another liquid crystal compound. Accordingly, there are liquid crystal compositions that narrowly retain a nematic phase due to supercoiling at a low-temperature range near the crystal-to-nematic phase transition temperature. When such a liquid crystal composition is left standing in a low-temperature atmosphere near the crystal-to-nematic phase transition temperature, solids and crystals precipitate and a smectic phase emerges, thereby causing a low-temperature storage property problem which makes the liquid crystal composition unsuitable for use in liquid crystal display devices.

An object of the preset invention is to address the low-temperature storage problem described above and/or to decrease the volatility of the bicyclohexyl-(benzene) skeleton.

The inventors of the present invention have conducted extensive researches to resolve the problem described above. They have found that the problem of low-temperature storage can be resolved by using a liquid crystal composition of general formula (1) and general formula (2) and made the invention.

That is, a liquid crystal composition according to the present invention contains a first component which is at least one selected from the group consisting of compounds represented by general formula (1):

[Chem. 1]

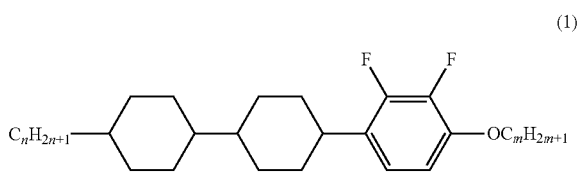

(1)

(In general formula (1), n and m each independently represent a positive integer that satisfies n≤m); and a second component which is at least one selected from the group consisting of compounds represented by general formula (2):

[Chem. 2]

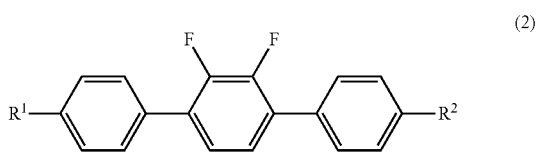

(2)

(In general formula (2), $R^1$ and $R^2$ each independently represent an alkyl group having 1 to 15 carbon atoms).

DESCRIPTION OF EMBODIMENTS

Figure 1:
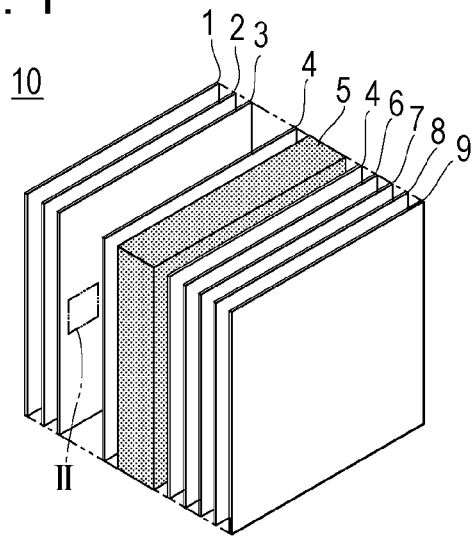
FIG. 1 is a drawing schematically illustrating a structure of a liquid crystal display device.

A first aspect of the present invention provides a liquid crystal composition containing a first component which is at least one selected from the group consisting of compounds represented by general formula (1):

[Chem. 3]

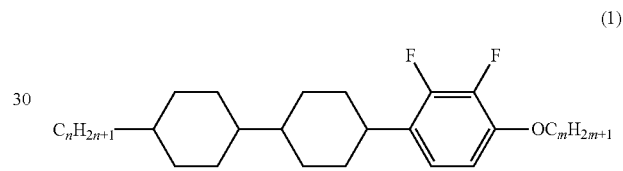

(1)

(In general formula (1), n and m each independently represent a positive integer that satisfies n≤m); and a second component which is at least one selected from the group consisting of compounds represented by general formula (2):

[Chem. 4]

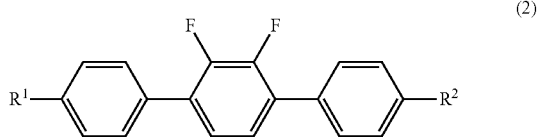

(2)

(In general formula (2), $R^1$ and $R^2$ each independently represent an alkyl group having 1 to 15 carbon atoms).

The low-temperature storage is improved when the liquid crystal composition according to the present invention contains general formula (1) and general formula (2) described above. Typically, a highly symmetric molecule tends to have high crystallinity and low solubility. Accordingly, when the alkyl groups at the two termini of the liquid crystal molecule represented by general formula (1) satisfy the condition n≤m, the compound represented by formula (1) comes to have a larger molecular weight at the benzene ring-side portion from its center and becomes asymmetrical (or the position of the center of gravity of the molecule is shifted toward the benzene ring side), resulting in lower crystallinity. In contrast, the center skeleton of the compound represented by general formula (2) has a structure constituted by benzene rings linked to one another and the center skeleton has high symmetry irrespective of the terminal structure of the general formula (2); thus this compound has a high tendency to crystallize. Accordingly, it is believed that when the symmetry of general formula (1) is appropriately decreased, crystallization of the compound represented by general formula (2) is suppressed and the solubility of the liquid crystal composition can be improved. If symmetry is excessively impaired (n<<m), there is a risk that crystallinity would no longer be exhibited. Accordingly, in general formula (1), the difference between m and n (m−n) is preferably 0 to 5, more preferably 0 to 3, yet more preferably 0 to 2, and most preferably 0 to 1.

If the difference between m and n is excessively large (for example, if the difference between m and n is more than 5), symmetry is excessively lowered and not only crystallinity but also liquid crystallinity is impaired. As a result, the compound turns into a mere liquid and the temperature at which the liquid crystal phase appears is likely to be significantly lowered.

The liquid crystal composition according to the present invention contains a first component represented by general formula (1) and a second component represented by general formula (2) as essential components. If needed, the liquid crystal composition according to the present invention may further contain at least one selected from the group consisting of a third component, a fourth component, a fifth component, a sixth component, a seventh component, and any other component such as a polymerizable monomer and an additive. To be more specific, a liquid crystal composition according to the present invention contains the compounds represented by general formula (1) and general formula (2) as essential components and, if needed, can contain at least one selected from the group consisting of compounds represented by general formula (3) to general formula (6), general formula (VII-A), and general formula (VII-B).

The lower limit of the total content of the compounds that exhibit liquid crystallinity represented by general formula (1), general formula (2), general formula (3) to general formula (6), general formula (VII-A), and general formula (VII-B) in the liquid crystal composition is preferably 60% by mass, preferably 65% by mass, preferably 70% by mass, preferably 75% by mass, preferably 80% by mass, preferably 85% by mass, preferably 90% by mass, preferably 92% by mass, preferably 95% by mass, preferably 98% by mass, and preferably 99% by mass. The upper limit is preferably 100% by mass and more preferably 99.5% by mass.

Accordingly, the content of the additive (antioxidant, UV absorber, or the like) in the liquid crystal composition of the present invention is preferably 100 ppm to 1% by mass. The content of a polymerizable monomer in the liquid crystal composition of the present invention is preferably 500 ppm to 10% by mass.

The value of the dielectric anisotropy $\Delta\epsilon$ of the liquid crystal composition according to the present invention at 25° C. is preferably −2.0 to −6.0, more preferably −2.5 to −5.0, and most preferably −2.5 to −4.0. To be more specific, the value of the dielectric anisotropy $\Delta\epsilon$ is preferably within the range of −2.5 to −3.4 from the viewpoint of response speed.

The refractive index anisotropy $\Delta n$ of the liquid crystal composition according to the present invention at 25° C. is preferably 0.08 to 0.13 and more preferably 0.09 to 0.12. To be more specific, in order to comply with a small cell gap (a cell gap of 3.4 μm or less), the value is preferably about 0.9 to about 0.12. In order to comply with a large cell gap (a cell gap of 3.5 μm or more), the value is preferably about 0.08 to about 0.1.

The upper limit of the rotational viscosity ($\gamma_1$) of the liquid crystal composition according to the present invention is preferably 150 (mPa·s) or less, more preferably 130 (mPa·s) or less, and most preferably 120 (mPa·s) or less. The lower limit of the rotational viscosity ($\gamma_1$) is preferably 20 (mPa·s) or more, more preferably 30 (mPa·s) or more, more preferably 40 (mPa·s) or more, more preferably 50 (mPa·s) or more, more preferably 60 (mPa·s) or more, and most preferably 70 (mPa·s) or more.

Z, which is a function of the rotational viscosity and refractive index anisotropy of the liquid crystal composition according to the present invention is preferably a particular value.

$$Z=\gamma 1/(\Delta n)^2 \qquad \text{[Math. 1]}$$

(In the mathematical formula above, $\gamma_1$ represents a rotational viscosity and $\Delta n$ represents a refractive index anisotropy.)

Z is preferably 13000 or less, more preferably 12000 or less, and most preferably 11000 or less.

When the liquid crystal composition of the present invention is to be used in an active matrix display device, a resistivity of $10^{11}$ (Ω·m) or more is needed. The resistivity is more preferably $10^{12}$ (Ω·m) and most preferably $10^{13}$ (Ω·m) or more.

The nematic phase-isotropic liquid phase transition temperature ($T_{NI}$) of the liquid crystal composition according to the present invention has a wide range. The phase transition temperature ($T_{NI}$) is preferably 60 to 120° C., more preferably 70 to 110° C., and most preferably 75 to 100° C.

The components that may be contained in the liquid crystal composition of the present invention will now be described in detail.

The liquid crystal composition according to the present invention contains a first component represented by general formula (1) as an essential component. The first component represented by general formula (1) is described below.

The first component of the present invention is a compound represented by general formula (1) below:

[Chem. 5]

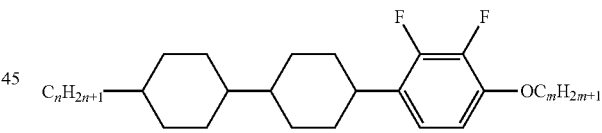

(1)

(In general formula (1), n and m each independently represent a positive integer that satisfies n≤m.)

When a compound represented by general formula (1) is contained as the first component, a liquid crystal composition that satisfies low-temperature solubility, high transition point, and appropriate $\Delta\epsilon$ and $\Delta n$ can be provided.

In general formula (1), n is preferably an integer of 1 or more and 7 or less, more preferably an integer of 2 or more and 6 or less, yet more preferably an integer of 2 or more and 5 or less, and most preferably an integer of 2 or more and 4 or less.

In general formula (1), m is preferably an integer of 1 or more and 6 or less, more preferably an integer of 2 or more and 6 or less, yet more preferably an integer of 2 or more and 5 or less, and most preferably an integer of 2 or more and 4 or less.

Preferably, n is an integer of 1 or more and 5 or less, m is an integer of 1 or more and 5 or less, and the condition n≤m is satisfied because the position of the center of gravity of the liquid crystal molecule is shifted, the crystallinity is lowered, and the solubility is enhanced.

In general formula (1), the alkyl groups represented by $C_nH_{2n+1}-$ and $C_mH_{2m+1}-$ are preferably linear or branched and more preferably linear.

The content of the first component in the liquid crystal composition according to the present invention is appropriately selected not only in relation to the operational mode and purpose of use of the liquid crystal composition but also in relation to other components; thus, the preferable range of the first component content in the liquid crystal composition is preferably independent from one embodiment to another. The lower limit of the first component content in the liquid crystal composition according to the present invention relative to the total amount (100% by mass) of the liquid crystal composition of the present invention is, for example, 1% by mass in one embodiment of the present invention. The lower limit is 5% by mass in another embodiment of the present invention. The lower limit is 10% by mass in another embodiment of the present invention, 20% by mass in another embodiment of the present invention, 30% by mass in another embodiment of the present invention, 40% by mass in another embodiment of the present invention, 50% by mass in another embodiment of the present invention, 55% by mass in another embodiment of the present invention, 60% by mass in another embodiment of the present invention, 65% by mass in another embodiment of the present invention, 70% by mass in another embodiment of the present invention, 75% by mass in another embodiment, and 80% by mass in another embodiment of the present invention.

The upper limit of the first component content in the liquid crystal composition according to the present invention relative to the total amount of the liquid crystal composition of the present invention is for example, 95% by mass in an embodiment of the present invention, 85% by mass in another embodiment of the present invention, 75% by mass in another embodiment of the present invention, 65% by mass in another embodiment of the present invention, 55% by mass in another embodiment of the present invention, 45% by mass in another embodiment of the present invention, 35% by mass in another embodiment of the present invention, and 25% by mass in another embodiment of the present invention.

The content of the compound represented by general formula (1) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the first component of the present invention, the number of compounds represented by general formula (1) used in combination is not particularly limited and an appropriate combination is selected based on desired properties such as low-temperature solubility, transition temperature, electrical reliability, and birefringence. As for the number of compounds represented by general formula (1) used as the first component, for example, one compound represented by general formula (1) is used as the first component in one embodiment of the present invention. Alternatively, two compounds represented by general formula (1) are used as the first component in another embodiment of the present invention. Alternatively, three compounds represented by general formula (1) are used as the first component in another embodiment of the present invention. Alternatively, four compounds represented by general formula (1) are used as the first component in another embodiment of the present invention. Alternatively, five compounds represented by general formula (1) are used as the first component in another embodiment of the present invention. Alternatively, six compounds represented by general formula (1) are used as the first component in another embodiment of the present invention. Alternatively, seven compounds represented by general formula (1) are used as the first component in another embodiment of the present invention. Alternatively, eight compounds represented by general formula (1) are used as the first component in another embodiment of the present invention. Alternatively, nine compounds represented by general formula (1) are used as the first component in another embodiment of the present invention. Alternatively, ten or more compounds represented by general formula (1) are used as the first component in another embodiment of the present invention.

The lower limit of the dielectric anisotropy ($\Delta\in$) of the compound represented by general formula (1) according to the present invention is −10 in one embodiment, −8 in another embodiment, −6 in another embodiment, −12 in another embodiment, −14 in another embodiment, and −4 in another embodiment. The upper limit of the dielectric anisotropy ($\Delta\in$) of the liquid crystal composition containing the compound represented by general formula (1) is 0 in one embodiment, +1 in another embodiment, −1 in another embodiment, −2 in another embodiment, 2 in another embodiment, and −0.5 in another embodiment.

A preferable embodiment of the first component of the present invention is a mixture of one to three different compounds selected from compounds represented by general formula (1) above (in general formula (1), n and m each independently represent an integer of 2 to 5 and n≤m). The mass ratio of the whole first component of the present invention relative to the entire liquid crystal composition is particularly preferably more than 7% by mass and 18% by mass or less.

The compounds represented by general formula (1) according to the present invention are preferably compounds represented by formulae (1.1) to (1.12) below:

[Chem. 6]

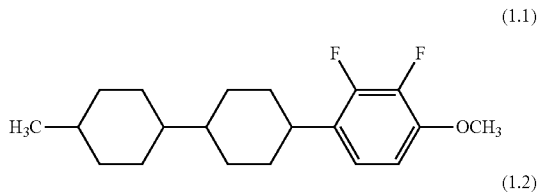

(1.1)

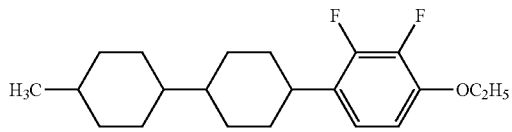

(1.2)

-continued (1.3)
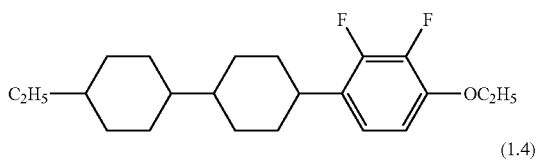

(1.4)
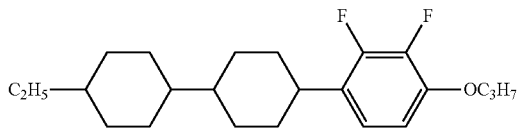

(1.5)
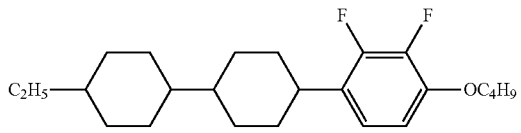

(1.6)
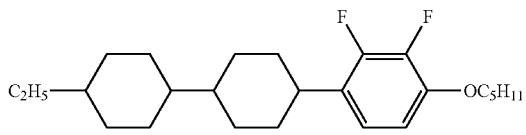

(1.7)
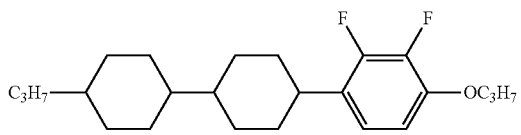

(1.8)
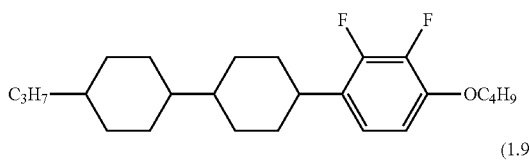

(1.9)
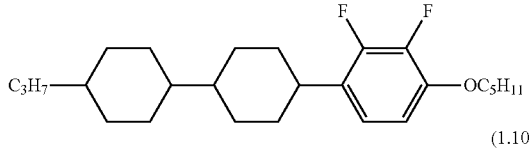

(1.10)
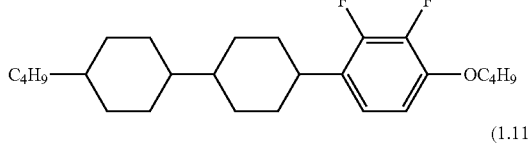

(1.11)
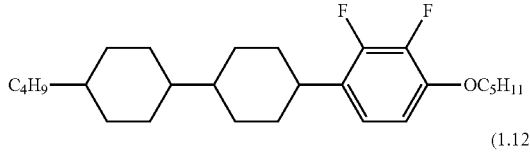

(1.12)
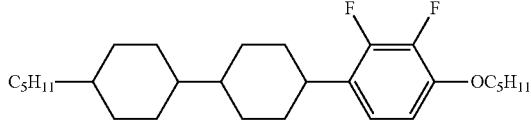

At least one selected from the group consisting of compounds represented by (1.3) to (1.11) is more preferable.

The liquid crystal composition according to the present invention contains a second component represented by general formula (2) as an essential component. The second component represented by general formula (2) will now be described.

The second component according to the present invention is a compound represented by general formula (2):

[Chem. 7]

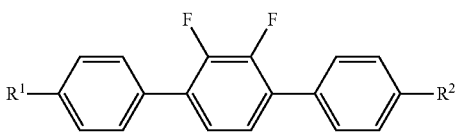

(2)

(In general formula (2), $R^1$ and $R^2$ each independently represent an alkyl group having 1 to 15 carbon atoms.)

When a compound represented by general formula (2) is contained as the second component, a liquid crystal composition having a high Δn and an appropriate Δ∈ can be provided.

The alkyl group is preferably a linear or branched alkyl group and more preferably a linear alkyl group. In general formula (2), $R^1$ and $R^2$ each independently represent an alkyl group having 1 to 15 carbon atoms, preferably an alkyl group having 1 to 6 carbon atoms, and more preferably an alkyl group having 2 to 5 carbon atoms.

The compound represented by general formula (2) according to the present invention preferably has $R^1$ representing an alkyl group having 3 carbon atoms and $R^2$ representing an alkyl group having 1 to 3 carbon atoms, more preferably has $R^1$ representing an alkyl group having 4 carbon atoms and $R^2$ representing an alkyl group having 1 to 3 carbon atoms, and most preferably has $R^1$ representing an alkyl group having 5 carbon atoms and $R^2$ representing an alkyl group having 1 to 3 carbon atoms.

Examples of "an alkyl group having 1 to 15 carbon atoms" according to the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, and a pentadecyl group. In this specification, examples of the alkyl group are common and an appropriate alkyl group is selected from these examples in accordance with the number carbon atoms in the alkyl groups.

The content of the second component in the liquid crystal composition according to the present invention is appropriately selected not only in relation to the operational mode and purpose of use of the liquid crystal composition but also in relation to other components; thus, the preferable range of the second component content in the liquid crystal composition is preferably independent from one embodiment to another. The lower limit of the second component content in the liquid crystal composition according to the present invention relative to the total amount (100% by mass) of the liquid crystal composition of the present invention is, for example, 1% by mass in one embodiment, 10% by mass in another embodiment of the present invention, 20% by mass in another embodiment of the present invention, 30% by mass in another embodiment of the present invention, 40% by mass in another embodiment of the present invention, 50% by mass in another embodiment of the present invention, 55% by mass in another embodiment of the present invention, 60% by mass in another embodiment of the present invention, 65% by mass in another embodiment of the present invention, 70% by mass in another embodiment of the present invention, 75% by mass in another embodiment of the present invention, and 80% by mass in another embodiment of the present invention.

The upper limit of the second component content in the liquid crystal composition according to the present invention relative to the total amount of the liquid crystal composition of the present invention is, for example, 95% by mass in one embodiment of the present invention, 85% by mass in another embodiment of the present invention, 75% by mass in another embodiment of the present invention, 65% by mass in another embodiment of the present invention, 55% by mass in another embodiment of the present invention, 45% by mass in another embodiment of the present invention, 35% by mass in another embodiment of the present invention, and 25% by mass in another embodiment of the present invention.

The content of the compound represented by general formula (2) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the second component of the present invention, the number of compounds represented by general formula (2) used in combination is not particularly limited and an appropriate combination is selected based on desired properties such as low-temperature solubility, transition temperature, electrical reliability, and birefringence. As for the number of compounds represented by general formula (2) used as the second component, for example, one compound represented by general formula (2) is used as the second component in one embodiment. Alternatively, two compounds represented by general formula (2) are used as the second component in another embodiment of the present invention. Alternatively, three compounds represented by general formula (2) are used as the second component in another embodiment of the present invention. Alternatively, four compounds represented by general formula (2) are used as the second component in another embodiment of the present invention. Alternatively, five compounds represented by general formula (2) are used as the second component in another embodiment of the present invention. Alternatively, six compounds represented by general formula (2) are used as the second component in another embodiment of the present invention. Alternatively, seven compounds represented by general formula (2) are used as the second component in another embodiment of the present invention. Alternatively, eight compounds represented by general formula (2) are used as the second component in another embodiment of the present invention. Alternatively, nine compounds represented by general formula (2) are used as the second component in another embodiment of the present invention. Alternatively, ten or more compounds represented by general formula (2) are used as the second component in another embodiment of the present invention.

The lower limit of the dielectric anisotropy (Δ∈) of the compound represented by general formula (2) according to the present invention is −4 in one embodiment, −3 in another embodiment, −2.5 in another embodiment, and −2 in another embodiment. The upper limit of the dielectric anisotropy (Δ∈) of the liquid crystal composition containing a compound represented by general formula (1) is 1 in one embodiment, 0 in another embodiment, −0/5 in another embodiment, −1 in another embodiment, and −1.5 in another embodiment.

A preferable embodiment of the second component of the present invention is a mixture of one to three different compounds selected from compounds represented by general formula (2) above (in general formula (2), $R^1$ and $R^2$ independently respectively represent a linear alkyl group having 2 to 5 carbon atoms and a linear alkyl group having 1 to 3 carbon atoms). The mass ratio of the whole second component of the present invention relative to the entire liquid crystal composition is particularly preferably 5 to 13% by mass when only one compound represented by general formula (2) is contained, particularly preferably 5 to 16% by mass relative to the entire liquid crystal composition when two compounds represented by general formula (2) are contained, and particularly preferably 5 to 20% by mass relative to the entire liquid crystal composition when three compounds represented by general formula (2) are contained.

The liquid crystal composition according to the present invention preferably contains at least one selected from the group consisting of compounds represented by general formula (3) below as a third component:

[Chem. 8]

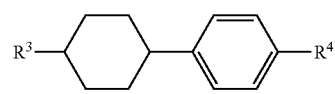

(3)

(In general formula (3), $R^3$ and $R^4$ each independently represent one group selected from the group consisting of an alkyl group having 1 to 15 carbon atoms, an alkenyl group having 2 to 15 carbon atoms, and an alkoxy group having 1 to 15 carbon atoms.)

In general formula (3), $R^3$ is preferably a group selected from the group consisting of an alkyl group having 1 to 15 carbon atoms, an alkenyl group having 2 to 15 carbon atoms, and an alkoxy group having 1 to 15 carbon atoms, more preferably a group selected from the group consisting of an alkyl group having 1 to 15 carbon atoms and an alkenyl group having 2 to 15 carbon atoms, yet more preferably a group selected from the group consisting of an alkyl group having 1 to 12 carbon atoms and an alkenyl group having 2 to 12 carbon atoms, yet more preferably an alkyl group having 1 to 10 carbon atoms, and most preferably an alkyl group having 2 to 5 carbon atoms.

In general formula (3), $R^4$ preferably represents a group selected from the group consisting of an alkyl group having 1 to 15 carbon atoms, an alkenyl group having 2 to 15 carbon atoms, and an alkoxy group having 1 to 15 carbon atoms, preferably represents a group selected from the group consisting of an alkyl group having 1 to 15 carbon atoms and an alkoxy group having 1 to 15 carbon atoms, more preferably represents a group selected from the group consisting of an alkyl group having 1 to 12 carbon atoms and an alkoxy group having 1 to 11 carbon atoms, yet more preferably represents an alkoxy group having 1 to 10 carbon atoms, and most preferably represents an alkoxy group having 1 to 5 carbon atoms.

In the general formula (3), $R^3$ and $R^4$ preferably each independently represent a linear or branched alkyl group, alkenyl group, or alkoxy group and more preferably a linear alkyl group, alkenyl group, or alkoxy group.

In the general formula (3), a preferable combination of $R^3$ and $R^4$ is $R^3$ representing an alkyl group having 1 to 15 carbon atoms and $R^4$ representing an alkoxy group having 1 to 15 carbon atoms, a more preferable combination is $R^3$ representing an alkyl group having 1 to 10 carbon atoms and $R^4$ representing an alkoxy group having 1 to 9 carbon atoms, a more preferable combination is $R^3$ representing an alkyl group having 1 to 5 carbon atoms and $R^4$ representing an alkoxy group having 1 to 4 carbon atoms, and a most preferable combination is $R^3$ representing an alkyl group having 2 to 5 carbon atoms and $R^4$ representing an alkoxy group having 1 to 3 carbon atoms.

Such a combination of compounds is preferably contained as the third component in the liquid crystal composition from the viewpoint of improving solubility and particularly from the viewpoint of obtaining a liquid crystal composition that has good low-temperature solubility.

Examples of "an alkyl group having 1 to 15 carbon atoms" according to the present invention are as described above and are not repeated here.

Regarding examples of "an alkoxy group having 1 to 15 carbon atoms" according to the present invention, at least one oxygen atom in the substituent is preferably located at a position that directly bonds to a cyclic structure. A methoxy group, an ethoxy group, a propoxy group (n-propoxy group and i-propoxy group), a butoxy group, a pentyloxyl group, an octyloxy group, and a decyloxy group are more preferable. In this specification, examples of the alkoxy group are common and an appropriate alkoxy group is selected from the above-described examples in accordance with the number of carbon atoms in the alkoxy group.

Examples of the "alkenyl group having 2 to 15 carbon atoms" according to the present invention include a vinyl group, an allyl group, a 1-propenyl group, an isopropenyl group, a 2-butenyl group, a 3-butenyl group, 1,3-butadienyl group, a 2-pentenyl group, a 3-pentenyl group, and a 2-hexenyl group. More preferable alkenyl groups of the present invention are those represented by formula (i) (vinyl group), formula (ii) (1-propneyl group), formula (iii) (3-butenyl group), and formula (iv) (3-pentenyl group) below:

[Chem. 9]

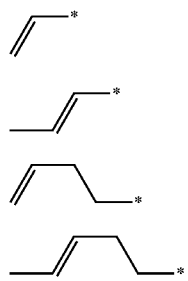

(i)
(ii)
(iii)
(iv)

(In formulae (i) to (iv), * represents a linking site to a cyclic structure.) In the case where the liquid crystal composition of the present invention contains a polymerizable monomer, structures represented by formula (ii) and formula (iv) are preferable and a structure represented by formula (ii) is more preferable. Note that in this specification, examples of the alkenyl groups are common and an appropriate alkenyl group is selected from the above-mentioned examples in accordance with the number of carbon atoms in the respective alkenyl group.

As with the first component and the second component described above as the essential components, the content of the third component in the liquid crystal composition according to the present invention is also appropriately selected not only in relation to the operational mode and the purpose of use of the liquid crystal composition but also in relation to other components; thus, the preferable range of the third component content in the liquid crystal composition is preferably independent from one embodiment to another.

The lower limit of the third component content in the liquid crystal composition according to the present invention relative to the total amount (100% by mass) of the liquid crystal composition of the present invention is, for example, preferably 1% by mass in one embodiment of the present invention, preferably 7% by mass in another embodiment of the present invention, preferably 10% by mass in another embodiment of the present invention, preferably 13% by mass in another embodiment of the present invention, preferably 15% by mass in another embodiment of the present invention, preferably 17% by mass in another embodiment of the present invention, preferably 20% by mass in another embodiment of the present invention, preferably 30% by mass in another embodiment of the present invention, preferably 40% by mass in another embodiment of the present invention, preferably 50% by mass in another embodiment of the present invention, preferably 55% by mass in another embodiment of the present invention, preferably 60% by mass in another embodiment of the present invention, preferably 65% by mass in another embodiment of the present invention, preferably 70% by mass in another embodiment of the present invention, preferably 75% by mass in another embodiment of the present invention, and preferably 80% by mass in another embodiment of the present invention.

The upper limit of the third component content in the liquid crystal composition according to the present invention relative to the total amount (100% by mass) of the liquid crystal composition of the present invention is, for example, preferably 95% by mass in one embodiment of the present invention, preferably 85% by mass in another embodiment of the present invention, preferably 75% by mass in another embodiment of the present invention, preferably 65% by mass in another embodiment of the present invention, preferably 55% by mass in another embodiment of the present invention, preferably 45% by mass in another embodiment of the present invention, preferably 35% by mass in another embodiment of the present invention, preferably 25% by mass in another embodiment of the present invention, preferably 20% by mass in another embodiment of the present invention, preferably 17% by mass in another embodiment of the present invention, and preferably 15% by mass in another embodiment of the present invention.

The content of the compound represented by general formula (3) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the third component of the present invention, the number of compounds represented by general formula (3) used in combination is not particularly limited and an appropriate combination is selected based on desired properties such as low-temperature solubility, transition temperature, electrical reliability, and birefringence. As for the number of compounds represented by general formula (3) used as the third component, for example, one compound represented by general formula (3) is used as the third component in one embodiment. In another embodiment of the present invention, two compounds represented by general formula (3) are used as the third component. In another embodiment of the present invention, three compounds represented by general formula (3) are used as the third component. In another embodiment of the present invention, four compounds represented by general formula (3) are used as the third component. In another embodiment of the present invention, five compounds represented by general formula (3) are used as the third component. In another embodiment of the present invention, six compounds represented by general formula (3) are used as the third component. In another embodiment of the present invention, seven compounds represented by general formula (3) are used as the third component. In another embodiment of the present invention, eight compounds represented by general formula (3) are used as the third component. In another embodiment of the present invention, nine compounds represented by general formula (3) are used as the third component. In another embodiment of the present invention, ten or more compounds represented by general formula (3) are used as the third component.

The lower limit of the dielectric anisotropy ($\Delta\in$) of the compound represented by general formula (3) according to the present invention is −1 in one embodiment, 0 in another embodiment, 0 in another embodiment, −0.5 in another embodiment, −0.7 in another embodiment, and −0.9 in another embodiment. The upper limit of the dielectric anisotropy ($\Delta\in$) of the liquid crystal composition containing compounds represented by general formula (3) is 1 in one embodiment, 0 in another embodiment, 0.5 in another embodiment, 0.7 in another embodiment, 0.8 in another embodiment, and 0.9 in another embodiment.

A preferable embodiment of the third component of the present invention is a mixture of one to three different compounds selected from the compounds represented by general formula (3) above (in general formula (3), $R^3$ represents a linear alkyl group having 1 to 5 carbon atoms and $R^4$ represents a linear alkoxy group having 1 to 4 carbon atoms). The mass ratio of the whole third component of the present invention relative to the entire liquid crystal composition is particularly preferably 5 to 10% by mass.

A fourth component according to the present invention is preferably a compound represented by general formula (4):

[Chem. 10]

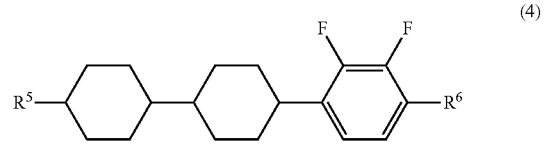

(4)

(In general formula (4), $R^5$ and $R^6$ each independently represent one selected from the group consisting of an alkyl group having 1 to 15 carbon atoms, an alkenyl group having 2 to 15 carbon atoms, and an alkoxy group having 1 to 15 carbon atoms; however, general formula (1) is excluded).

Incorporation of a compound represented by general formula (4) as the fourth component is preferable from the viewpoint of obtaining a liquid crystal composition having a high $\Delta\in$ and an appropriate $\Delta$n.

In general formula (4), $R^5$ preferably represents a group selected from the group consisting of an alkyl group having 1 to 15 carbon atoms, an alkenyl group having 2 to 15 carbon atoms, and an alkoxy group having 1 to 15 carbon atoms, more preferably represents a group selected from the group consisting of an alkyl group having 1 to 15 carbon atoms and an alkenyl group having 2 to 15 carbon atoms, yet more preferably represents a group selected from the group consisting of an alkyl group having 1 to 12 carbon atoms and an alkenyl group having 2 to 12 carbon atoms, yet more preferably represents an alkyl group having 1 to 10 carbon atoms, and most preferably represents an alkyl group having 2 to 5 carbon atoms.

In the general formula (4), $R^6$ preferably represents a group selected from the group consisting of an alkyl group having 1 to 15 carbon atoms, an alkenyl group having 2 to 15 carbon atoms, and an alkoxy group having 1 to 15 carbon atoms, more preferably represents a group selected from the group consisting of an alkyl group having 1 to 15 carbon atoms and an alkoxy group having 1 to 15 carbon atoms, yet more preferably represents a group selected from the group consisting of an alkyl group having 1 to 12 carbon atoms and an alkoxy group having 1 to 11 carbon atoms, yet more preferably represents an alkoxy group having 1 to 10 carbon atoms, and most preferably represents an alkoxy group having 1 to 5 carbon atoms.

In general formula (4), $R^5$ and $R^6$ preferably each independently represent a linear or branched alkyl group, alkenyl group, or alkoxy group, and more preferably each independently represent a linear alkyl group, alkenyl group, or alkoxy group.

In general formula (4), a preferable combination of $R^5$ and $R^6$ is $R^5$ representing an alkyl group having 1 to 15 carbon atoms and $R^6$ representing an alkoxy group having 1 to 15 carbon atoms, a more preferable combination is $R^5$ representing an alkyl group having 1 to 10 carbon atoms and $R^6$ representing an alkoxy group having 1 to 10 carbon atoms, and a yet more preferable combination is $R^5$ representing an alkyl group having 2 to 5 carbon atoms and $R^6$ representing an alkoxy group having 1 to 4 carbon atoms. In the examples of the preferable combinations of $R^5$ and $R^6$ described above, the number of carbon atoms in the alkyl group in the alkoxy group represented by $R^6$ is preferably smaller than the number of carbon atoms of the alkyl group represented by $R^5$.

Adding such a preferable combination of compounds represented by general formula (4) to a liquid crystal composition is particularly preferable from the viewpoint of improving the low temperature solubility. For example, Examples described below confirm that the systems that used a combination of 4-Cy-Cy-Ph3-O$_2$ and 3-Cy-Cy-Ph3-O$_3$ offered favorable experimental results in terms of solubility at further lower temperature and volatility. In other words, 4-Cy-Cy-Ph3-O$_2$ and 3-Cy-Cy-Ph3-O$_3$ are compounds that have the same molecular weight but different positions of center of gravity. Accordingly, by using these in combination, the liquid crystal composition can be made asymmetrical while minimizing changes in physical property values such as $\Delta\in$ and $\Delta n$ and thus crystallization can be suppressed. Presumably because of this, the low-temperature solubility is enhanced.

As with the first component and the second component described as essential components above, the content of the fourth component in the liquid crystal composition according to the present invention is also appropriately selected not only in relation to the operational mode and the purpose of use of the liquid crystal composition but also in relation to other components; thus, the preferable range of the fourth component content is preferably independent from one embodiment to another.

The lower limit of the fourth component content in the liquid crystal composition according to the present invention relative to the total amount (100% by mass) of the liquid crystal composition of the present invention is, for example, preferably 1% by mass in one embodiment of the present invention, preferably 7% by mass in another embodiment of the present invention, preferably 10% by mass in another embodiment, preferably 13% by mass in another embodiment of the present invention, preferably 15% by mass in another embodiment of the present invention, preferably 17% by mass in another embodiment of the present invention, preferably 20% by mass in another embodiment of the present invention, preferably 23% by mass in another embodiment of the present invention, preferably 25% by mass in another embodiment of the present invention, preferably 27% by mass in another embodiment of the present invention, preferably 30% by mass in another embodiment of the present invention, preferably 40% by mass in another embodiment of the present invention, preferably 50% by mass in another embodiment of the present invention, preferably 55% by mass in another embodiment of the present invention, preferably 60% by mass in another embodiment of the present invention, preferably 65% by mass in another embodiment of the present invention, preferably 70% by mass in another embodiment of the present invention, preferably 75% by mass in another embodiment of the present invention, and preferably 80% by mass in another embodiment of the present invention.

The upper limit of the fourth component content in the liquid crystal composition according to the present invention relative to the total amount (100% by mass) of the liquid crystal composition of the present invention is, for example, preferably 95% by mass in one embodiment of the present invention, preferably 85% by mass in another embodiment of the present invention, preferably 75% by mass in another embodiment of the present invention, preferably 65% by mass in another embodiment of the present invention, preferably 55% by mass in another embodiment of the present invention, preferably 45% by mass in another embodiment of the present invention, preferably 35% by mass in another embodiment of the present invention, and preferably 25% by mass in another embodiment of the present invention.

The content of the compound represented by general formula (4) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the fourth component of the present invention, the number of compounds represented by general formula (4) used in combination is not particularly limited and an appropriate combination is selected based on desired properties such as low-temperature solubility, transition temperature, electrical reliability, and birefringence. As for the number of compounds represented by general formula (4) used as the fourth component, for example, one compound represented by general formula (4) is used as the fourth component in one embodiment. In another embodiment of the present invention, two compounds represented by general formula (4) are used as the fourth component. In another embodiment of the present invention, three compounds represented by general formula (4) are used as the fourth component. In another embodiment of the present invention, four compounds represented by general formula (4) are used as the fourth component. In another embodiment of the present invention, five compounds represented by general formula (4) are used as the fourth component. In another embodiment of the present invention, six compounds represented by general formula (4) are used as the fourth component. In another embodiment of the present invention, seven compounds represented by general formula (4) are used as the fourth component. In another embodiment of the present invention, eight compounds represented by general formula (4) are used as the fourth component. In another embodiment of the present invention, nine compounds represented by general formula (4) are used as the fourth component. In another embodiment of the present invention, ten or more compounds represented by general formula (4) are used as the fourth component.

The lower limit of the dielectric anisotropy ($\Delta\in$) of the compound represented by general formula (4) according to the present invention is −15 in one embodiment, −12 in another embodiment, −10 in another embodiment, −9 in another embodiment, −8 in another embodiment, and −7 in another embodiment. The upper limit of the dielectric anisotropy ($\Delta\in$) of the liquid crystal composition containing compounds represented by general formula (4) is −3 in one embodiment, −5 in another embodiment, −7 in another embodiment, −9 in another embodiment, −11 in another embodiment, and −13 in another embodiment.

A preferable embodiment of the fourth component of the present invention is a mixture of one to three different compounds selected from the compounds represented by general formula (4) above (in general formula (4), $R^5$ represents an alkyl group having 1 to 10 carbon atoms and $R^6$ represents an alkoxy group having 1 to 10 carbon atoms). The mass ratio of the whole fourth component of the present invention relative to the entire liquid crystal composition is particularly preferably 3 to 13% by mass.

The liquid crystal composition of the present invention preferably contains a fifth component which is at least one selected from the group consisting of compounds represented by general formula (5) below:

[Chem. 11]

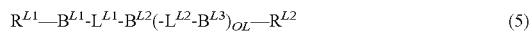

$$R^{L1}—B^{L1}-L^{L1}-B^{L2}(-L^{L2}-B^{L3})_{OL}—R^{L2} \qquad (5)$$

(In general formula (5), $R^{L1}$ and $R^{L2}$ each independently represent an alkyl group having 1 to 8 carbon atoms and one —$CH_2$— or two or more nonadjacent —$CH_2$— in the alkyl group may each independently be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) and (b) below:
(a) a 1,4-cyclohexylene group (one —$CH_2$— or two or more nonadjacent —$CH_2$— present in this group may be substituted with —O—)
(b) a 1,4-phenylene group (one —CH= or two or more nonadjacent —CH= present in this group may be substituted with —N=), hydrogen atoms in the groups (a) and (b) above may each independently be substituted with a cyano group, a chlorine atom, or a fluorine atom, $L_{L1}$ and $L_{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and when OL is 2 or 3 and two or more $L^{L2}$ are present, they may be the same or different and when OL is 2 or 3 and two or more $B^{L3}$ are present, they may be the same or different provided that compounds represented by general formula (1), compounds represented by general formula (2), and compounds represented by general formula (3) are excluded.)

When the cyclic structures to which $R^{L1}$ and $R^{L2}$ bond are phenyl groups (aromatics), $R^{L1}$ and $R^{L2}$ preferably each represent a linear alkyl group having 1 to 5 carbon atoms, a linear alkoxy group having 1 to 4 (or more) carbon atoms, or an alkenyl group having 4 or 5 carbon atoms. When the cyclic structure to which $R^{L1}$ and $R^{L2}$ bond are saturated cyclic structures such as cyclohexane, pyran, or dioxane, $R^{L1}$ and $R^{L2}$ preferably each represent a linear alkyl group having 1 to 5 carbon atoms, a linear alkoxy group having 1 to 4 (or more) carbon atoms, or a linear alkenyl group having 2 to 5 carbon atoms.

When the liquid crystal composition is required to achieve chemical stability, the compound represented by general formula (5) according to the present invention preferably has no chlorine atom in its molecule. The compound represented by general formula (5) according to the present invention preferably contains no halogen in the same cyclic structures.

It is preferable to add a compound represented by general formula (5) to the liquid crystal composition since while the change in drive voltage of the liquid crystal display device can be minimized, the viscosity, Δn, and transition point of the liquid crystal composition can be freely adjusted.

As with the third component and the like, the fifth component content in the liquid crystal composition according to the present invention is appropriately selected not only in relation to the operational mode and purpose of use of the liquid crystal composition but also in relation to other components; thus, the preferable range of the fifth component content is preferably independent from one embodiment to another.

In the liquid crystal composition according to the present invention, the lower limit of the fifth component content relative to the total amount (100% by mass) of the liquid crystal composition of the present invention is, for example, preferably 1% by mass in one embodiment, preferably 10% by mass in another embodiment of the present invention, preferably 20% by mass in another embodiment of the present invention, preferably 30% by mass in another embodiment of the present invention, preferably 40% by mass in another embodiment of the present invention, preferably 50% by mass in another embodiment of the present invention, preferably 55% by mass in another embodiment of the present invention, preferably 60% by mass in another embodiment of the present invention, preferably 65% by mass in another embodiment of the present invention, preferably 70% by mass in another embodiment of the present invention, preferably 75% by mass in another embodiment of the present invention, and preferably 80% by mass in another embodiment of the present invention.

The upper limit of the fifth component content in the liquid crystal composition according to the present invention relative to the total amount (100% by mass) of the liquid crystal composition of the present invention is, for example, preferably 95% by mass in one embodiment of the present invention, preferably 85% by mass in another embodiment of the present invention, preferably 75% by mass in another embodiment of the present invention, preferably 65% by mass in another embodiment of the present invention, preferably 55% by mass in another embodiment of the present invention, preferably 45% by mass in another embodiment of the present invention, preferably 35% by mass in another embodiment of the present invention, and preferably 25% by mass in another embodiment of the present invention.

The content of the compound represented by general formula (5) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the fifth component of the present invention, the number of compounds represented by general formula (5) used in combination is not particularly limited and an appropriate combination is selected based on desired properties such as low-temperature solubility, transition temperature, electrical reliability, and birefringence. As for the number of compounds represented by general formula (5) used as the fifth component, for example, one compound represented by general formula (5) is used in one embodiment of the present invention. In another embodiment of the present invention, two compounds represented by general formula (5) are used as the fifth component. In another embodiment of the present invention, three compounds represented by general formula (5) are used as the fifth component. In another embodiment of the present invention, four compounds represented by general formula (5) are used as the fifth component. In another embodiment of the present invention, five compounds represented by general formula (5) are used as the fifth component. In another embodiment of the present invention, six compounds represented by general formula (5) are used as the fifth component. In another embodiment of the present invention, seven compounds represented by general formula (5) are used as the fifth component. In another embodiment of the present invention, eight compounds represented by general formula (5) are used as the fifth component. In another embodiment of the present invention, nine compounds represented by general formula (5) are used as the fifth component. In another embodiment of the present invention, ten or more compounds represented by general formula (5) are used as the fifth component.

The lower limit of the dielectric anisotropy (Δ∈) of the compound represented by general formula (5) according to the present invention is −1 in one embodiment, −0.5 in another embodiment, 0 in another embodiment, 0.5 in another embodiment, 1 in another embodiment, and −0.3 in another embodiment. The upper limit of the dielectric anisotropy (Δ∈) of the liquid crystal composition containing compounds represented by general formula (5) is +1 in one embodiment, +0.5 in another embodiment, 0 in another embodiment, −0.5 in another embodiment, +0.3 in another embodiment, and −0.7 in another embodiment.

The compound represented by general formula (5) according to the present invention is preferably at least one compound selected from the group consisting of compounds represented by general formula (V-a) to general formula (V-g) below.

[Chem. 12]

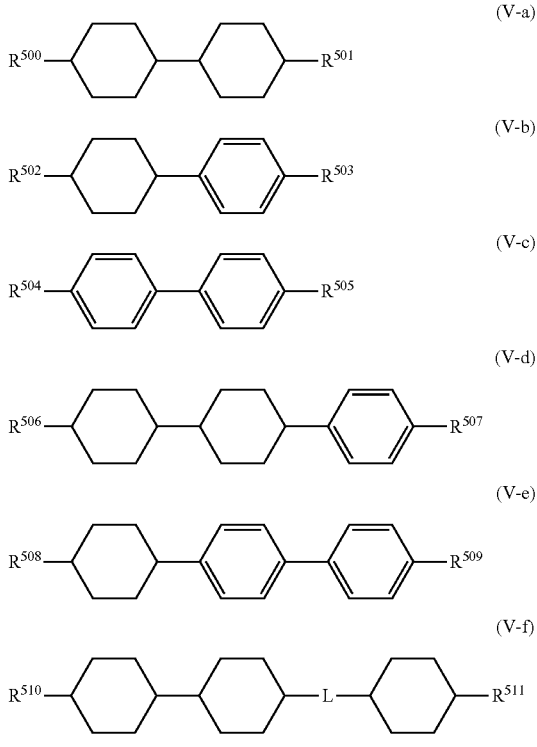

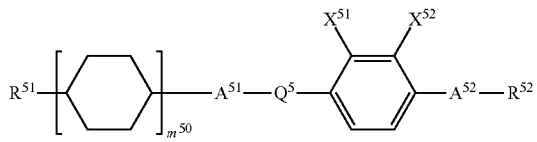

(In general formulae (V-a) to (V-f), $R^{500}$ to $R^{511}$ each independently represent an alkyl group having 1 to 10 carbon atoms, an alkoxy group having 1 to 10 carbon atoms, or an alkenyl group having 2 to 10 carbon atoms and L represents a divalent linking group; in general formula (V-g), $R^{51}$ and $R^{52}$ each independently represent an alkyl group having 1 to 5 carbon atoms, an alkenyl group having 2 to 5 carbon atoms, or an alkoxy group having 1 to 4 carbon atoms, $A^{51}$ and $A^{52}$ each independently represent a 1,4-cyclohexylene group or a 1,4-phenylene group, $Q^5$ represents a single bond or COO—, $X^{51}$ and $X^{52}$ each independently represent a fluorine atom or a hydrogen atom, and $m^{50}$ represents an integer of 0 or 1; however, in general formula (V-g), conditions that would give the same structures as those represented by general formula (V-b) to general formula (V-e) are excluded; and in general formula (V-g), $X^{51}$ and $X^{52}$ are preferably not fluorine atoms simultaneously since the same cyclic structures do not contain a halogen.)

In general formula (V-a) to general formula (V-f), $R^{500}$ to $R^{511}$ preferably each independently represent an alkyl group having 1 to 10 carbon atoms, an alkenyl group having 2 to 10 carbon atoms, or an alkoxy group having 1 to 10 carbon atoms and more preferably each independently represent an alkyl group having 1 to 5 carbon atoms, an alkenyl group having 2 to 5 carbon atoms, or an alkoxy group having 2 to 5 carbon atoms. The divalent linking group (L) in general formula (V-f) preferably represents a single bond, —CF$_2$O—, or COO—.

When there are alkenyl groups in general formula (V-a) to general formula (V-g), the preferable examples of the alkenyl groups are the same as those described above and alkenyl groups represented by formula (i) to (iv) above are more preferable.

$R^{500}$ and $R^{509}$ may be the same or different but preferably represent different substituents.

In the case where compounds selected from seven compound groups represented by general formula (V-a) to general formula (V-g) are used as the fifth component, the fifth component preferably contains 1 to 10 compounds, more preferably 1 to 8 compounds, yet more preferably 1 to 5 compounds, and most preferably 2 to 4 compounds. In such a case, the total content of the fifth component in the liquid crystal composition according to the present invention is preferably 5 to 50%, more preferably 5 to 40% by mass, yet more preferably 5 to 35% by mass, and most preferably 7 to 30% by mass.

The compound represented by general formula (V-a) according to the present invention is preferably a compound selected from a group of compounds represented by general formula (V-a-1).

[Chem. 13]

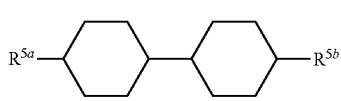
(V-a-1)

(In general formula (V-a-1), $R^{5a}$ and $R^{5b}$ each independently represent an alkyl group having 1 to 5 carbon atoms.)

To be specific, the following compounds are preferable as the compound represented by general formula (V-a-1):

[Chem. 14]

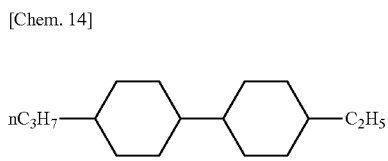
(5.1)
(5.2)
(5.3)
(5.4)

Compounds represented by general formula (5.1), general formula (5.3), and formula (5.4) are more preferable.

It is preferable to increase the content of the compound represented by formula (5.1) if a liquid crystal display device with low viscosity and high response speed is to be produced. However, if a liquid crystal display device that has a high Tni and capable of performing stable display at high temperatures is to be produced, the contents of the compounds represented by formula (5.3) and formula (5.4) are preferably increased.

The compound represented by general formula (V-a) according to the present invention is preferably a compound selected from a group of compounds represented by general formula (V-a-2).

[Chem. 15]

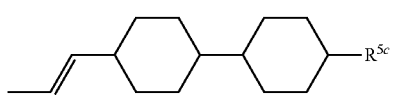
(V-a-2)

(In general formula (V-a-2), $R^{5c}$ independently represents an alkyl group having 1 to 5 carbon atoms, an alkenyl group having 2 to 5 carbon atoms, or an alkoxy group having 1 to 5 carbon atoms.)

To be specific, the following compounds are preferable as the compound represented by general formula (V-a-2):

[Chem. 16]

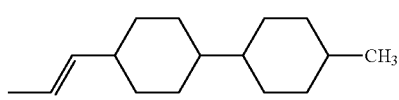
(5.5)
(5.6)
(5.7)
(5.8)
(5.9)

A compound represented by formula (5.6) or formula (5.7) is preferable and a compound represented by formula (5.7) is particularly preferable.

The compound represented by general formula (V-a) is preferably a compound selected from a group of compounds represented by general formula (V-a-3).

[Chem. 17]

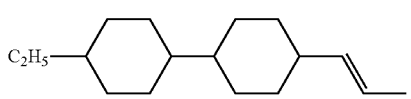
(V-a-3)

(In general formula (V-a-3), $R^{5d}$ represents an alkyl group having 1 to 5 carbon atoms and $R^{5e}$ represents an alkoxy group having 1 to 4 carbon atoms.)

In particular, the following compounds are preferred as the compound represented by general formula (V-a-3).

[Chem. 18]

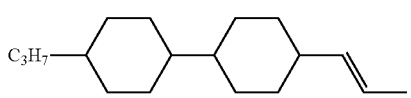
(5.10)
(5.11)
(5.12)
(5.13)

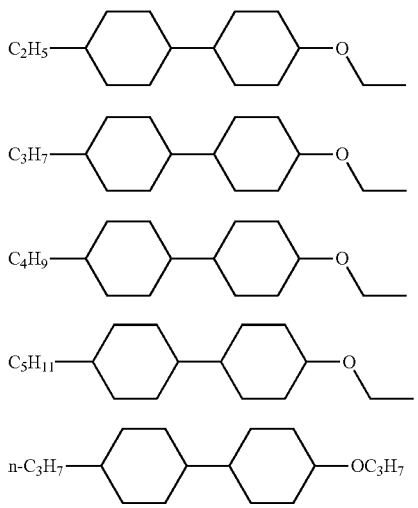

(5.14)
(5.15)
(5.16)
(5.17)
(5.18)

A compound represented by formula (5.11), formula (5.13), or formula (5.18) is preferable.

The liquid crystal composition of the present invention can further contain a compound represented by formula (5.19) having a structure similar to the compound represented by general formula (V-a).

[Chem. 19]

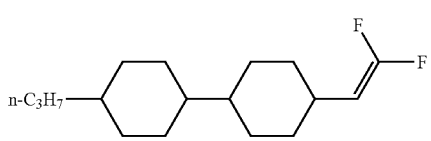

(5.19)

The compound represented by general formula (V-a) is preferably a compound selected from a group of compounds represented by general formula (V-a-4).

[Chem. 20]

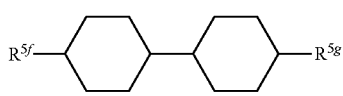

(V-a-4)

(In general formula (V-a-4), $R^{5f}$ and $R^{5g}$ each independently represent an alkenyl group having 2 to 5 carbon atoms.)

The compound represented by general formula (V-a-4) is preferably a compound selected from a group of compounds represented by formula (5.20) to formula (5.29). Compounds represented by formula (5.21), formula (5.23), and formula (5.26) are preferable.

[Chem. 21]

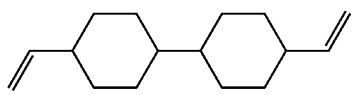

(5.20)

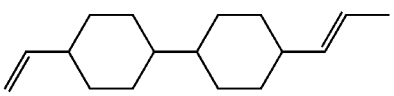

(5.21)

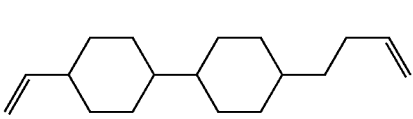

(5.22)

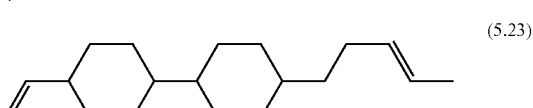

(5.23)

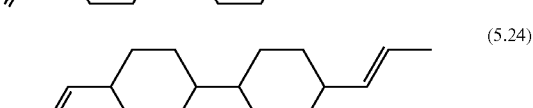

(5.24)

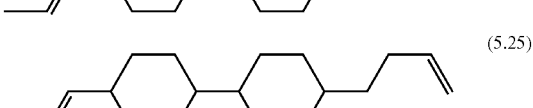

(5.25)

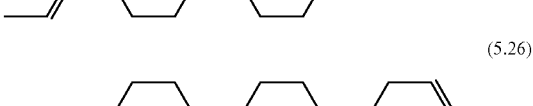

(5.26)

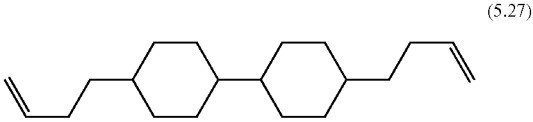

(5.27)

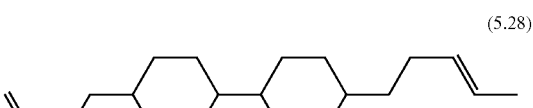

(5.28)

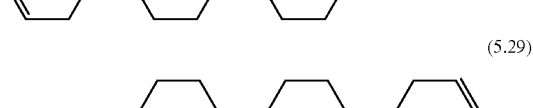

(5.29)

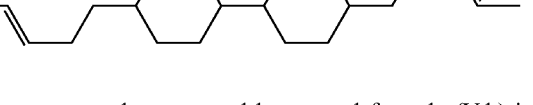

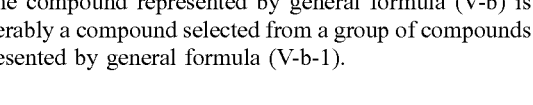

The compound represented by general formula (V-b) is preferably a compound selected from a group of compounds represented by general formula (V-b-1).

[Chem. 22]

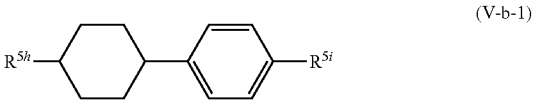

(V-b-1)

(In general formula (V-b-1), $R^{5h}$ represents an alkyl group having 1 to 5 carbon atoms, an alkenyl group having 2 to 5 carbon atoms, or an alkoxy group having 1 to 4 carbon atoms and $R^{5i}$ represents an alkyl group having 1 to 5 carbon atoms, an alkenyl group having 4 or 5 carbon atoms, or an alkoxy group having 1 to 4 carbon atoms.)

To be specific, the following compounds are preferable as the compound represented by general formula (V-b-1).

[Chem. 23]

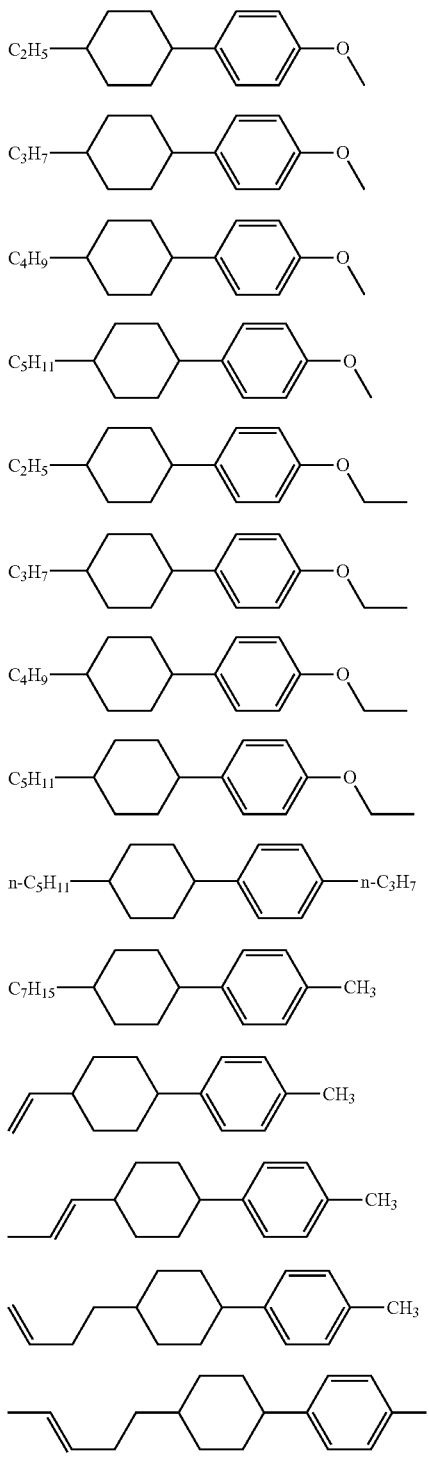

(5.30)
(5.31)
(5.32)
(5.33)
(5.34)
(5.35)
(5.36)
(5.37)
(5.38)
(5.39)
(5.40)
(5.41)
(5.42)
(5.43)

A compound represented by formula (5.31) or formula (5.38) is preferable.

The liquid crystal composition of the present invention may contain a compound selected from a group of compounds represented by general formula (V-b-2) which have a structure similar to those represented by general formula (V-b-1).

[Chem. 24]

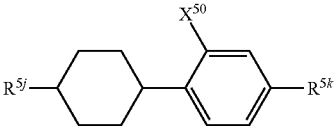

(V-b-2)

(In general formula (V-b-2), $R^{5j}$ and $R^{5k}$ each independently represent an alkyl group having 1 to 5 carbon atoms, an alkenyl group having 2 to 5 carbon atoms, or an alkoxy group having 1 to 4 carbon atoms and $X^{50}$ independently represents a fluorine atom or a chlorine atom.)

The compound represented by general formula (V-b-2) is preferably a compound represented by formula (5.44).

[Chem. 25]

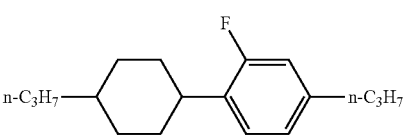

(5.44)

The compound represented by general formula (V-c) is preferably a compound selected from a group of compounds represented by general formula (V-c-1).

[Chem. 26]

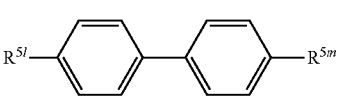

(V-c-1)

(In general formula (V-c-1), $R^{5l}$ and $R^{5m}$ each independently represent an alkyl group having 1 to 5 carbon atoms, an alkenyl group having 4 or 5 carbon atoms, or an alkoxy group having 1 to 4 carbon atoms.)

In particular, the following compounds are preferable as the compound represented by general formula (V-c-1).

[Chem. 27]

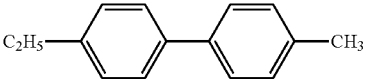

(5.45)

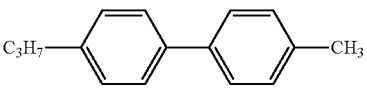

(5.46)

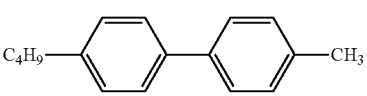

(5.47)

(5.48)
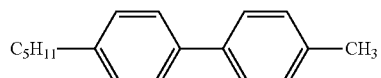

(5.49)
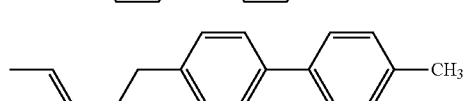

(5.50)
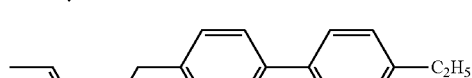

(5.51)
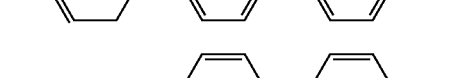

(5.52)
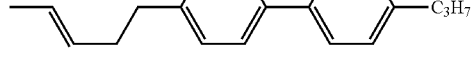

(5.53)
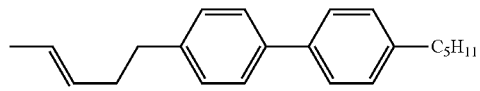

A compound represented by formula (5.48), formula (5.49), or formula (5.53) is more preferable.

A compound selected from a group of compounds represented by general formula (V-c-2) which have a structure similar to those represented by general formula (V-c-1) may be contained.

[Chem. 28]

(V-c-2)
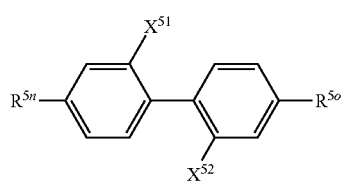

(In general formula (V-c-2), $R^{5n}$ and $R^{5o}$ each independently represent an alkyl group having 1 to 5 carbon atoms, an alkenyl group having 4 or 5 carbon atoms, or an alkoxy group having 1 to 4 carbon atoms, $X^{51}$ and $X^{52}$ each independently represent a fluorine atom or a hydrogen atom, and at least one of $X^{51}$ or $X^{52}$ represents a fluorine atom.)

The compound represented by general formula (V-c-2) is preferably a compound represented by formula (5.54).

[Chem. 29]

(5.54)
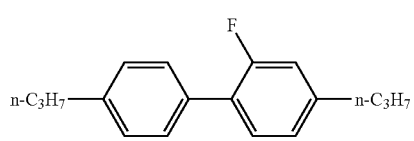

The compound represented by general formula (V-d) is, for example, preferably a compound selected from a group of compounds represented by general formula (V-d-1).

[Chem. 30]

(V-d-1)
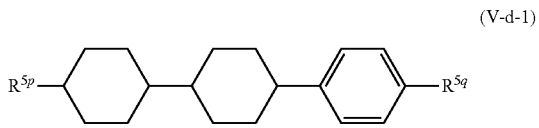

(In general formula (V-d-1), $R^{5p}$ represents an alkyl group having 1 to 5 carbon atoms and $R^{5q}$ represents an alkyl group having 1 to 5 carbon atoms or an alkoxy group having 1 to 4 carbon atoms.)

In particular, the following compounds are preferable as the compound represented by general formula (V-d-1).

[Chem. 31]

(5.55)
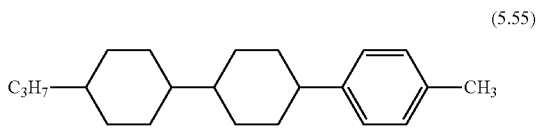

(5.56)
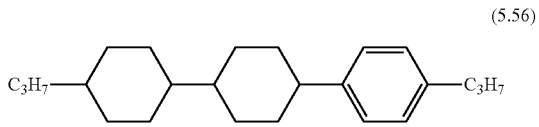

The compound represented by general formula (V-d-1) is more preferably a compound represented by formula (5.55).

The compound represented by general formula (V-d) is, for example, preferably a compound selected from a group of compounds represented by general formula (V-d-2).

[Chem. 32]

(V-d-2)
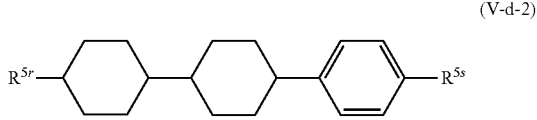

(In general formula (V-d-2), $R^{5r}$ represents an alkyl group having 1 to 5 carbon atoms and $R^{5s}$ represents an alkoxy group having 1 to 4 carbon atoms.)

Compounds represented by formula (5.57) to formula (5.60) are also preferable as the compound represented by general formula (V-d-1), for example. Among these, a compound represented by formula (5.60) is more preferable.

[Chem. 33]

(5.57)
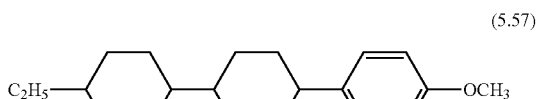

(5.58)
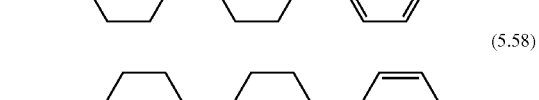

(5.59)

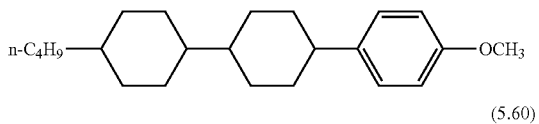

(5.60)

The compound represented by general formula (V-d) according to the present invention is, for example, preferably a compound selected from a group of compounds represented by general formula (Vd-3).

[Chem. 34]

(V-d-3)

(In general formula (V-d-3), $R^{5t}$ represents an alkenyl group having 2 to 5 carbon atoms and $R^{5u}$ represents an alkyl group having 1 to 5 carbon atoms or an alkoxy group having 1 to 4 carbon atoms.)

Compounds represented by formula (5.61) to formula (5.63) are preferable as the compound represented by general formula (V-d-3), for example.

[Chem. 35]

(5.61)

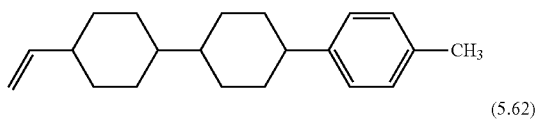

(5.62)

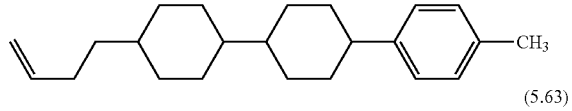

(5.63)

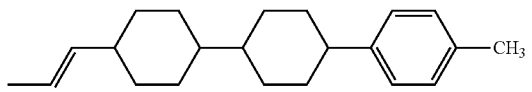

The compound represented by general formula (V-e) is preferably a compound selected from a group of compounds represented by general formula (V-e-1).

[Chem. 36]

(V-e-1)

(In general formula (V-e-1), $R^{5v}$ and $R^{5w}$ each independently represent an alkenyl group having 2 to 5 carbon atoms, an alkyl group having 1 to 5 carbon atoms, or an alkoxy group having 1 to 4 carbon atoms.)

In particular, the following compounds are preferable as the compound represented by general formula (V-e-1).

[Chem. 37]

(5.64)

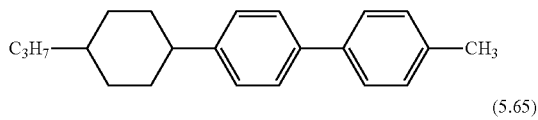

(5.65)

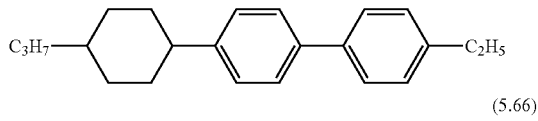

(5.66)

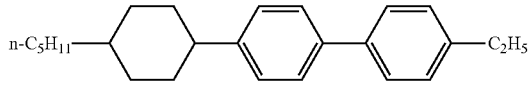

The compound represented by general formula (V-e) according to the present invention is more preferably a compound selected from a group of compounds represented by general formula (V-e-2).

[Chem. 38]

(V-e-2)

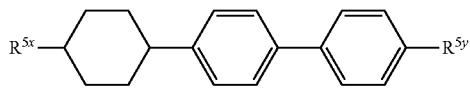

(In general formula (V-e-2), $R^{5x}$ represents an alkenyl group having 2 to 5 carbon atoms and $R^{5y}$ independently represents an alkyl group having 1 to 5 carbon atoms or an alkoxy group having 1 to 4 carbon atoms.)

A compound represented by formula (5.67) or formula (5.68) is preferable as the compound represented by general formula (V-e-2), for example.

[Chem. 39]

(5.67)

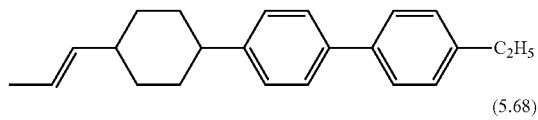

(5.68)

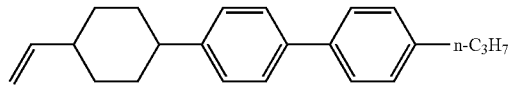

The compound represented by general formula (V-e) according to the present invention is preferably a compound selected from a group of compounds represented by general formula (V-e-3).

[Chem. 40]

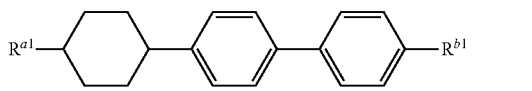

(V-e-3)

(In general formula (V-e-3), $R^{a1}$ represents an alkyl group having 1 to 5 carbon atoms and $R^{b1}$ represents an alkoxy group having 1 to 4 carbon atoms.)

The compound represented by general formula (V-e-3) is, for example, preferably a compound selected from a group of compounds represented by formula (5.69) to formula (5.71). A compound represented by formula (5.71) is particularly preferable.

[Chem. 41]

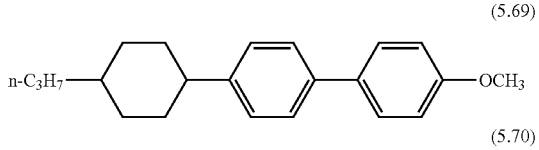

(5.69)

(5.70)

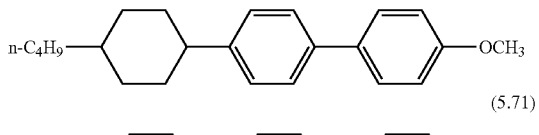

(5.71)

The compound represented by general formula (V-f) according to the present invention is, for example, preferably a compound selected from a group of compounds represented by general formula (Vf-1).

[Chem. 42]

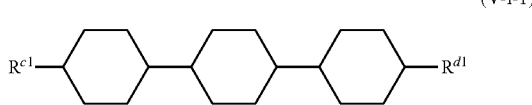

(V-f-1)

(In general formula (V-f-1), $R^{c1}$ and $R^{d1}$ each independently represent an alkenyl group having 2 to 5 carbon atoms, an alkyl group having 1 to 5 carbon atoms, or an alkoxy group having 1 to 4 carbon atoms.)

The compound represented by general formula (V-f-1) is preferably a compound represented by formula (5.72), for example.

[Chem. 43]

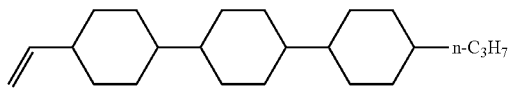

(5.72)

The compound represented by general formula (V-f) according to the present invention is, for example, preferably a compound selected from a group of compound represented by general formula (Vf-2).

[Chem. 44]

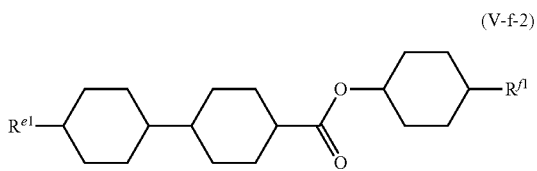

(V-f-2)

(In general formula (V-f-2), $R^{e1}$ and $R^{f1}$ each independently represent an alkenyl group having 2 to 5 carbon atoms, an alkyl group having 1 to 5 carbon atoms, or an alkoxy group having 1 to 4 carbon atoms.)

Compounds represented by formula (5.73) to formula (5.77) are preferable as the compound represented by general formula (V-f-2), for example. In particular, a compound represented by formula (5.74) and/or formula (5.77) is preferable.

[Chem. 45]

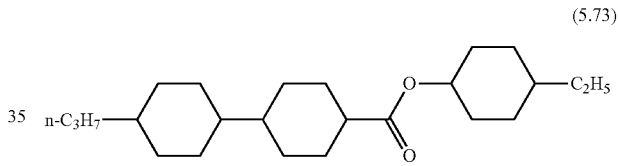

(5.73)

(5.74)

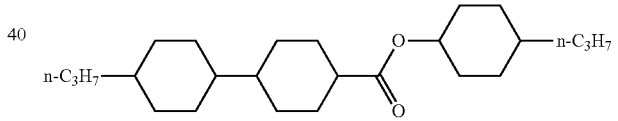

(5.75)

(5.76)

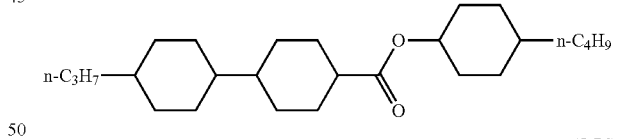

(5.77)

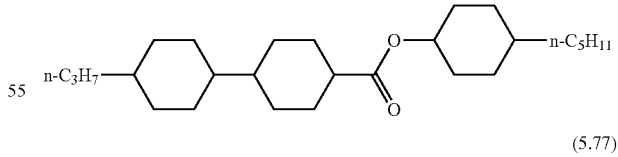

The compound represented by general formula (V-g) according to the present invention is preferably a compound represented by general formula (V-g-1).

[Chem. 46]

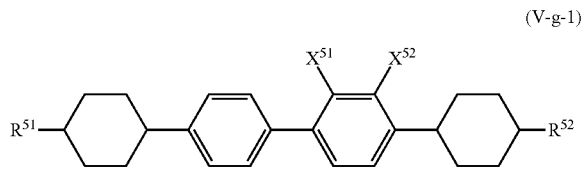

(V-g-1)

(In general formula (V-g-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms and $X^{51}$ and $X^{52}$ each independently represent a fluorine atom or a hydrogen atom.)

The compound represented by general formula (V-g) according to the present invention is preferably a compound represented by general formula (V-g-2).

[Chem. 47]

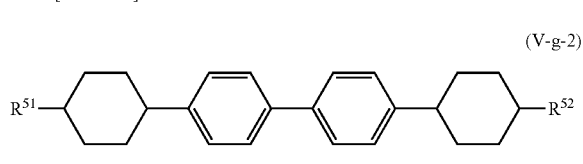

(V-g-2)

(In general formula (V-g-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Compounds represented by formula (5.87) to formula (5.81) are preferable as the compound represented by general formula (V-g-2). A compound represented by formula (5.79) is particularly preferable.

[Chem. 48]

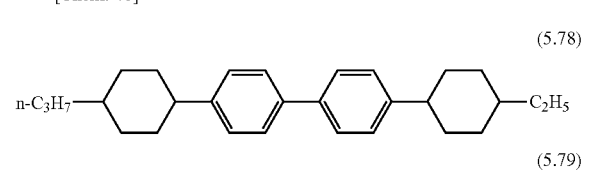

(5.78)

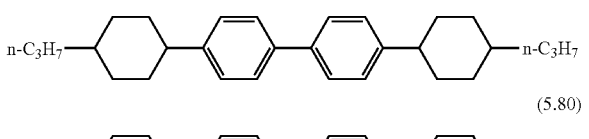

(5.79)

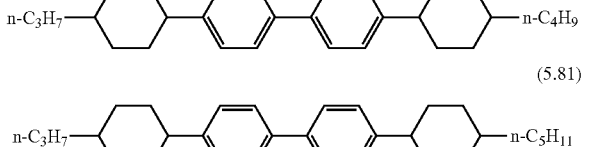

(5.80)

(5.81)

The compound represented by general formula (V-g) is preferably a compound represented by general formula (V-g-2).

[Chem. 49]

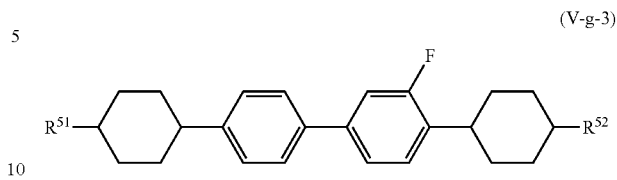

(V-g-3)

(In general formula (V-g-3), $R^{51}$ and $R^{52}$ each independently represent an alkyl group having 1 to 5 carbon atoms, an alkenyl group having 2 to 5 carbon atoms or an alkoxy group having 1 to 4 carbon atoms.)

Compounds represented by formula (5.82) to formula (5.84) are preferable as the compound represented by general formula (V-g-3). A compound represented by formula (5.82) is more preferable.

[Chem. 50]

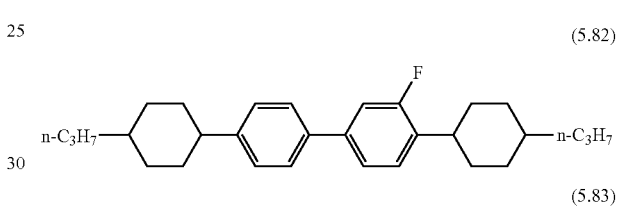

(5.82)

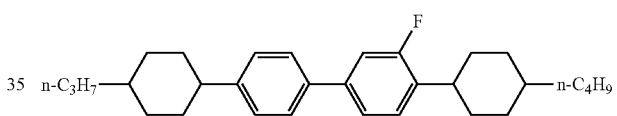

(5.83)

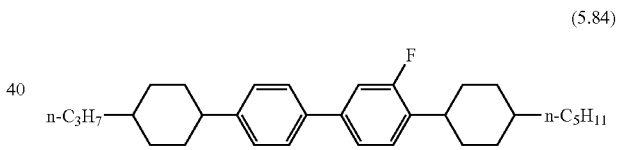

(5.84)

The compound represented by general formula (V-g) according to the present invention is preferably a compound represented by general formula (V-g-4).

[Chem. 51]

(V-g-4)

(In general formula (V-g-4), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Compounds represented by formula (5.85) to formula (5.87) are preferable as the compound represented by general formula (V-g-4). A compound represented by formula (5.85) is particularly preferable.

[Chem. 52]

(5.85)
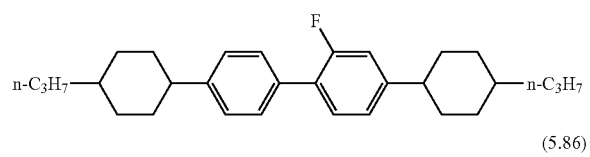

(5.86)
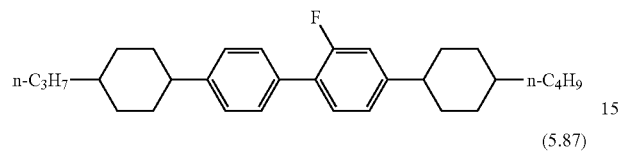

(5.87)
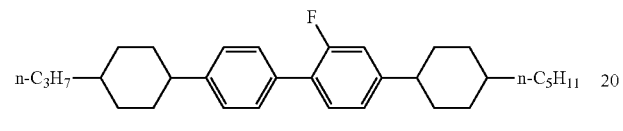

The compound represented by general formula (V-g) according to the present invention is preferably a compound represented by general formula (V-g-5).

[Chem. 53]

(V-g-5)
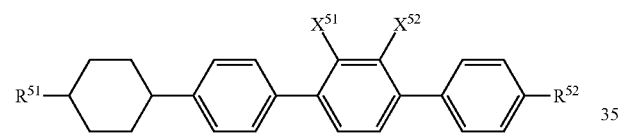

(In general formula (V-g-5), $R^{51}$ and $R^{52}$ each independently represent an alkyl group having 1 to 5 carbon atoms, an alkenyl group having 2 to 5 carbon atoms, or an alkoxy group having 1 to 4 carbon atoms and $X^{51}$ and $X^{52}$ each independently represent a fluorine atom or a hydrogen atom.)

The compound represented by general formula (V-g) according to the present invention is preferably a compound represented by general formula (V-g-6).

[Chem. 54]

(V-g-6)
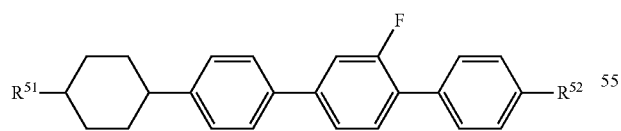

(In general formula (V-g-6), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Compounds represented by formula (5.88) to formula (5.4) are preferable as the compound represented by general formula (V-g-6). The compound represented by formula (5.88) and/or formula (5.91) is particularly preferable.

[Chem. 55]

(5.88)
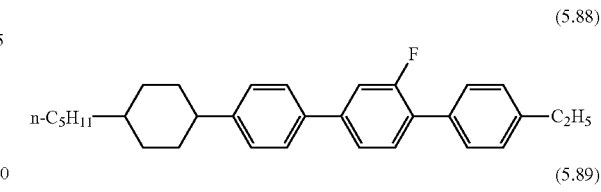

(5.89)

(5.90)

(5.91)

The compound represented by general formula (V-g) according to the present invention is preferably a compound represented by general formula (V-g-7).

[Chem. 56]

(V-g-7)
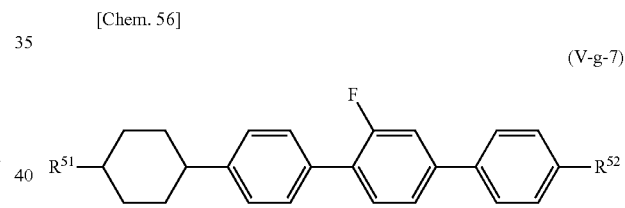

(In general formula (V-g-7), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Compounds represented by formula (5.92) to formula (5.95) are preferable as the compound represented by general formula (V-g-7). The compounds represented by formula (5.92) and/or formula (5.93) are preferable.

[Chem. 57]

(5.92)
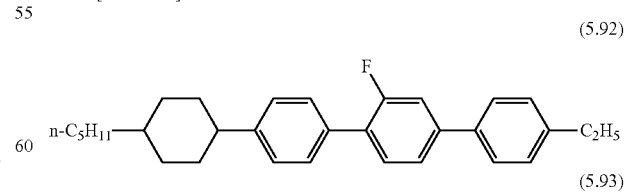

(5.93)

(5.94)

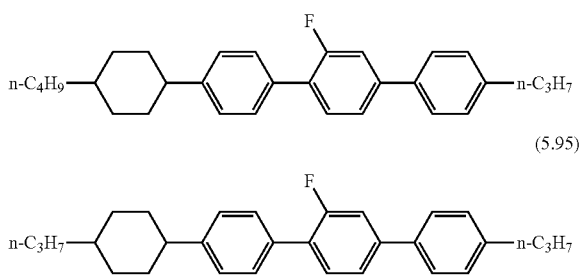

(5.95)

The compound represented by general formula (V-g) according to the present invention is preferably a compound represented by general formula (V-g-8).

[Chem. 58]

(V-g-8)

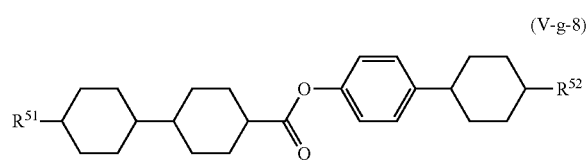

(In general formula (V-3), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

Compounds represented by formula (5.96) to formula (5.98) are preferable as the compound represented by general formula (V-g-8).

[Chem. 59]

(5.96)

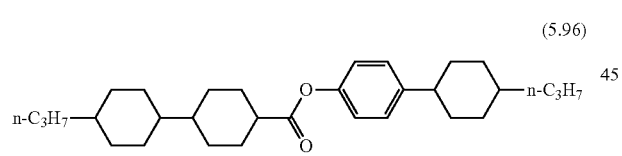

(5.97)

(5.98)

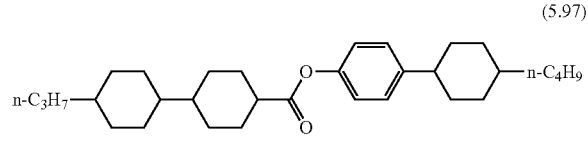

The compound represented by general formula (V-g) according to the present invention is preferably a compound represented by general formula (V-g-9).

[Chem. 60]

(V-g-9)

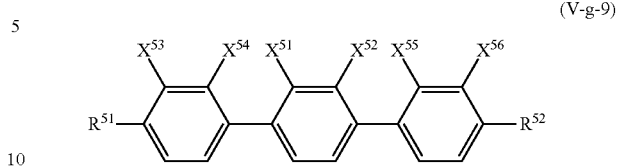

(In general formula (V-g-9), $R^{51}$ and $R^{52}$ each independently represent an alkyl group having 1 to 5 carbon atoms, an alkenyl group having 2 to 5 carbon atoms, or an alkoxy group having 1 to 4 carbon atoms and $X^{51}$ to $X^{56}$ each independently represent a fluorine atom or a hydrogen atom.)

In general formula (V-g-9), one of $X^{51}$ and $X^{52}$, one of $X^{52}$ and $X^{54}$, and one of $X^{55}$ and $X^{56}$ are preferably each a fluorine atom.

Compounds represented by general formula (V-g-10) to (V-g-13) are preferable as the compound represented by general formula (V-g) according to the present invention.

[Chem. 61]

(V-g-10)

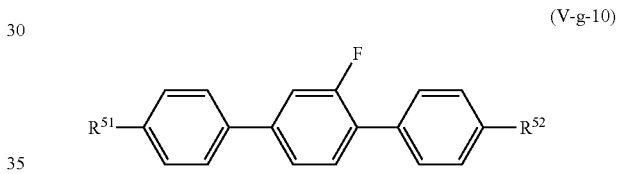

(V-g-11)

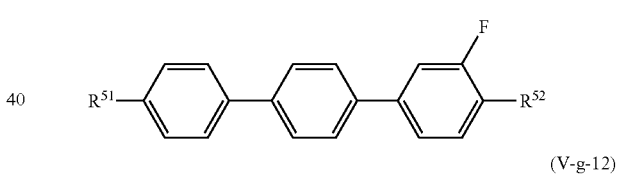

(V-g-12)

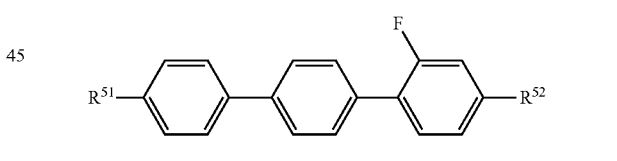

(V-g-13)

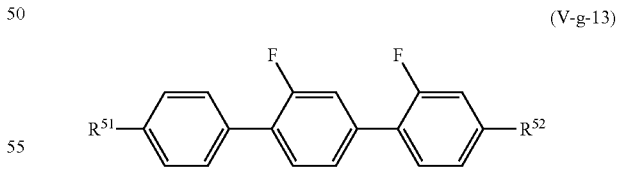

(In general formula (V-g-10) to (V-g-13), $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

The compound represented by general formula (V-g) is preferably a compound represented by general formula (V-g-10). Preferable examples of the compound represented by general formula (V-g-10) include compounds represented by formula (5.100) to (5.116) below.

[Chem. 62]

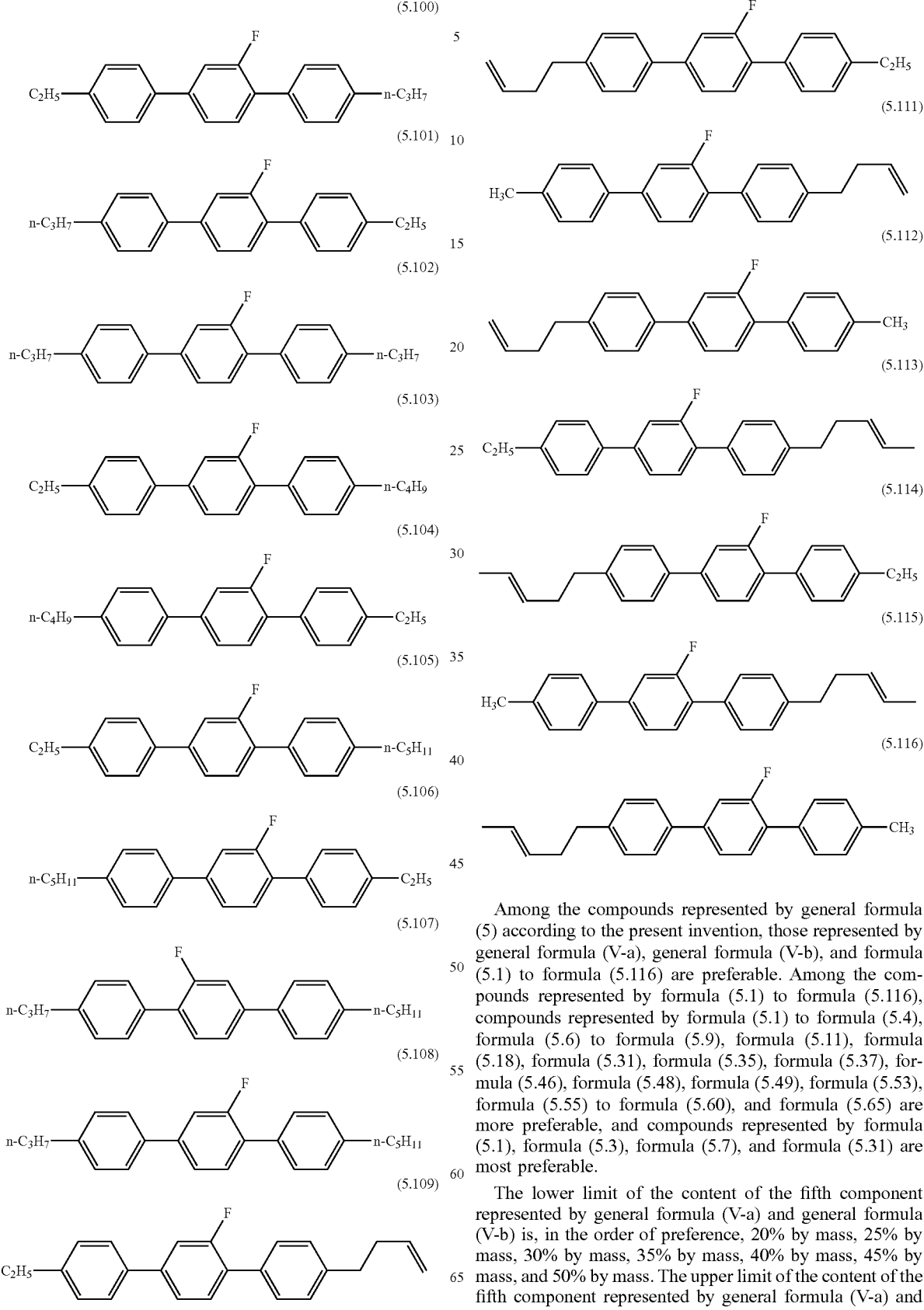

Among the compounds represented by general formula (5) according to the present invention, those represented by general formula (V-a), general formula (V-b), and formula (5.1) to formula (5.116) are preferable. Among the compounds represented by formula (5.1) to formula (5.116), compounds represented by formula (5.1) to formula (5.4), formula (5.6) to formula (5.9), formula (5.11), formula (5.18), formula (5.31), formula (5.35), formula (5.37), formula (5.46), formula (5.48), formula (5.49), formula (5.53), formula (5.55) to formula (5.60), and formula (5.65) are more preferable, and compounds represented by formula (5.1), formula (5.3), formula (5.7), and formula (5.31) are most preferable.

The lower limit of the content of the fifth component represented by general formula (V-a) and general formula (V-b) is, in the order of preference, 20% by mass, 25% by mass, 30% by mass, 35% by mass, 40% by mass, 45% by mass, and 50% by mass. The upper limit of the content of the fifth component represented by general formula (V-a) and general formula (V-b) is, in the order of preference, 70 mass, 65% by mass, 60% by mass, 55% by mass, 50% by mass, 45% by mass, 40% by mass, 35% by mass, and 30% by mass.

A particularly preferable embodiment of the fifth component according to the present invention is a mixture of one to three different compounds selected from among the compounds represented by general formula (V-a), general formula (V-b), and formula (5.1) to formula (5.116). The mass ratio of the whole fourth component according to the present invention relative to the entire liquid crystal composition is particularly preferably 32 to 40% by mass.

The liquid crystal composition according to the present invention preferably further contains, as a sixth component, at least one selected from a group of compounds represented by general formula (6) below:

[Chem. 63]

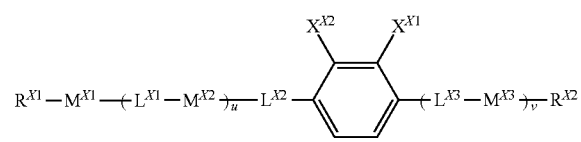

(6)

(In general formula (6), $R^{X1}$ and $R^{X2}$ each independently represent an alkyl group having 1 to 10 carbon atoms, an alkoxy group having 1 to 10 carbon atoms, or an alkenyl group having 2 to 10 carbon atom, one methylene group or two or more nonadjacent methylene groups present in these groups may each be substituted with —O— or —S—, and one or more hydrogen atoms present in these groups may each be substituted with a chlorine atom and/or a fluorine atom;

u and v each independently represent 0, 1, or 2 where u+v is 2 or less;

$M^{X1}$, $M^{X2}$ and $M^{X3}$ each independently represent one selected from the group consisting of (a) and (b) below:
(a) a trans-1,4-cyclohexylene group (one methylene group or two or more nonadjacent methylene groups present in this group may be substituted with —O— or —S—)
(b) a 1,4-phenylene group (one —CH= or two or more nonadjacent —CH= present in this group may be substituted with —N=);

hydrogen atoms contained in the groups represented by (a) or (b) may each be substituted with a group selected from the group consisting of a cyano group, a fluorine atom, a trifluoromethyl group, and a trifluoromethoxy group, and when two or more $M^{X2}$ and/or $M^{X3}$ are present, they may be the same or different;

$L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—, and when two or more $L^{X1}$ and/or $L^{X3}$ are present, they may be the same or different, $X^{X1}$ and $X^{X2}$ each independently represent a trifluoromethyl group, a trifluoromethoxy group, or a fluorine atom and one of $X^{x1}$ and $X^{x2}$ represents a fluorine atom; however, compounds represented by general formula (1) to general formula (4) are excluded.)

When the cyclic structures to which $R^{X1}$ and $R^{X2}$ bond are phenyl groups (aromatics), $R^{X1}$ and $R^{X2}$ preferably each represent a linear or branched alkyl group having 1 to 10 carbon atoms, a linear or branched alkoxy group having 1 to 10 (or more) carbon atoms, or an alkenyl group having 2 to 10 carbon atoms and more preferably each represent a linear alkyl group having 1 to 5 carbon atoms, a linear alkoxy group having 1 to 4 (or more) carbon atoms, or an alkenyl group having 4 or 5 carbon atoms. When the cyclic structure to which $R^{X1}$ and $R^{X2}$ bond are saturated cyclic structures such as cyclohexane, pyran, or dioxane, $R^{X1}$ and $R^{X2}$ preferably each represent a linear or branched alkyl group having 1 to 10 carbon atoms, a linear alkoxy group having 1 to 10 (or more) carbon atoms, and a linear alkenyl group having 2 to 10 carbon atoms, and more preferably represent a linear alkyl group having 1 to 5 carbon atoms, a linear alkoxy group having 1 to 4 (or more) carbon atoms, or a linear alkenyl group having 2 to 5 carbon atoms.

When improving the response speed of a display device is important, an alkenyl group is preferred in general formula (6) according to the present invention. When reliability such as voltage holding ratio and the like is important, an alkyl group is preferred.

The alkyl group and the alkoxy group in general formula (6) are preferably the same alkyl group and/or alkoxy group as with the first component to the third component described above. The examples of the alkenyl group for the third component are also preferred for the alkenyl group in general formula (6) and those represented by formula (i) to formula (iv) are more preferable.

When the liquid crystal composition is required to achieve chemical stability, the compound general formula (6) preferably contains no chlorine atoms in its molecule.

It is particularly preferable to add a compound represented by general formula (6) to the liquid crystal composition from the viewpoint of changing the drive voltage of a liquid crystal display device.

As with the first component and the second component used as essential components, etc., the content of the sixth component in the liquid crystal composition according to the present invention is appropriately selected not only in relation to the operational mode and purpose of use of the liquid crystal composition but also in relation to other components; thus, the preferable range of the fourth component content in the liquid crystal composition is preferably independent from one embodiment to another.

In the liquid crystal composition according to the present invention, the lower limit of the sixth component content relative to the total amount (100% by mass) of the liquid crystal composition according to the present invention is, for example, preferably 1% by mass in one embodiment of the present invention, preferably 10% by mass in another embodiment of the present invention, preferably 20% by mass in another embodiment of the present invention, preferably 30% by mass in another embodiment of the present invention, preferably 40% by mass in another embodiment of the present invention, preferably 50% by mass in another embodiment of the present invention, preferably 55% by mass in another embodiment of the present invention, preferably 60% by mass in another embodiment of the present invention, preferably 65% by mass in another embodiment of the present invention, preferably 70% by mass in another embodiment of the present invention, preferably 75% by mass in another embodiment of the present invention, and preferably 80% by mass in another embodiment of the present invention.

In the liquid crystal composition according to the present invention, the upper limit of the sixth component content relative to the total amount (100% by mass) of the liquid crystal composition according to the present invention is, for example, preferably 95% by mass in one embodiment of the present invention, preferably 85% by mass in another embodiment of the present invention, preferably 75% by mass in another embodiment of the present invention, preferably 65% by mass in another embodiment of the present invention, preferably 55% by mass in another embodiment of the present invention, preferably 45% by mass in another embodiment of the present invention, preferably 35% by mass in another embodiment of the present invention, and preferably 25% by mass in another embodiment of the present invention.

The content of the compound represented by general formula (6) in the liquid crystal composition of the present invention needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the sixth component of the present invention, the number of compounds represented by general formula (6) used in combination is not particularly limited and an appropriate combination is selected based on desired properties such as low-temperature solubility, transition temperature, electrical reliability, and birefringence. As for the number of compounds represented by general formula (6) used as the sixth component, one compound represented by general formula (6) is used as the sixth component in one embodiment. In another embodiment of the present invention, two compounds represented by general formula (6) are used as the sixth component. In another embodiment of the present invention, three compounds represented by general formula (6) are used as the sixth component. In another embodiment of the present invention, four compounds represented by general formula (6) are used as the sixth component. In another embodiment of the present invention, five compounds represented by general formula (6) are used as the sixth component. In another embodiment of the present invention, six compounds represented by general formula (6) are used as the sixth component. In another embodiment of the present invention, seven compounds represented by general formula (6) are used as the sixth component. In another embodiment of the present invention, eight compounds represented by general formula (6) are used as the sixth component. In another embodiment of the present invention, nine compounds represented by general formula (6) are used as the sixth component. In another embodiment of the present invention, ten or more compounds represented by general formula (6) are used as the sixth component.

The lower limit of the dielectric anisotropy (Δ∈) of the compound represented by general formula (6) according to the present invention is −20 in one embodiment, −15 in another embodiment, −13 in another embodiment, −12 in another embodiment, −10 in another embodiment, and −8 in another embodiment. The upper limit of the dielectric anisotropy (Δ∈) of the liquid crystal composition containing compounds represented by general formula (6) is 0 in one embodiment, −1 in another embodiment, −2 in another embodiment, −3 in another embodiment, −4 in another embodiment, and −5 in another embodiment.

At least one compound selected from the group consisting of compounds represented by general formula (VIa), general formula (VI-b), general formula (VI-c), and general formula (VI-d) below:

[Chem. 64]

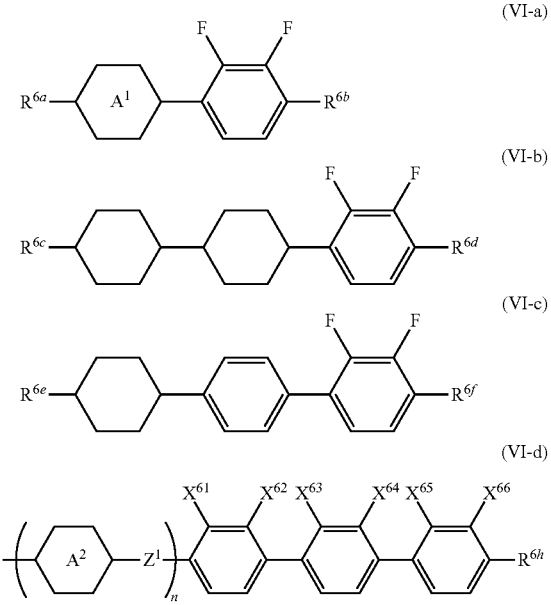

is preferably used as the compound represented by general formula (6) according to the present invention.

The compounds represented by general formulae (VI-a) to (VI-d) will now be described in detail one by one.

The compound represented by general formula (6) according to the present invention is preferably a compound represented by general formula (VI-a).

[Chem. 65]

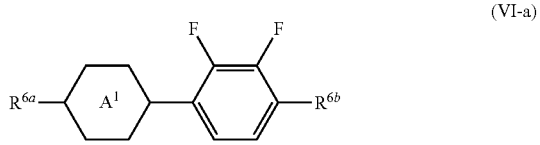

(In general formula (VI-a), $R^{6a}$ and $R^{6b}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, at least one hydrogen atom in the alkyl group, the alkenyl group, the alkoxy group, and/or the alkenyloxy group may be substituted with a fluorine atom, and a methylene group in the alkyl group, the alkenyl group, the alkoxy group, and/or the alkenyloxy group may be substituted with an oxygen atom as long as oxygen atoms do not successively bond and may be substituted with a carbonyl group as long as carbonyl groups do not successively bond; and $A^1$ represents a 1,4-cyclohexylene group, a 1,4-phenylene group, or a tetrahydropyran-2,5-diyl group and when $A^1$ represents a 1,4-phenylene group, at least one hydrogen atom in this 1,4-phenylene group may be substituted with a fluorine atom.)

In general formula (VI-a), $R^{6a}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkenyl group having 2 to 8 carbon atoms, yet more preferably represents an alkyl group having 1 to 8 carbon atoms, and most preferably represents an alkyl group having 3 to 5 carbon atoms.

In general formula (VI-a), $R^{6b}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkoxy group having 1 to 8 carbon atoms, yet more preferably represents an alkyl group having 3 to 5 carbon atoms or an alkoxy group having 2 to 4 carbon atoms, and most preferably represents an alkyl group having 3 or 5 carbon atoms or an alkoxy group having 2 or 4 carbon atoms.

In general formula (VI-a), $A^1$ represents a 1,4-cyclohexylene group, a 1,4-phenylene group, or a tetrahydropyran-2,5-diyl group. When $A^1$ represents a 1,4-phenylene group, at least one hydrogen atom in the 1,4-phenylene group may be substituted with a fluorine atom. However, $A^1$ is preferably a 1,4-cyclohexylene group or a 1,4-phenylene group. To be more specific, when the response speed of a display device and a liquid crystal display prepared by using the liquid crystal composition of the present invention is important, $A^1$ preferably represents a 1,4-phenylene group. When the operation temperature range is important, in other words, when a high operation temperature range (high $T_{ni}$) is required, $A^1$ preferably represents a 1,4-cyclohexylene group. When $A^1$ represents a 1,4-phenylene group, at least one hydrogen atom in the benzene ring may be substituted with fluorine; however, the 1,4-phenylene group is preferably unsubstituted, mono-substituted, or di-substituted and more preferably unsubstituted. When the 1,4-phenylene group is di-substituted, A 2,3-difluoro-1,4-phenylene group is preferable.

In particular, the compound represented by general formula (VI-a) is preferably a compound selected from the group consisting of compounds represented by general formula (VI-a-1) and/or general formula (VI-b-1):

[Chem. 66]

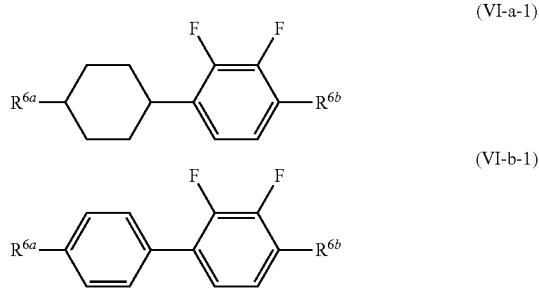

(VI-a-1)

(VI-b-1)

(In general formula (VI-a-1) and/or general formula (VI-b-1), $R^{6a}$ and $R^{6b}$ each independently represent an alkyl group having 1 to 5 carbon atoms, an alkenyl group having 2 to 5 carbon atoms, an alkoxy group having 1 to 8 carbon atoms, or an alkenyloxy group having 2 to 8 carbon atoms, at least one hydrogen atom in the alkyl group, the alkenyl group, the alkoxy group, and/or the alkenyloxy group may be substituted with a fluorine atom, and a methylene group in the alkyl group, the alkenyl group, the alkoxy group, and/or the alkenyloxy group may be substituted with an oxygen atom as long as oxygen atoms do not successively bond and may be substituted with a carbonyl group as long as carbonyl groups do not successively bond.)

$R^{6a}$ and $R^{6b}$ preferably each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms. When $R^{6a}$ and $R^{6b}$ each represent an alkenyl group, the number of carbon atoms is preferably 4 to 5.

To be specific, compounds represented by formula (6.1) to formula (6.21) below are preferable as the compound represented by general formula (VI):

[Chem. 67]

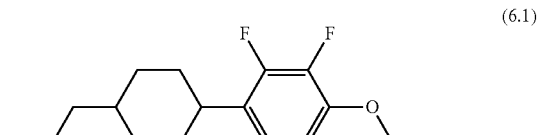

(6.1)

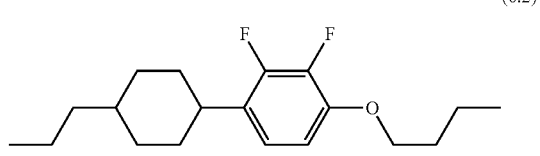

(6.2)

(6.3)

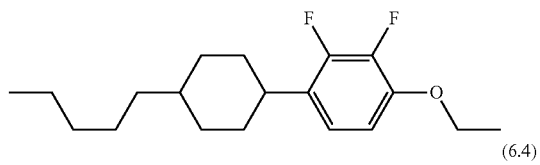

(6.4)

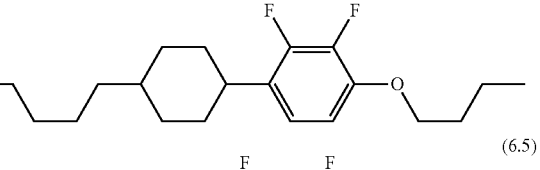

(6.5)

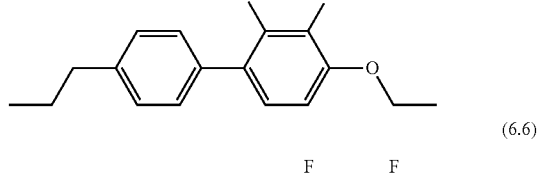

(6.6)

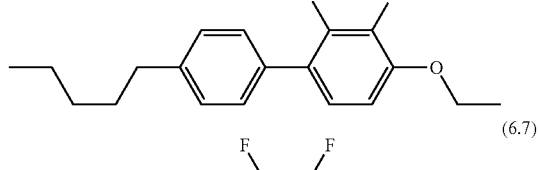

(6.7)

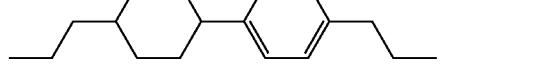

(6.8)
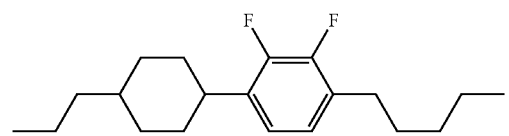

(6.9)
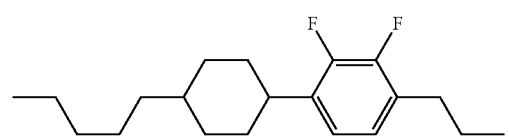

(6.10)
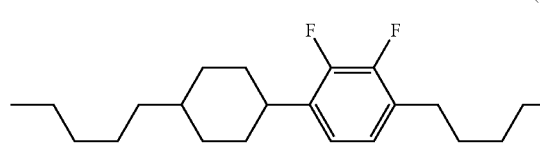

(6.11)
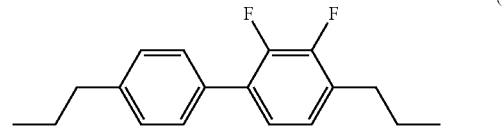

(6.12)
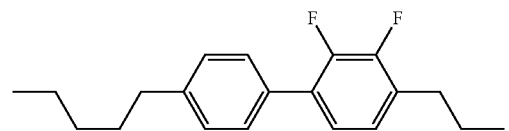

[Chem. 68]

(6.13)
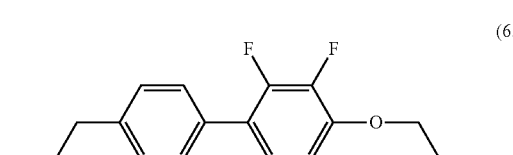

(6.14)
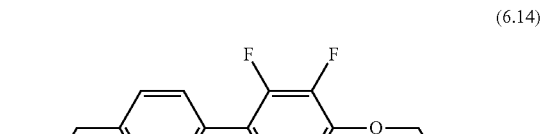

(6.15)
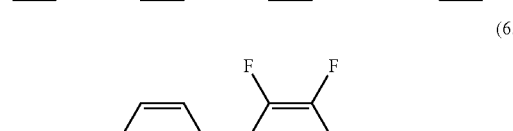

(6.16)
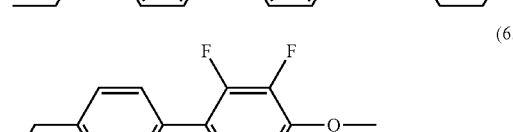

(6.17)
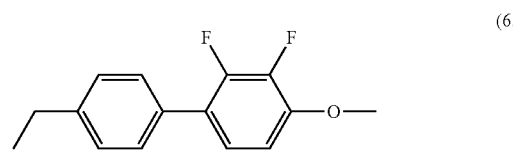

(6.18)
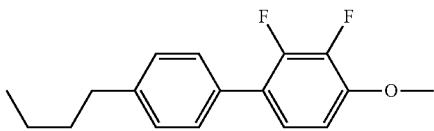

(6.19)
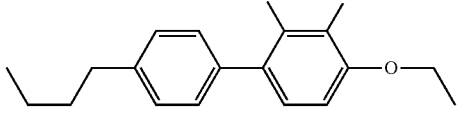

(6.20)
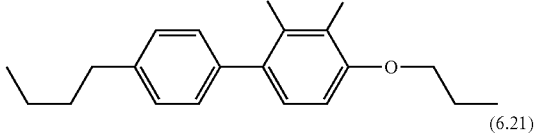

(6.21)
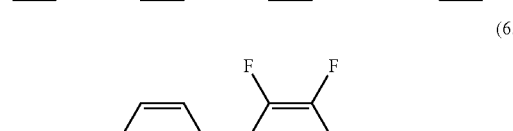

Compounds represented by formula (6.1) to formula (6.6) and formula (6.13) to formula (6.16) are more preferable. Compounds represented by formula (6.1), formula (6.3), formula (6.5), formula (6.6), and formula (6.15) are more preferable. Compounds represented by formula (6.1), formula (6.3), formula (6.5), and formula (6.15) are most preferable.

To be more specific, if the value of the refractive index anisotropy Δn required for the liquid crystal composition of the present invention is relatively low (about 0.09 or more and less than 0.1), compounds represented by formula (6.1) and formula (6.3) are most preferable. If the refractive index anisotropy Δn required is relatively high (about 0.09 or more and more than 0.1), a compound represented by formula (6.5) is most preferable. When the value of the refractive index anisotropy Δn is 0.09 or more and 0.1 or less, any of compounds represented by formula (6.1), formula (6.3), and formula (6.5) may be used.

When the compound represented by general formula (VI-a) according to the present invention has an alkenyl group, a compound selected from the group consisting of compounds represented by formula (6.22) to formula (6.27) below is preferable:

[Chem. 69]

(6.22)
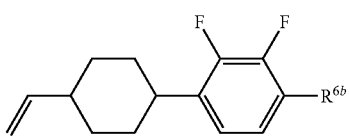

(6.23)
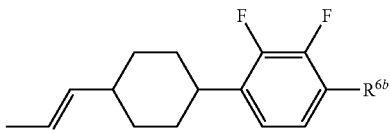

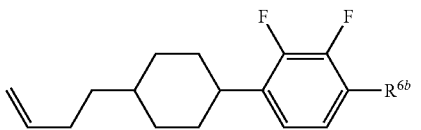
(6.24)

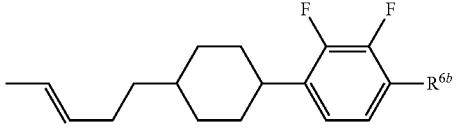
(6.25)

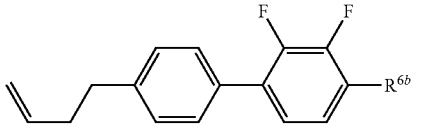
(6.26)

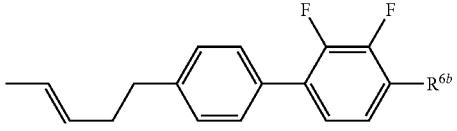
(6.27)

(In the formulae, $R^{6b}$ independently represents an alkyl group having 1 to 5 carbon atoms, an alkenyl group having 4 or 5 carbon atoms, or an alkoxy group having 1 to 4 carbon atoms.)

The compound represented by general formula (6) according to the present invention is preferably a compound selected from the group consisting of compounds represented by general formula (VI-b):

[Chem. 70]

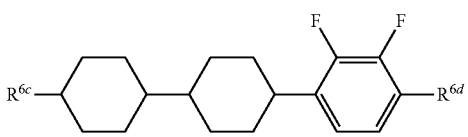
(VI-b)

(In general formula (VI-b), $R^{6c}$ and $R^{6d}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, at least one hydrogen atom in the alkyl group, the alkenyl group, the alkoxy group, and/or the alkenyloxy group may be substituted with a fluorine atom, and a methylene group in the alkyl group, the alkenyl group, the alkoxy group, and/or the alkenyloxy group may be substituted with an oxygen atom as long as oxygen atoms do not successively bond and may be substituted with a carbonyl group as long as carbonyl groups do not successively bond.) Furthermore, when the liquid crystal composition according to the present invention contains a compound represented by general formula (4) as the fourth component and the compound represented by general formula (VI-b) is identical to the compound represented by general formula (4), the compound represented by general formula (VIb) is preferably not contained in the sixth component.

In general formula (VI-b), $R^{6c}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkenyl group having 2 to 8 carbon atoms, yet more preferably represents an alkyl group having 1 to 8 carbon atoms, and most preferably represents an alkyl group having 3 to 5 carbon atoms.

In general formula (VI-b), $R^{6d}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkoxy group having 1 to 8 carbon atoms, yet more preferably represents an alkyl group having 3 to 5 carbon atoms or an alkoxy group having 2 to 4 carbon atoms, and most preferably represents an alkyl group having 3 or 5 carbon atoms or an alkoxy group having 2 or 4 carbon atoms.

In particular, compounds represented by formulae (6.28) to (6.33) below are preferable as the compound represented by general formula (VI-b):

[Chem. 71]

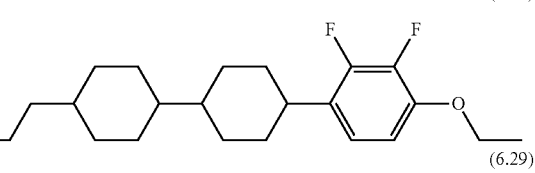
(6.28)

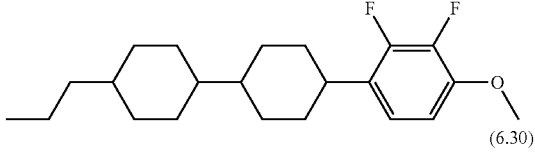
(6.29)

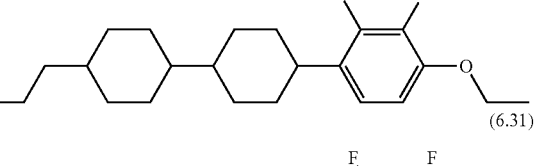
(6.30)

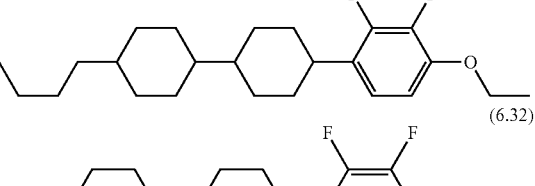
(6.31)

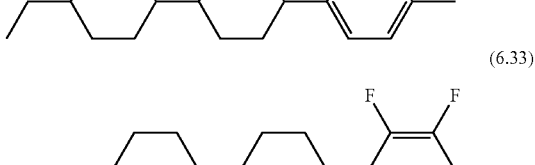
(6.32)

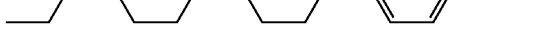
(6.33)

Compounds represented by formula (6.28) to formula (6.32) are more preferable. Compounds represented by formula (6.28) to formula (6.31) are yet more preferable. Compounds represented by formula (6.28) and formula (6.30) are most preferable.

When the compound represented by general formula (VI-b) according to the present invention has an alkenyl group, compounds represented by formulae (6.34) to (6.37) are preferable:

[Chem. 72]

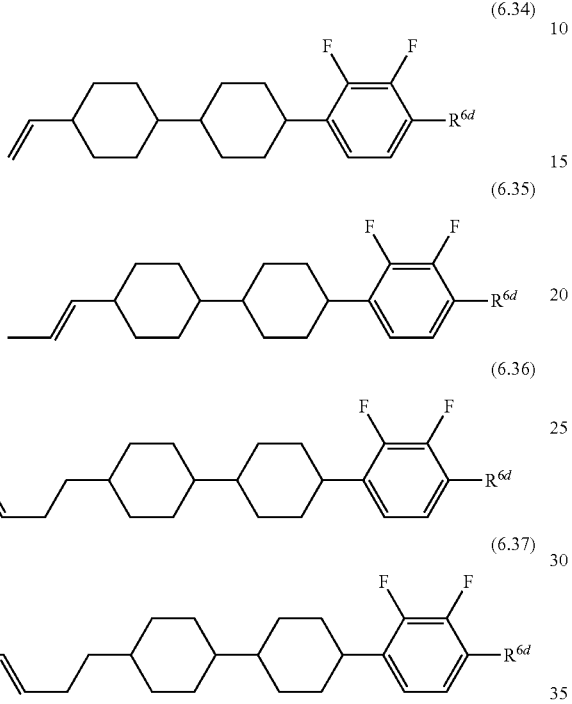

(6.34)
(6.35)
(6.36)
(6.37)

(In the formulae, $R^{6d}$ represents an alkyl group having 1 to 5 carbon atoms, an alkenyl group having 4 or 5 carbon atoms, or an alkoxy group having 1 to 4 carbon atoms.)

The compound represented by general formula (6) according to the present invention is preferably a compound represented by general formula (VI-c).

[Chem. 73]

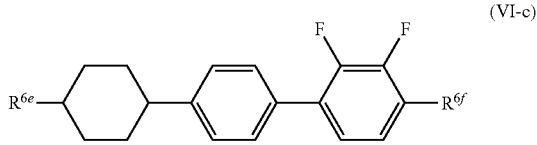

(VI-c)

(In general formula (VI-c), $R^{6e}$ and $R^{6f}$ each independently represent an alkyl group having 1 to 15 carbon atoms, an alkenyl group having 2 to 15 carbon atoms, or an alkoxy group having 1 to 15 carbon atoms.)

In the compound represented by general formula (VI-c), $R^{6e}$ more preferably represents an alkyl group having 1 to 10 carbon atoms and $R^{6f}$ more preferably represents an alkoxy group having 1 to 10 carbon atoms. Most preferably, $R^{6e}$ represents an alkyl group having 1 to 5 carbon atoms and $R^{6f}$ represents an alkoxy group having 1 to 5 carbon atoms.

A compound selected from the group consisting of compounds represented by formulae (6.38) to (6.43) below:

[Chem. 74]

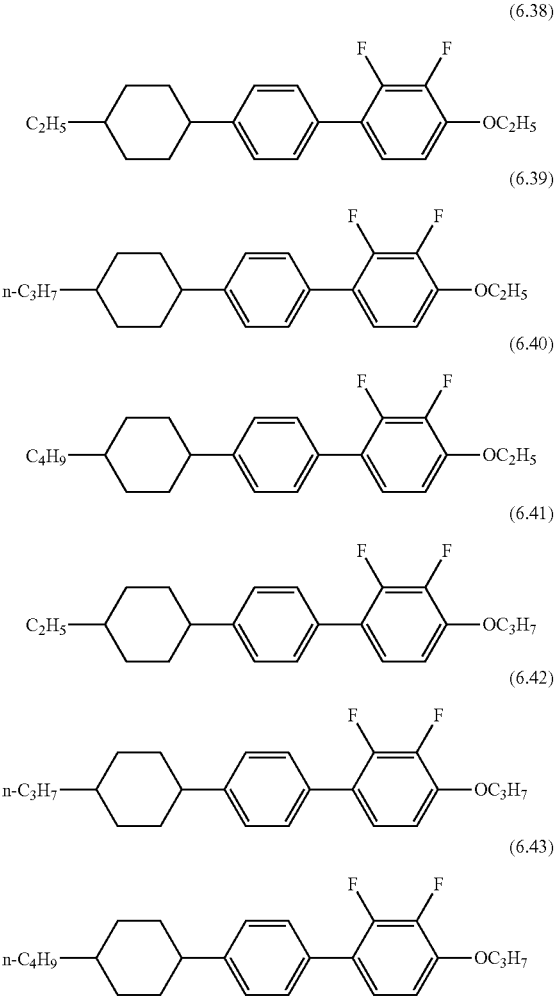

(6.38)
(6.39)
(6.40)
(6.41)
(6.42)
(6.43)

is preferable as the compound represented by general formula (VI-c) according to the present invention.

The compound represented by general formula (6) according to the present invention is preferably a compound represented by general formula (VI-d).

[Chem. 75]

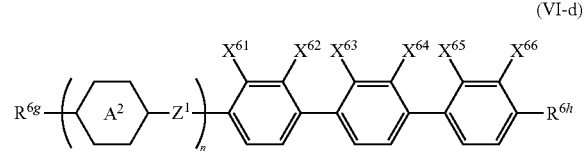

(VI-d)

(In general formula (VI-d), $R^{6g}$ and $R^{6h}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, at least one hydrogen atom in the alkyl group, the alkenyl group, the alkoxy group, and/or the alkenyloxy group may be substituted with a fluorine atom, and a methylene group in the alkyl group, the alkenyl group, the alkoxy group, and/or the alkenyloxy group may be substituted with an oxygen atom as long as oxygen atoms do not successively bond and may be substituted with a carbonyl group as long as carbonyl groups do not successively bond;

$A^2$ represents a 1,4-cyclohexylene group, a 1,4-phenylene group, or a tetrahydropyran-2,5-diyl group and when A represents a 1,4-phenylene group, at least one hydrogen atom in this 1,4-phenylene group may be substituted with a fluorine atom;

$Z^1$ represents a single bond, —OCH$_2$—, —OCF$_2$—, —CH$_2$O—, or CF$_2$O—, n represents 0 or 1, $X^{61}$ to $X^{66}$ each independently represent a hydrogen atom or a fluorine atom, and at least two of $X^{61}$ to $X^{66}$ each represent a fluorine atom.) Moreover, the 1,4-cyclohexyl group in this application is preferably a trans-1,4-cyclohexyl group.

When the liquid crystal composition of the present invention contains a compound represented by general formula (2) as the second component and the compound represented by general formula (VI-d) is identical to the compound represented by general formula (2), The compound represented by general formula (VI-d) is preferably not contained in the sixth component.

In general formula (VI-d), $R^{6g}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkenyl group having 2 to 8 carbon atoms, yet more preferably represents an alkyl group having 1 to 8 carbon atoms, and most preferably represents an alkyl group having 3 to 5 carbon atoms.

In general formula (VI-d), $R^{6h}$ preferably represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represents an alkyl group having 1 to 8 carbon atoms or an alkoxy group having 1 to 8 carbon atoms, yet more preferably represents an alkyl group having 3 to 5 carbon atoms or an alkoxy group having 2 to 4 carbon atoms, and most preferably represents an alkyl group having 3 or 5 carbon atoms. Furthermore, the number of carbon atoms in $R^e$ is preferably different from the number of carbon atoms in $R^f$.

In general formula (VI-d) above, $X^{61}$ to $X^{66}$ preferably each independently represent a hydrogen atom or a fluorine atom. Preferably, two to five selected from $X^{61}$ to $X^{66}$ each represent a fluorine atom, more preferably two to four selected from $X^{61}$ to $X^{66}$ each represent a fluorine atom, more preferably two to three selected from $X^{61}$ to $X^{66}$ each represent fluorine atom, and most preferably two selected from $X^{61}$ to $X^{66}$ each represent a fluorine atom and most preferably two selected from $X^{61}$ to $X^{66}$ each represent a fluorine atom.

When the number of fluorine atoms is one, any two selected from $X^{63}$ to $X^{66}$ preferably represent a fluorine atom and more preferably $X^{63}$ or $X^{64}$ represents a fluorine atom. When the number of fluorine atoms is two, any two selected from $X^{63}$ to $X^{66}$ preferably represent a fluorine atom, more preferably, $X^{63}$ and $X^{64}$ each represent a fluorine atom or $X^{65}$ and $X^{66}$ each represent a fluorine atom, and most preferably $X^{63}$ and $X^{64}$ each represent a fluorine atom. When the number of fluorine atoms is three or more, at least $X^{63}$ and $X^{64}$ preferably represent fluorine atoms or at least $X^{65}$ and $X^{66}$ preferably represent fluorine atoms, and more preferably at least $X^{63}$ and $X^{64}$ preferably represent fluorine atoms.

In general formula (VI-d), $A^2$ preferably represents a 1,4-cyclohexylene group, a 1,4-phenylene group, or a tetrahydropyran-2,5-diyl group. When the response speed of a display device and a liquid crystal display prepared by using the liquid crystal composition is important, $A^2$ preferably represents a 1,4-phenylene group or a tetrahydropyran-2,5-diyl group and more preferably represents a 1,4-phenylene group. When the drive voltage is important, $A^2$ preferably represents a 1,4-phenylene group or a tetrahydropyran-2,5-diyl group and more preferably represents a tetrahydropyran-2,5-diyl group. When the operation temperature range is important, in other words, when a high operation temperature range (high $T_{ni}$) is required, $A^2$ preferably represents a 1,4-cyclohexylene group or a tetrahydropyran-2,5-diyl group and more preferably represents a 1,4-cyclohexylene group. When $A^2$ represents a 1,4-phenylene group, at least one hydrogen atom in the benzene ring may be substituted with fluorine; however, the 1,4-phenylene group is preferably unsubstituted, mono-substituted, or di-substituted. When the 1,4-phenylene group is di-substituted, a 2,3-difluorobenzen is preferable.

In general formula (VI-d), $Z^1$ represents a single bond, —OCH$_2$—, —OCF$_2$—, —CH$_2$O—, or —CF$_2$O—. $Z^1$ preferably represents a single bond, —OCF$_2$—, or —CF$_2$O— and more preferably represents a single bond.

In general formula (VI-c), n represents 0 or 1. When response speed is important, n preferably represents 0. When the operation temperature range is important, in other words, when a high operation temperature range is required, n preferably represents 1.

In general formulae (VI-a) to (VI-d), $R^{6a}$ to $R^{6h}$ correspond to $R^{X1}$ and $R^{X2}$ in general formula (6). Thus, naturally, the alkyl group, the alkenyl group, the alkoxy group, or the alkenyloxy group is preferably linear or branched and more preferably linear.

In particular, compounds represented by general formulae (VI-d-1) to (VI-d-12) below are preferable as the compound represented by general formula (VI-d) according to the present invention:

[Chem. 76]

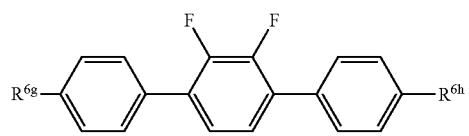

(VI-d-1)

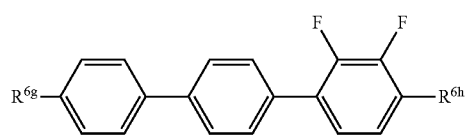

(VI-d-2)

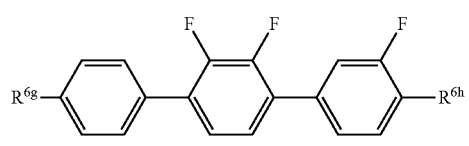

(VI-d-3)

-continued

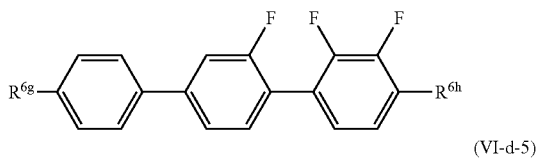 (VI-d-4)

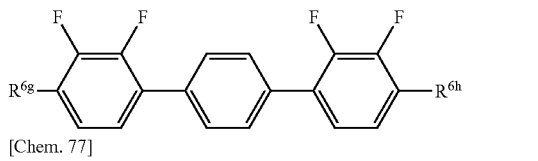 (VI-d-5)

[Chem. 77]

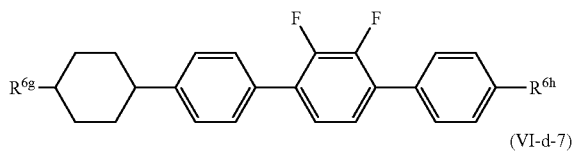 (VI-d-6)

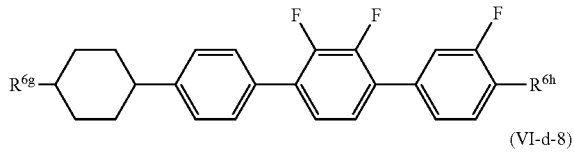 (VI-d-7)

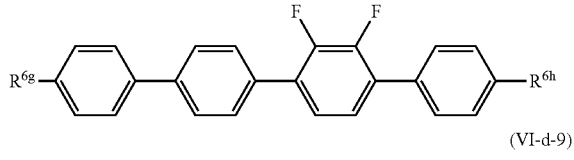 (VI-d-8)

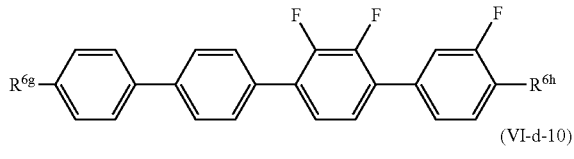 (VI-d-9)

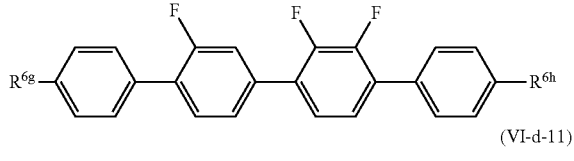 (VI-d-10)

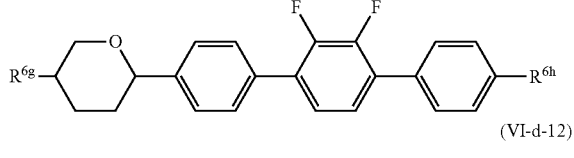 (VI-d-11)

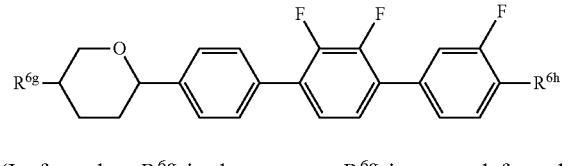 (VI-d-12)

(In formulae, $R^{6g}$ is the same as $R^{6g}$ in general formula (VI-d) and $R^{6h}$ is the same as $R^{6h}$ in general formula (VI-d).) Compounds represented by general formula (VI-d-1), general formula (VI-d-3) to general formula (VI-d-9), and general formula (VI-d-12) to general formula (VI-d-15) are more preferable, compounds represented by general formula (VI-d-1), general formula (VI-d-3), general formula (VI-d-5), general formula (VI-d-6), general formula (VI-d-9), general formula (VI-d-12), general formula (VI-d-13), and general formula (VI-d-15) are yet more preferable, compounds represented by general formula (VI-d-1), general formula (VI-d-5), and general formula (VI-d-6) are particularly preferable, and a compound represented by general formula (VId-5) is most preferable.

$R^{6g}$ and $R^{6h}$ in general formula (VI-d) (including general formulae (VI-d-1) to (VI-d-12)) according to the present invention each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably each independently represent an alkyl group having 1 to 8 carbon atoms or an alkenyl group having 2 to 8 carbon atoms, more preferably each independently represent an alkyl group having 2 to 5 carbon atoms or an alkenyl group having 2 to 5 carbon atoms, and yet more preferably each independently represent an alkyl group having 2 to 5 carbon atoms, and are preferably linear. When both $R^{6g}$ and $R^{6h}$ are alkyl groups, the numbers of carbon atoms thereof are preferably different from each other.

In further detail, a compound with $R^{6g}$ representing a propyl group and $R^{6h}$ representing an ethyl group or a compound with $R^{6g}$ representing a butyl group and $R^{6h}$ representing an ethyl group is preferred.

In particular, compounds represented by formula (6.44) to formula (6.55) are preferable as the compound represented by general formula (VI-d-1) according to the present invention.

[Chem. 78]

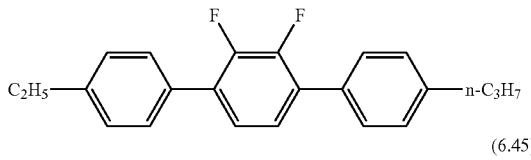 (6.44)

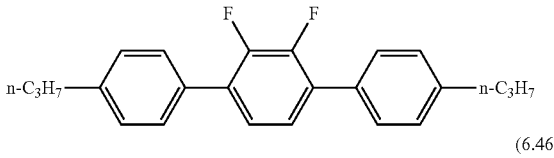 (6.45)

(6.46)

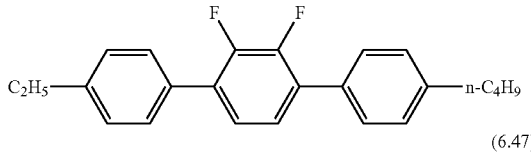 (6.47)

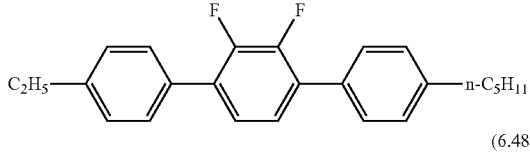 (6.48)

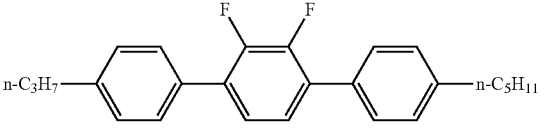

-continued

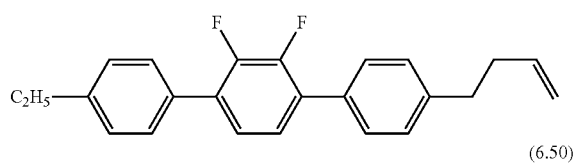
(6.49)

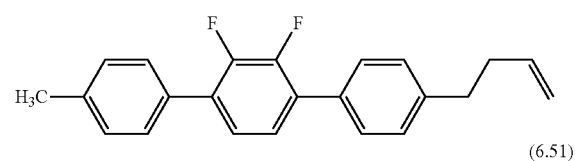
(6.50)

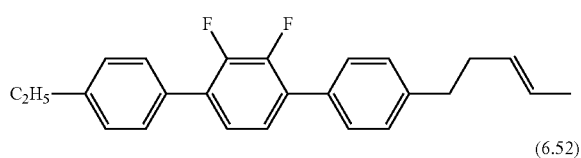
(6.51)

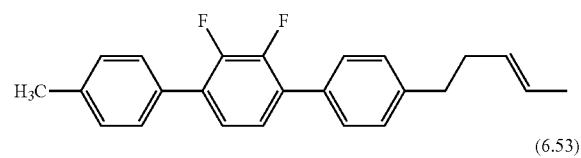
(6.52)

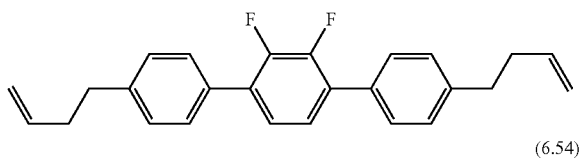
(6.53)

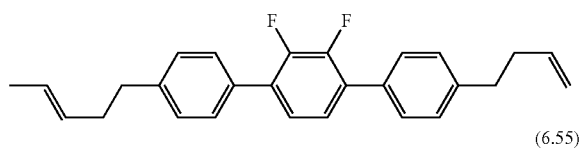
(6.54)

(6.55)

Among the compounds represented by general formula (6) according to the present invention, a compound selected from the group consisting of compounds represented by general formula (VI-a), general formula (VI-c), formula (6.1), formula (6.3), formula (6.5), formula (6.28), formula (6.29), formula (6.30), formula (6.31), formula (6.44), and formula (6.46) is more preferable. A compound selected from the group consisting of compounds represented by general formula (VIa), general formula (VI-c), formula (6.1), formula (6.3), formula (6.28), formula (6.29), formula (6.30), formula (6.31), formula (6.44), and formula (6.46) is yet more preferable.

A particularly preferable embodiment of the sixth component according to the present invention is a mixture of one to three compounds selected from the group consisting of compounds represented by general formula (VI-a), general formula (VI-c), formula (6.1), formula (6.3), formula (6.5), formula (6.28), formula (6.29), formula (6.30), formula (6.31), formula (6.44), and formula (6.46). The mass ratio of the whole sixth component according to the present invention relative to the entire liquid crystal composition is particularly preferably 20 to 32% by mass.

The liquid crystal composition according to the present invention may further contain a seventh component which is at least one selected from compounds represented by general formula (VII-A) and general formula (VIII-B) below:

[Chem. 79]

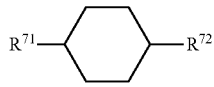
(VII-A)

(In general formula (VII-A), $R^{71}$ and $R^{72}$ each independently represent a linear alkyl group having 1 to 10 carbon atoms, a linear alkoxy group having 1 to 10 carbon atoms, or a linear alkenyl group having 2 to 10 carbon atoms.)

[Chem. 80]

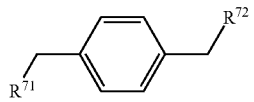
(VII-B)

(In general formula (VII-B), $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms as in general formula (VII-A) described above.)

It is particularly preferable to add the compounds represented by general formula (VII-A) and (VII-B) to the liquid crystal composition from the viewpoint of obtaining a liquid crystal composition having low viscosity.

As with the first component and the second component described above as the essential components, etc., the content of the seventh component in the liquid crystal composition according to the present invention is appropriately selected not only in relation to the operational mode and purpose of use of the liquid crystal composition but also in relation to other components; thus, the preferable range of the fourth component content in the liquid crystal composition is preferably independent from one embodiment to another.

The lower limit of the seventh component content in the liquid crystal composition according to the present invention relative to the total amount (100% by mass) of the liquid crystal composition of the present invention is, for example, preferably 1% by mass in one embodiment of the present invention, preferably 10% by mass in another embodiment of the present invention, preferably 20% by mass in another embodiment of the present invention, preferably 30% by mass in another embodiment of the present invention, preferably 40% by mass in another embodiment of the present invention, preferably 50% by mass in another embodiment of the present invention, preferably 55% by mass in another embodiment of the present invention, preferably 60% by mass in another embodiment of the present invention, preferably 65% by mass in another embodiment of the present invention, preferably 70% by mass in another embodiment of the present invention, preferably 75% by mass in another embodiment of the present invention, and preferably 80% by mass in another embodiment of the present invention.

The upper limit of the seventh component content in the liquid crystal composition according to the present invention relative to the total amount (100% by mass) of the liquid crystal composition of the present invention is, for example, preferably 95% by mass in one embodiment of the present invention, preferably 85% by mass in another embodiment of the present invention, preferably 75% by mass in another embodiment of the present invention, preferably 65% by mass in another embodiment of the present invention, preferably 55% by mass in another embodiment of the present invention, preferably 45% by mass in another embodiment of the present invention, preferably 35% by mass in another embodiment of the present invention, and preferably 25% by mass in another embodiment of the present invention.

In the liquid crystal composition of the present invention, the content of the compound represented by general formula (VII-A) or (VII-B) needs to be appropriately adjusted in accordance with the desired properties, such as low-temperature solubility, transition temperature, electrical reliability, birefringence, process compatibility and dropping marks described below, ghosting, and dielectric anisotropy.

In order to keep the viscosity of the liquid crystal composition of the present invention at a low level and to increase the response speed of the liquid crystal composition, the lower limit is preferably high and the upper limit is preferably high. In order to keep Tni of the liquid crystal composition of the present invention at a high level and improve temperature stability of the liquid crystal composition, the lower limit is preferably high and the upper limit is preferably high. In order to keep the drive voltage at a low level and increase the dielectric anisotropy, the lower limit is preferably low and the upper limit is preferably low.

For the seventh component of the present invention, the number of compounds represented by general formula (VII-A) or (VII-B) used in combination is not particularly limited and an appropriate combination is selected based on desired properties such as low-temperature solubility, transition temperature, electrical reliability, and birefringence. As for the number of compounds represented by general formula (VII-A) or (VII-B) used as the seventh component, for example, one compound represented by general formula (VII-A) or (VII-B) is used as the seventh component in one embodiment. In another embodiment of the present invention, two compounds represented by general formula (VII-A) or (VII-B) are used as the seventh component. In another embodiment of the present invention, three compounds represented by general formula (VII-A) or (VII-B) are used as the seventh component. In another embodiment of the present invention, four compounds represented by general formula (VII-A) or (VII-B) are used as the seventh component. In another embodiment of the present invention, five compounds represented by general formula (VII-A) or (VII-B) are used as the seventh component. In another embodiment of the present invention, six compounds represented by general formula (VII-A) or (VII-B) are used as the seventh component. In another embodiment of the present invention, seven compounds represented by general formula (VII-A) or (VII-B) are used as the seventh component. In another embodiment of the present invention, eight compounds represented by general formula (VII-A) or (VII-B) are used as the seventh component. In another embodiment of the present invention, nine compounds represented by general formula (VII-A) or (VII-B) are used as the seventh component. In another embodiment of the present invention, ten or more compounds represented by general formula (VII-A) or (VII-B) are used as the seventh component.

The lower limit of the dielectric anisotropy (Δ∈) of the compound represented by general formula (VII-A) or (VII-B) according to the present invention is −1 in one embodiment, −0.9 in another embodiment, −0.8 in another embodiment, −0.7 in another embodiment, −0.5 in another embodiment, and −0.4 in another embodiment. The upper limit of the dielectric anisotropy (Δ∈) of the liquid crystal composition containing a compound represented by general formula (VII-A) or (VII-B) is +1 in one embodiment, +0.9 in another embodiment, +0.8 in another embodiment, +0.7 in another embodiment, +0.6 in another embodiment, and +0.5 in another embodiment.

In particular, compounds represented by formula (7.1) to formula (7.60) below are preferable as the compound represented by general formula (VII-A) according to the present invention.

[Chem. 81]

(7.1)

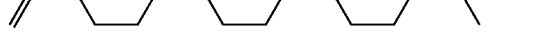
(7.2)

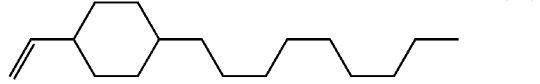
(7.3)

(7.4)

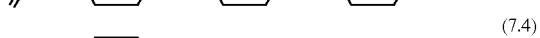
(7.5)

(7.6)

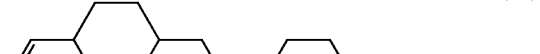
(7.7)

(7.8)

[Chem. 82]

(7.9)

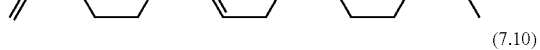
(7.10)

(7.11)

(7.12)

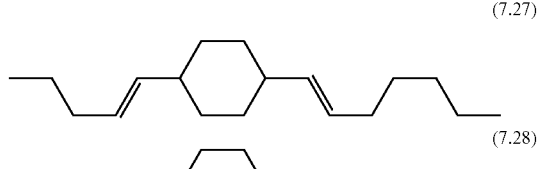
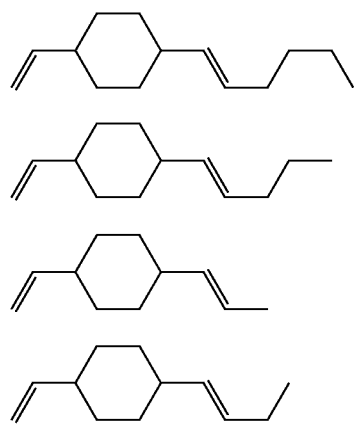

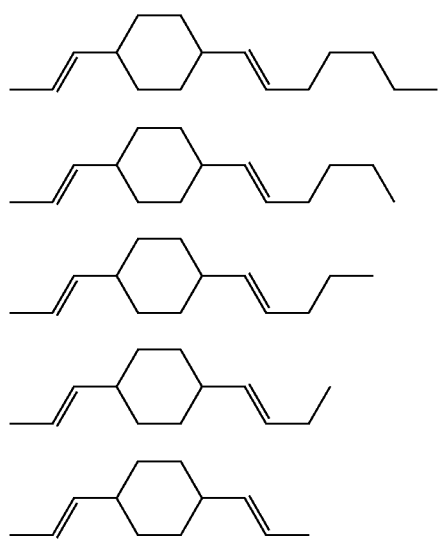
[Chem. 87]
[Chem. 88]
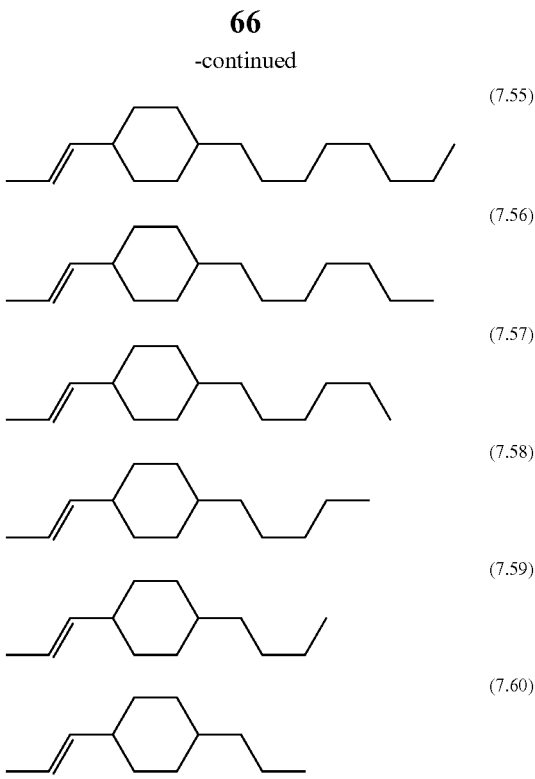
The compound represented by general formula (VII-B) according to the present invention is preferably at least one selected from the group consisting of formula (7.71) to formula (7.85).
[Chem. 89]

-continued

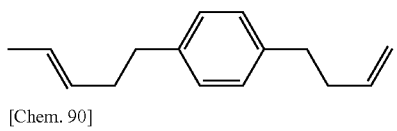
[Chem. 90]
(7.77)

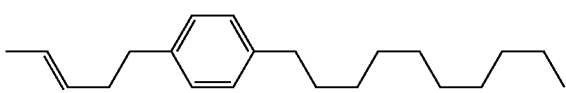
(7.78)

lesteric liquid crystals, a chelating agent, an antioxidant, a UV absorber, and a polymerizable monomer, in addition to the compounds serving as the first to seventh components described above. Of these other components, the antioxidant and the UV absorber are not particularly limited and may be any known antioxidant and UV absorber.

The liquid crystal composition according to the present invention preferably further contains a polymerizable monomer. The polymerizable monomer according to the present invention is preferably a difunctional monomer represented by general formula (8):

[Chem. 91]

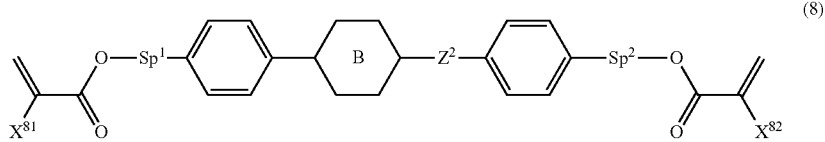
(8)

-continued

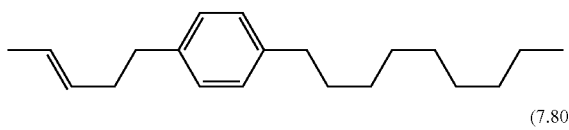
(7.79)

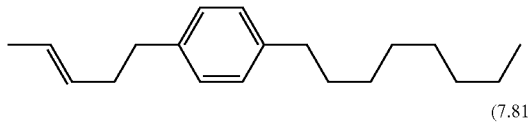
(7.80)

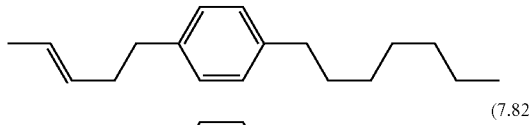
(7.81)

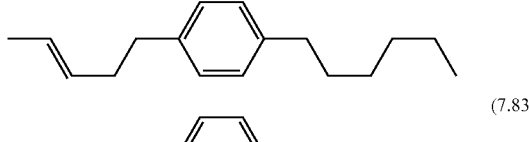
(7.82)

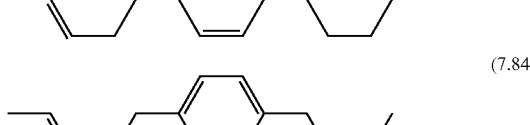
(7.83)

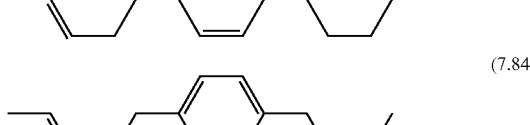
(7.84)

(7.85)

Among the compounds represented by general formulae (VII-A) and (VII-B) according to the present invention, compounds represented by formula (7.71) to formula (7.85) are more preferable.

The liquid crystal composition according to the present invention may further contain other components such as typical nematic liquid crystals, smectic liquid crystals, cho- (In general formula (8), $X^{81}$ and $X^{82}$ each independently represent a hydrogen atom or a methyl group, $Sp^1$ and $Sp^2$ each independently represent a single bond, an alkylene group having 1 to 8 carbon atoms, or —O—$(CH_2)_s$— (in the formula, s represents an integer of 1 to 7 and the oxygen atom is to bond to an aromatic ring), $Z^2$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (in the formula, $Y^1$ and $Y^2$ each independently represent a fluorine atom or a hydrogen atom), —C≡C—, or a single bond, and B represents a 1,4-phenylene group, a trans-1,4-cyclohexylene group, or a single bond and all of 1,4-phenylene groups in the formula may have any hydrogen substituted with a fluorine atom.)

The difunctional monomer represented by general formula (8) above is preferably a diacrylate derivative with $X^{81}$ and $X^{82}$ representing hydrogen atoms, a dimethacrylate derivative with $X^{81}$ and $X^{82}$ representing methyl groups, or a compound in which one of $X^{81}$ and $X^{82}$ represents a hydrogen group and the other of $X^{81}$ and $X^{82}$ represents a methyl group. As for the polymerization rate of these compounds, the diacrylate derivative is the fastest, the dimethacrylate derivative is the slowest, and the asymmetric compound is in the middle. A preferable one may be used depending on the usage. In a PSA display device, a dimethacrylate derivative is particularly preferable.

In general formula (8), $Sp^1$ and $Sp^2$ each independently represent a single bond, an alkylene group having 1 to 8 carbon atoms, or —O—$(CH_2)_s$—. For a PSA display device, at least one of $Sp^1$ and $Sp^2$ is preferably a single bond. A compound with both $Sp^1$ and $Sp^2$ representing single bonds or a compound with one of $Sp^1$ and $Sp^2$ representing a single bond and the other representing an alkylene group having 1 to 8 carbon atoms or —O—$(CH_2)_s$— is preferable. In such a case, an alkyl group having 1 to 4 is preferable and s is preferably 1 to 4.

In general formula (8), $Z^2$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and most preferably represents a single bond.

In general formula (8), B represents a 1,4-phenylene group which may have any hydrogen atom substituted with a fluorine atom, a trans-1,4-cyclohexylene group, or a single group, but preferably represents a 1,4-phenylene group or a single bond. When B represents a cyclic structure and not a single bond, a linking group other than a single bond is preferable as $Z^2$. When B represents a single bond, $Z^2$ is preferably a single bond.

The content of the polymerizable monomer represented by general formula (8) in the liquid crystal composition according to the present invention relative to the entire amount (100% by mass) of the liquid crystal composition is preferably 0.05 to 1% by mass, more preferably 0.1 to 0.5% by mass, yet more preferably 0.1 to 0.4% by mass, particularly preferably 0.1 to 0.3% by mass, and most preferably 0.15 to 0.3% by mass.

The polymerizable monomer content is preferably 0.1 to 0.3% by mass from the viewpoint of the balance between display properties and reliability of the liquid crystal display device.

From these perspectives, the following specific structures are preferable as the cyclic structure between Sp$^1$ and Sp$^2$ in general formula (8):

When B in general formula (8) represents a single bond and the cyclic structure is constituted by two rings, structures represented by formula (VIIIa-1) to formula (VIIIa-5) below are preferable as the cyclic structure:

[Chem. 92]

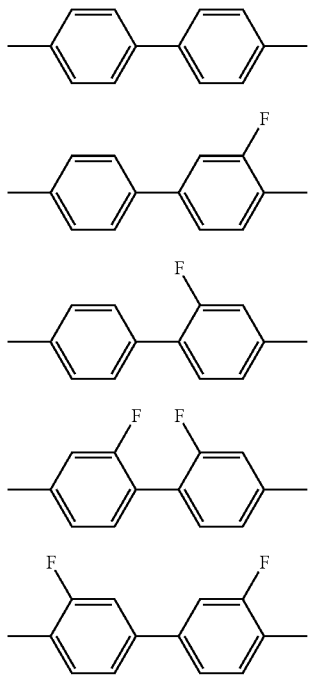

(VIIIa-1)

(VIIIa-2)

(VIIIa-3)

(VIIIa-4)

(VIIIa-5)

(In general formulae (VIIIa-1) to (VIIIa-5), each end bonds to Sp$^1$ or Sp$^2$). The structures represented by general formula (VIIIa-1) to formula (VIIIa-3) are more preferable and the structure represented by formula (VIIIa-1) is particularly preferable.

When a polymerizable monomer that includes such a skeleton is polymerized, the anchoring force thereof is optimum for a PSA-type liquid crystal display device and a good alignment state can be achieved. Thus, display non-uniformity is either suppressed or completely prevented.

Therefore, formula (8.1) to formula (8.4) are particularly preferable as the polymerizable monomer according to the present invention. Among these, formula (8.2) is most preferable.

[Chem. 93]

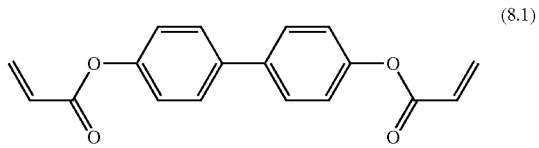

(8.1)

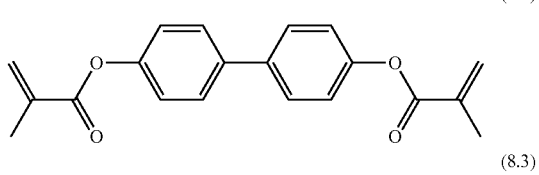

(8.2)

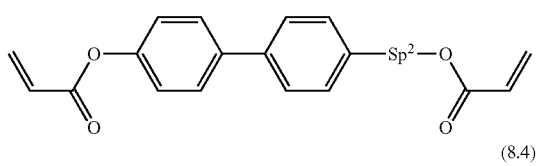

(8.3)

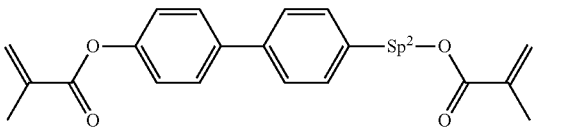

(8.4)

(In formulae (8.1) to (8.4), Sp$^2$ represents an alkylene group having 2 to 5 carbon atoms.)

In the case where a monomer is added to the liquid crystal composition of the present invention, polymerization takes place in the absence of a polymerization initiator. However, a polymerization initiator may be added to accelerate polymerization. Examples of the polymerization initiator include benzoin ethers, benzophenones, acetophenones, benzyl ketals, and acylphosphine oxides. A stabilizer may be added to improve the storage stability. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds.

The liquid crystal composition according to the present invention and/or the liquid crystal composition containing a polymerizable monomer was confirmed to be effective for suppressing dropping marks. The "dropping marks" are defined as a phenomenon in which traces of dropping a liquid crystal composition appear white when black display is performed. Descriptions of dropping marks are briefly provided below.

Due to expanding usage of liquid crystal devices in recent years, use of liquid crystal devices and methods for producing liquid crystal devices have changed significantly and, in order to meet these changes, properties other than basic physical values known in the art are also required to be optimized. In other words, for example, VA-type and IPS-type liquid crystal display devices that use liquid crystal compositions have come to be used widely and 50" or larger super large size display devices are now used. With the increase in substrate size, the mainstream method for injecting a liquid crystal composition into a substrate has shifted from a conventional vacuum injection method to a one-drop-fill method (ODF) (refer to Japanese Unexamined Patent Application Publication No. 6-235925). As a result, a problem of display quality degradation caused by dropping marks that occur when a liquid crystal composition is dropped onto a substrate has surfaced. Furthermore, polymer-stabilized (PS) liquid crystal display devices and polymer-sustained alignment (PSA) liquid crystal display devices have been developed, in which a liquid crystal material in a liquid crystal display device is given a pretilt angle and response speed is increased (refer to Japanese Unexamined Patent Application Publication No. 2002-357830), thereby making the problem of dropping marks more notable.

That is, a PS or PSA display device is characterized in that a monomer is added to a liquid crystal composition and the monomer in the composition is cured. A liquid crystal composition for an active matrix can use only a particular compound due to a necessity of maintaining a high voltage holding ratio, and use of compounds containing ester bonds is limited. Monomers used in PSA liquid crystal display devices are mainly acrylate-based monomers and are usually compounds having ester bonds. Such compounds are not usually used as a liquid crystal compound for an active matrix (refer to Japanese Unexamined Patent Application Publication No. 2002-357830). Such foreign matter induces occurrence of dropping marks, and degradation in yield of liquid crystal display devices caused by display failure has become problem. Degradation in yield is also a problem when additives such as an antioxidant and a light absorber are added to the liquid crystal composition.

For suppressing dropping marks, a method has been disclosed in which a polymerizable monomer added to a liquid crystal composition is polymerized to form a polymer layer in a liquid crystal phase layer so as to suppress dropping marks that occur in relation to the alignment control film (Japanese Unexamined Patent Application Publication No. 2006-58755). However, according to this method, ghosting occurs due to the polymerizable monomer added to the liquid crystal and the effect of suppressing dropping marks is insufficient. Accordingly, a liquid crystal display device that maintains basic properties of a liquid crystal display device and does not suffer from ghosting or occurrence of dropping marks has been desired.

A liquid crystal composition containing a polymerizable monomer according to the present invention (hereinafter the composition may be referred to as a "polymerizable monomer-containing liquid crystal composition") is useful for a liquid crystal display device, in particular, a liquid crystal display device for active matrix drive. The liquid crystal composition can be used in PSA-mode, PSVA-mode, VA-mode IPS-mode, or ECB-mode liquid crystal display devices.

The polymerizable monomer-containing liquid crystal composition of the present invention acquires a liquid crystal alignment property as the polymerizable monomer contained therein is polymerized under UV irradiation and is used in liquid crystal display device in which the amount of transmitting light is controlled through birefringence of the liquid crystal composition. An active matrix liquid crystal display device (AM-LCD), a nematic (TN) liquid crystal display device, a super twisted nematic liquid crystal device (STN-LCD), an OCB-LCD, and an in-plane switching liquid crystal display device (IPS-LCD) are examples of liquid crystal display devices for which the liquid crystal composition is useful. The liquid crystal composition is particularly useful for AM-LCD and can be used in liquid crystal display device of a transmission type or a reflection type.

Referring to the contents of FIGS. 1 to 4 and the liquid crystal display device described below, two substrates 2 and 8 of a liquid crystal cell used in a liquid crystal display device can be composed of glass or a flexible transparent material such as a plastic. One of the two substrates may be composed of an opaque material such as silicon. Transparent substrates 2 and 8 having transparent electrodes (layers) 6 and 14 can be obtained by, for example, sputter-depositing indium tin oxide (ITO) on the transparent substrates 2 and 8 such as glass plates.

The substrates 2 and 8 on which the transparent electrodes (layers) and TFTs are formed are arranged so that the transparent electrodes (layers) 6 and 14 are on the inner side. Here, spacers (not shown) may be used to adjust the distance between the substrates. It is preferable to adjust the thickness of a light-adjusting layer obtained to be within the range of 1 to 100 µm and more preferably within the range of 1.5 to 10 µm (refer to FIGS. 1 to 4).

In the cases where a polarizing plate is used, the product of the cell thickness d and the refractive index anisotropy Δn of liquid crystals is preferably adjusted to maximize the contrast. When two polarizing plates 1 and 9 are provided, the polarization axis of each polarizing plate can be adjusted so as to improve viewing angle and contrast (refer to FIGS. 1 to 4). Furthermore, a phase difference film for widening the viewing angle can also be used. Examples of the spacers include glass particles, plastic particles, alumina particles, and a photoresist material. Then a sealing agent such as an epoxy-based thermosetting composition is applied to the substrate by screen printing while forming a liquid crystal inlet port. The substrates are then bonded to each other and heated to thermally cure the sealing agent.

The method with which a polymerizable monomer-containing liquid crystal composition is introduced into a liquid crystal composition housing space that houses the liquid crystal composition and thus is formed by bonding the two substrates arranged to oppose each other may be a typical vacuum injection method or an ODF method, for example. Although dropping marks do not occur when a vacuum injection method of introducing the polymerizable monomer-containing liquid crystal composition is employed, the trace of injection still remains as a problem. The present invention is suitable to be used in producing a display device by an ODF method.

The method with which the polymerizable monomer according to the present invention is polymerized is preferably a method that includes polymerizing the monomer by applying one or more active energy rays, such as ultraviolet light and electron beams, either simultaneously or sequentially. This is because an appropriate degree of polymerization rate is desirable in order for the liquid crystals to achieve desirable alignment properties. In the case where ultraviolet light is used, a polarized light source or a non-polarized light source may be used. Moreover, when polymerization is conducted while the polymerizable monomer-containing liquid crystal composition is interposed between two substrates, at least the irradiation-side substrate must have an appropriate degree of transparency with respect to the active energy ray. Alternatively, after only a particular portion is polymerized by using a mask during irradiation with light, the alignment state of the unpolymerized portion may be changed by changing conditions such as an electric field, a magnetic field, or a temperature so as to change the alignment state of the unpolymerized portion, and then an active energy ray may be applied to carry out polymerization. In particular, when UV exposure is performed, it is preferable to perform UV exposure while applying an alternating electric field to the polymerizable monomer-containing liquid crystal composition. The alternating electric field applied is preferably at a frequency of 10 Hz to 10 kHz and more preferably at a frequency of 60 Hz to 10 kHz. The voltage is selected in accordance with the desired pretilt angle of the liquid crystal display device. In other words, the pretilt angle of the liquid crystal display device can be controlled by the application voltage. In an MVA-mode liquid crystal display device, the pretilt angle is preferably controlled to 80° to 89.9° from the viewpoints of alignment stability and contrast.

The temperature at which the active energy ray such as ultraviolet light or an electron beam is applied is preferably within the temperature range in which the liquid crystal composition of the present invention retains a liquid crystal state. Polymerization is preferably carried out at a temperature close to room temperature, in other words, typically at 15° C. to 35° C. A metal halide lamp, a high-pressure mercury lamp, a super high-pressure mercury lamp, or the like can be used as the lamp that generates ultraviolet light. The wavelength of the ultraviolet light is preferably outside the absorption wavelength region of the liquid crystal composition and, if needed, a particular wavelength portion of the UV light may be cut. The intensity of ultraviolet light applied is preferably 0.1 mW/cm$^2$ to 100 W/cm$^2$ and more preferably 2 mW/cm$^2$ to 50 W/cm$^2$. The energy of the ultraviolet light for irradiation can be appropriately controlled but is preferably 10 mJ/cm$^2$ to 500 J/cm$^2$ and more preferably 100 mJ/cm$^2$ to 200 J/cm$^2$. The intensity may be varied during irradiation with ultraviolet light. The time for which ultraviolet light is applied is appropriately selected in accordance with the intensity of ultraviolet light to be irradiated and is preferably 10 to 3600 seconds and more preferably 10 to 600 seconds.

The compounds represented by general formula (1) and general formula (2) are essential for the liquid crystal composition of the present invention. A more preferable embodiment of the liquid crystal composition can further contain at least one selected from the group consisting of compounds represented by general formula (3), general formula (4), general formula (5), general formula (6), general formula (VII-A), general formula (VII-B), and general formula (8). In such a case, the contents are preferably as follows.

In the case where the liquid crystal composition according to the present invention contains compounds represented by general formula (1) and general formula (2), the total content of these compounds is preferably 5 to 40% by mass, more preferably 10 to 35% by mass, yet more preferably 11 to 34% by mass, still more preferably 12 to 34% by mass, and most preferably 15 to 34% by mass. In particular, when the first component represented by chemical formula (1) above is constituted by one compound, the content of the compounds represented by general formula (1) and general formula (2) in the liquid crystal composition according to the present invention is more preferably 10 to 30% by mass, yet more preferably 10 to 25% by mass, still more preferably 13 to 23% by mass, and most preferably 15 to 22% by mass.

When the liquid crystal composition according to the present invention contains compounds represented by general formula (1), general formula (2), and general formula (3), the total content of these compounds is preferably 10 to 50% by mass, more preferably 15 to 42% by mass, yet more preferably 15 to 40% by mass, still more preferably 20 to 40% by mass, and most preferably 22 to 40% by mass.

When the liquid crystal composition according to the present invention contains compounds represented by general formula (1), general formula (2), and general formula (4), the total content of these compounds is preferably 15 to 50% by mass, more preferably 20 to 45% by mass, yet more preferably 22 to 42% by mass, still more preferably 23 to 40% by mass, and most preferably 25 to 34% by mass.

When the liquid crystal composition according to the present invention contains compounds represented by general formula (1), general formula (2), and general formula (5), the total content of these compounds is preferably 30 to 75% by mass, more preferably 35 to 70% by mass, yet more preferably 40 to 65% by mass, still more preferably 45 to 65% by mass, and most preferably 50 to 65% by mass.

When the liquid crystal composition according to the present invention contains compounds represented by general formula (1), general formula (2), and general formula (6), the total content of these compounds is preferably 30 to 70% by mass, more preferably 30 to 65% by mass, yet more preferably 35 to 63% by mass, still more preferably 40 to 62% by mass, and most preferably 45 to 61% by mass.

When the liquid crystal composition according to the present invention contains compounds represented by general formula (1), general formula (2), general formula (3), and general formula (4), the total content of these compounds is preferably 15 to 70% by mass, more preferably 20 to 55% by mass, yet more preferably 25 to 50% by mass, still more preferably 30 to 45% by mass, and most preferably 32 to 42% by mass.

When the liquid crystal composition according to the present invention contains compounds represented by general formula (1), general formula (2), general formula (3), and general formula (5), the total content of these compounds is preferably 35 to 80% by mass, more preferably 40 to 77% by mass, yet more preferably 45 to 75% by mass, still more preferably 50 to 74% by mass, and most preferably 55 to 73% by mass.

When the liquid crystal composition according to the present invention contains compounds represented by general formula (1), general formula (2), general formula (3), general formula (4), general formula (5), and general formula (6), the total content of these compounds is preferably 94 to 100% by mass, more preferably 95 to 100% by mass, and most preferably 98 to 100% by mass.

When the liquid crystal composition according to the present invention contains compounds represented by general formula (1), general formula (2), general formula (3), general formula (4), general formula (5), general formula (6), and a polymerizable monomer represented by general formula (8), the total content of these compounds is preferably 95 to 100% by mass and most preferably 98 to 100% by mass.

Among the compounds that constitute the liquid crystal composition according to the present invention, compounds each having two or more fluorine atoms in a molecule, that is, the compounds represented by general formulae (1), (2), (4), and (6) to be more specific, preferably account for 40 to 90% by mass, more preferably 45 to 85% by mass, and most preferably 50 to 80% by mass of the liquid crystal composition. In particular, these compounds preferably account for 50% by mass to 60% by mass if the response speed is important and 55 to 80% by mass if the drive voltage is important.

Figure 2:
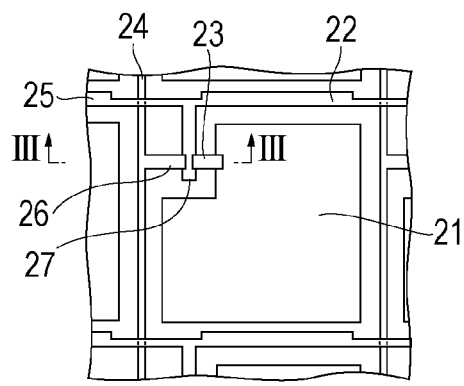
FIG. 2 is an enlarged plan view of a region surrounded by line II in an electrode 3 that includes thin film transistors formed on a substrate in FIG. 1.
Figure 3:
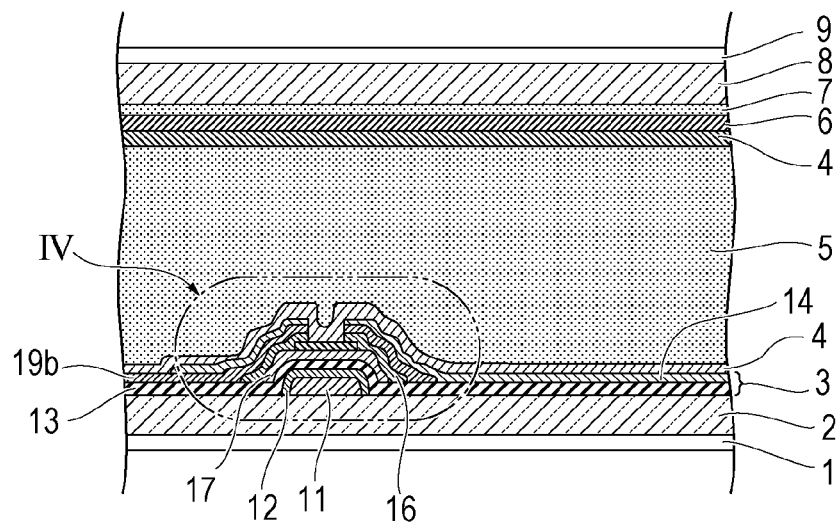
FIG. 3 is a cross-sectional view of the liquid crystal display device shown in FIG. 1 taken along line III-III in FIG. 2.
Figure 4:
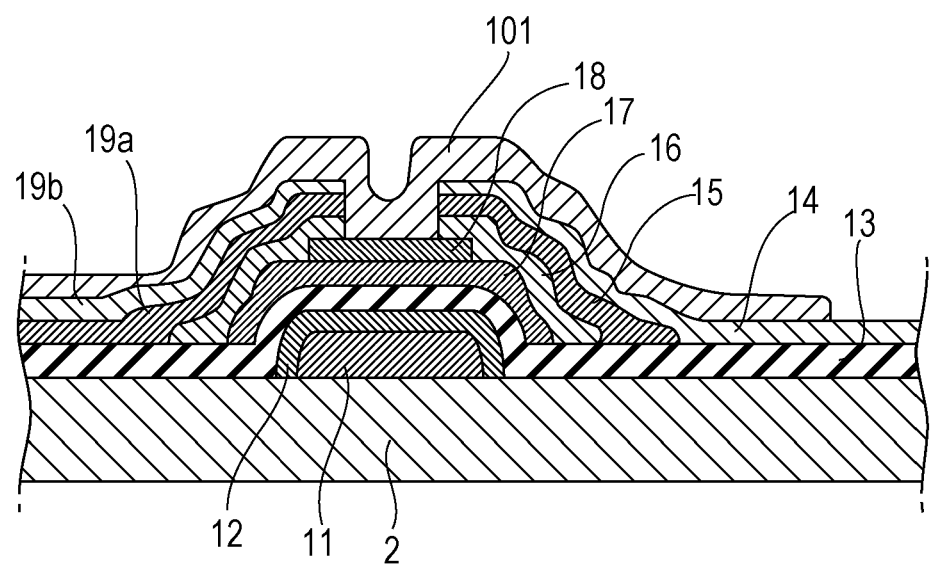
FIG. 4 is an enlarged view of a thin film transistor in a region IV in FIG. 3.

A second aspect of the present invention provides a liquid crystal display device that uses the liquid crystal composition according to the present invention. FIG. 1 is a schematic diagram showing a structure of a liquid crystal display device. For the sake of convenience, the constitutional elements in FIG. 1 are illustrated as being separated from each other. FIG. 2 is an enlarged plan view of a region surrounded by line II in an electrode layer 3 (also referred to as a thin film transistor layer 3) that includes thin film transistors formed on a substrate in FIG. 1. FIG. 3 is a cross-sectional view of the liquid crystal display device shown in FIG. 1 taken along line III-III in FIG. 2. FIG. 4 is an enlarged view of a thin film transistor in a region IV in FIG. 3. The liquid crystal display device according to the present invention will now be described with reference to FIGS. 1 to 4.

A structure of a liquid crystal display device 10 according to the present invention is characterized by including, as illustrated in FIG. 1, a first substrate 8 that includes a transparent electrode (layer) 6 (also referred to as a common electrode 6) composed of a transparent conductive material; a second substrate 2 that includes a thin film transistor layer 3 that includes pixel electrodes composed of a transparent conductive material and thin film transistors for controlling the pixel electrodes and respectively disposed on pixels; and a liquid crystal composition (or a liquid crystal layer 5) interposed between the first substrate 8 and the second substrate 2. In the liquid crystal display device, liquid crystal molecules in the liquid crystal composition align substantially perpendicular to the substrates 2 and 8 in the absence of applied voltage. The liquid crystal composition of the present invention described above is used as the liquid crystal composition. As shown in FIGS. 1 and 3, the second substrate 2 and the first substrate 8 may be sandwiched by a pair of polarizing plates 1 and 9. Moreover, in FIG. 1, a color filter 7 is provided between the first substrate 8 and the common electrode 6. A pair of alignment films 4 may be disposed on the surfaces of the paired transparent electrodes (layers) 6 and 14 so as to be adjacent to the liquid crystal layer 5 and directly contact the liquid crystal composition constituting the liquid crystal layer 5.

In other words, the liquid crystal display device 10 according to the present invention has a structure in which the following parts are sequentially stacked: the second polarizing plate 1, the second substrate 2, the thin-film-transistor-containing electrode layer (also referred to as a thin film transistor layer) 3, the alignment film 4, the layer 5 containing a liquid crystal composition, the alignment film 4, the common electrode 6, the color filter 7, the first substrate 8, and the first polarizing plate 9.

As illustrated in FIGS. 2 and 3, the electrode layer 3 that includes thin film transistors formed on a surface of the second substrate 2 has gate lines 25 for supplying scanning signals and data lines 24 for supplying display signals that intersect each other. Pixel electrodes 21 are formed in regions surrounded by the gate lines 25 and data lines 24 so as to configure a matrix. A switch element that supplies a display single to a pixel electrode 21 is a thin film transistor connected to the pixel electrode 21. The thin film transistor is disposed near the intersection of the gate line 25 and the data line 24 and includes a source electrode 26, a drain electrode 23, and a gate electrode 27. A storage capacitor 22 for storing a display signal supplied through the data line 24 is disposed in a region surrounded by the gate lines 25 and the data lines 24.

The present invention is suitable for use in a liquid crystal display device with inverted-staggered-type TFTs as shown in FIG. 2 and the gate lines 25 and the data lines 24 are preferably metal films and more preferably aluminum lines. Moreover, the gate lines 25 and the data lines 24 overlap each other with a gate insulating film therebetween.

The color filter 7 preferably has a black matrix (not shown) in a portion corresponding to the storage capacitors 22 and thin film transistors from the viewpoint of preventing leakage of light.

As shown in FIGS. 3 and 4, a preferable embodiment of a thin film transistor structure of the liquid crystal display device according to the present invention includes, for example, a gate electrode 11 formed on a surface of the second substrate 2, a gate insulating layer 13 disposed to cover substantially the whole surface of the second substrate 2, a semiconductor layer 17 formed on a surface of the gate insulating layer 13 so as to oppose the gate electrode 11, a protective film 18 disposed to cover a part of a surface of the semiconductor layer 17, a drain electrode 15 that covers one of the side end portions of the semiconductor layer 17 and that of the protective film 18 and makes contact with the gate insulating layer 13 formed on the surface of the second substrate 2, source electrodes 19a and 19b that cover the other side end portions of the semiconductor layer 17 and that of the protective film 18 and makes contact with the gate insulating layer 13 formed on the surface of the second substrate 2, a transparent electrode 14 that covers the source electrodes 19a and 19b and disposed to cover substantially the whole surface of the gate insulating layer 13 by extending along the gate insulating layer 13, and a protective layer 101 (not shown in FIG. 3) that covers a portion of the transparent electrode 14 and the source electrodes 19a and 19b.

As shown in FIGS. 3 and 4, an anodic oxide coating 12 may be formed on the surface of the gate electrode 11 so as to eliminate the step difference with the gate electrode, for example. An ohmic contact layer 16 may be provided between the semiconductor layer 17 and the drain electrode 15 to decrease the width and/or height of the Schottky barrier.

As described above, in the process of producing a liquid crystal display device, occurrence of dropping marks is significantly affected by the liquid crystal material injected; however, the structure of the liquid crystal display device also affects occurrence of dropping marks. In particular, the color filter 7 or the thin film transistors formed in the liquid crystal display device are separated from the liquid crystal composition only by a thin alignment film 4 or transparent electrodes 6 and 14, etc., as shown in FIG. 3. Accordingly, occurrence of dropping marks is affected by the combination of the liquid crystal compound having a particular chemical structure and the chemical structure of the pigments used in the color filter 7 or the chemical structure of the color filter resin, for example.

In particular, when inverted-staggered-type thin film transistors are used as thin film transistors of the liquid crystal display device according to the present invention, the drain electrode 15 is formed so as to cover the gate electrode 11 and thus the area of the drain electrode 15 tends to be large. In general, a drain electrode is composed of a metal material such as copper, aluminum, chromium, titanium molybdenum, or tantalum and usually subjected to a passivation treatment. However, for example, as shown in FIGS. 3 and 4, the protective film 18 and the alignment film 4 are usually thin and thus are highly likely to allow ionic substances to pass through. Accordingly, it has been difficult to avoid occurrence of dropping marks caused by interactions between the metal material and the liquid crystal composition.

However, in a liquid crystal display device containing a liquid crystal composition according to the present invention, parts of the liquid crystal display device are delicately balanced with the surface free energy or the absorption energy of the liquid crystal composition according to the present invention, and thus, possibly, the problem of occurrence of the dropping marks can be minimized.

A liquid crystal display device that uses a liquid crystal composition according to the present invention is useful since it achieves both high-speed response and suppression of display failures. The liquid crystal display device is particularly useful as an active matrix drive-liquid crystal display device and can be applied to VA mode, PSVA mode, PSA mode, IPS mode, and ECB mode devices.

EXAMPLES

The present invention will now be described in further detail through Examples described below which do not limit the scope of the invention. Regarding compositions of Examples and Comparative Example below, "%" means "% by mass". Properties measured and evaluation conducted in Examples are as follows.

(Properties of Liquid Crystal Composition)

Tni: nematic phase-isotropic liquid phase transition temperature (° C.)

Δn: refractive index anisotropy at 25° C.

Δ∈: dielectric anisotropy at 25° C.

η: viscosity (mPa·s) at 20° C.

$\gamma_1$: rotational viscosity (mPa·s) at 25° C.

Initial voltage holding ratio (initial VHR): voltage holding ratio (%) at a frequency of 6 Hz and applied voltage of 5 V at 343 K VHR after heat test: A test element group (TEG) for evaluating electroptic properties enclosing a liquid crystal composition sample was retained in a 130° C. constant-temperature oven for 1 hour and measurement was then conducted under the same measurement conditions as VHR described above.

(Evaluation of Ghosting)

A particular fixed pattern was displayed in a display area for a particular test time of 1000 hours and then a uniform display was conducted in all parts of the screen. The test time taken for the afterimage of the fixed pattern to reach an unacceptable afterimage level was measured to evaluate ghosting of the liquid crystal display device.

1) The test time referred here is the time for which the fixed pattern was displayed. The longer the test time, the more the occurrence of afterimage is suppressed and the higher the performance.

2) The unacceptable afterimage level is the level at which afterimage that renders a product a fail in a shipping test. The level was evaluated according to the following four-stage scales by visual observation.

Example

The longer the test time, the higher the performance.
Sample A: 1000 hours
Sample B: 500 hours
Sample C: 200 hours
Sample D: 100 hours
Performance: A>B>C>D (Evaluation of Dropping Marks)

Dropping marks in the liquid crystal display device was evaluated by observing white dropping marks that appeared when black display was performed in all parts of the screen. Evaluation was based on the following five-stage scale.

5: No dropping marks (Excellent)
4: Very faint dropping marks were observed but were at an acceptable level (Good)
3: Faint dropping marks were observed and were at the border line between fail and pass (Pass under some conditions)
2: Dropping marks were apparent and at an unacceptable level (Fail)
1: Extensive dropping marks were observed (Poor)

(Evaluation of Process Compatibility)

The process compatibility was evaluated as follows. In an ODF process, liquid crystals were dropped 50 pL at a time by using a constant volume pump. The mass of the liquid crystals dropped by a hundred times of dropping operations was measured every hundred times of dropping (0 to 100th dropping, 101st to 200th dropping, 201st to 300th dropping, etc.). The number of times dropping was performed until the variation in mass reached a level not compatible with the ODF process was counted and evaluation was conducted based on this number.

Example

The larger the number of times of dropping, the longer the time for which dropping can be stably performed and the higher the process compatibility.
Sample A: 95000 times
Sample B: 40000 times
Sample C: 100000 times
Sample D: 10000 times
Performance: C>A>B>D (Evaluation of Low-Temperature Solubility)

The low-temperature solubility was evaluated as follows. After a liquid crystal composition was prepared, 1 g of the liquid crystal composition was weighed in a 2 mL sample jar, placed in a temperature-control test vessel, and subjected to a temperature cycle of "−20° C. (held for 1 hour)→heating (0.1° C./min)→0° C. (held for 1 hour)→heating (0.1° C./min)→20° C. (retained for 1 hour)→cooling (−0.1° C./min)→0° C. (held for 1 hour)→cooling (−0.1° C./min)→−20° C.". Occurrence of precipitates from the liquid crystal composition was visually observed and the test time at which precipitates were observed was measured.

Example

The longer the test time, the longer the time the liquid crystal phase is stably retained and the higher the low-temperature solubility.
Sample A: 72 hours
Sample B: 600 hours
Sample C: 384 hours
Sample D: 1440 hours
Performance: D>B>C>A (Evaluation of Volatility and Production Facility Contamination Property)

The volatility of the liquid crystal composition was evaluated while visually observing foaming of the liquid crystal composition and studying the operation state of a vacuum stirring defoaming mixer with a strobe scope. In particular, 0.8 kg of the liquid crystal composition was placed in a special container of a vacuum stirring defoaming mixer with a capacity of 2.0 L and the vacuum stirring defoaming mixer was driven at a vacuum of 4 kPa, a revolution velocity of 15S-1, and a rotating velocity of 7.5S-1. The time taken until start of foaming was measured.

The longer the time taken until start of forming, the lower the possibility of contamination of the production facility and the higher the performance.

Example

Sample A: 200 seconds
Sample B: 45 seconds
Sample C: 60 seconds
Sample D: 15 seconds
Performance: A>C>B>D In Examples, the following abbreviations are used to described compounds:
(Side Chain)
-n -$CnH_{2n+1}$: linear alkyl group having n carbon atoms
—$O_n$ —$OC_nH_{2n+1}$: linear alkoxy group having n carbon atoms
—V —$C=CH_2$: vinyl group (Cyclic Structure)

[Chem. 94]

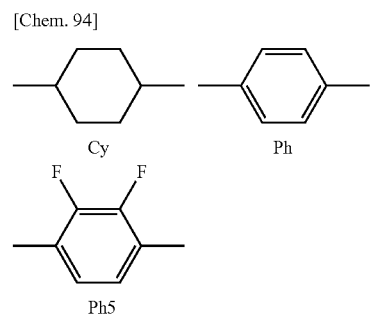

Examples and Comparative Example

Liquid crystal compositions having compositions shown in Tables 1 to 3 were prepared and the physical property values were measured. The results are shown in the tables below.

Liquid crystal compositions of Examples 1 to 18 and Comparative Example were used to make VA liquid crystal display devices shown in FIG. 1. Each liquid crystal display device had inverted-staggered-type thin film transistors as active elements. Injection of the liquid crystal composition was performed by a dropping method. Evaluation of ghosting, dropping marks, process compatibility, low-temperature solubility, and volatility was performed. The compositions and evaluation test results of Examples 1 to 18 and Comparative Example are shown in Tables 1 to 3. The polymerizable monomer (formula (8.2)) used in Examples 15 to 18 has the following chemical structure.

Note that the notes on the left side of the content are abbreviations of compounds.

TABLE 1

| | Sample name | Example 1 | Example 2 | Example 3 | Example 4 | Example 5 | Example 6 |
|---|---|---|---|---|---|---|---|
| Composition | 3-Cy-Cy-2 | 25 | 26 | 28 | 28 | 22 | 24 |
| | 3-Cy-Cy-4 | 11 | 11 | 9 | 9 | 12 | 11 |
| | 3-Cy-Ph-O1 | 7 | 6 | 6 | 6 | 7 | 6 |
| | 3-Cy-Ph5-O2 | 13 | 13 | 13 | 13 | 14 | 14 |
| | 2-Cy-Ph5-O2 | 5 | 5 | 5 | 5 | 6 | 9 |
| | 3-Cy-Ph-Ph5-O2 | 11 | 11 | 11 | 11 | 12 | 9 |
| | 3-Ph-Ph5-Ph-2 | 11 | 11 | 11 | 11 | 12 | 12 |
| | 3-Cy-Cy-Ph5-$O_3$ | 8 | | 8 | 8 | 7 | |
| | 4-Cy-Cy-Ph5-O2 | 9 | 9 | | 4 | 8 | 8 |
| | 3-Cy-Cy-Ph5-O5 | | 8 | | | | |
| | 3-Cy-Cy-Ph5-O4 | | | | | | |
| | 3-Cy-Cy-Ph5-O2 | | | | | | |
| | 4-Cy-Cy-Ph5-O4 | | | | 9 | 5 | |
| | 5-Cy-Cy-Ph5-O2 | | | | | | |
| | 5-Cy-Cy-Ph5-O5 | | | | | | 7 |
| | 2-Cy-Cy-Ph5-O2 | | | | | | |
| | 1-Cy-Cy-Ph5-O1 | | | | | | |
| | 4-Cy-Cy-Ph5-O5 | | | | | | |
| | 1-Cy-Cy-Ph5-O2 | | | | | | |
| | 2-Cy-Cy-Ph5-O3 | | | | | | |
| | Polymerizable monomer, formula (8.22) | | | | | | |
| Evaluation | $T_{NI}/°$ C. | 78.3 | 77.9 | 78.2 | 78.0 | 78.9 | 78.9 |
| | $n_e$ | 1.585 | 1.583 | 1.583 | 1.583 | 1.591 | 1.589 |
| | $n_o$ | 1.484 | 1.483 | 1.483 | 1.483 | 1.485 | 1.484 |
| | $\Delta n$ | 0.101 | 0.100 | 0.100 | 0.100 | 0.106 | 0.105 |
| | $\varepsilon_\parallel$ | 3.49 | 3.40 | 3.47 | 3.47 | 3.56 | 3.55 |
| | $\varepsilon_\perp$ | 6.08 | 5.97 | 6.13 | 6.10 | 6.31 | 6.24 |
| | $\Delta\varepsilon$ | -2.59 | -2.57 | -2.66 | -2.63 | -2.75 | -2.69 |
| | $\eta$/mPa·s | 18.8 | 18.3 | 18.1 | 18.2 | 19.9 | 19.6 |
| | $\gamma_1$/mPa·s | 137 | 138 | 137 | 135 | 144 | 146 |
| | $\gamma_1/\Delta n^2$ | 13.4 | 13.8 | 13.7 | 13.5 | 12.8 | 13.2 |
| | $\gamma_1/\Delta n^2/|\Delta\varepsilon|$ | 5.19 | 5.37 | 5.15 | 5.13 | 4.66 | 4.92 |

TABLE 1-continued

| Sample name | Example 1 | Example 2 | Example 3 | Example 4 | Example 5 | Example 6 |
|---|---|---|---|---|---|---|
| VHR (%) | 90 | 89 | 89 | 90 | 90 | 88 |
| VHR after heat test (%) | 88 | 86 | 86 | 87 | 88 | 85 |
| Ghosting (time) | 624 | 504 | 610 | 550 | 650 | 540 |
| Dropping marks | 5 | 5 | 5 | 5 | 5 | 4 |
| Process compatibility (100 times) | 1010 | 850 | 900 | 900 | 990 | 900 |
| Low-temperature solubility (time) | 672 | 548 | 676 | 700 | 624 | 568 |
| Volatility (sec) | 60 | 45 | 55 | 72 | 60 | 50 |

TABLE 2

| | Sample name | Example 7 | Example 8 | Example 9 | Example 10 | Example 11 | Example 12 | Example 13 |
|---|---|---|---|---|---|---|---|---|
| Composition | 3-Cy-Cy-2 | 24 | 24 | 20 | 24 | 24 | 24 | 21 |
| | 3-Cy-Cy-4 | 10 | 10 | 12 | 11 | 11 | 10 | 11 |
| | 3-Cy-Ph-O1 | 8 | 8 | 7 | 6 | 6 | 7 | 7 |
| | 3-Cy-Ph5-O2 | 13 | 13 | 10 | 14 | 14 | 13 | 10 |
| | 2-Cy-Ph-Ph5-O2 | 6 | 6 | 6 | 9 | 8 | 5 | 6 |
| | 3-Cy-Ph-Ph5-O2 | 12 | 12 | 12 | 9 | 9 | 10 | 12 |
| | 3-Ph-Ph5-Ph-2 | 12 | 12 | 12 | 12 | 14 | 10 | 12 |
| | 3-Cy-Cy-Ph5-O$_3$ | 7 | 7 | 6 | | | 8 | 6 |
| | 4-Cy-Cy-Ph5-O2 | | 3 | | 8 | 7 | 13 | |
| | 3-Cy-Cy-Ph5-O5 | | | | | | | |
| | 3-Cy-Cy-Ph5-O4 | | | | | | | |
| | 3-Cy-Cy-Ph5-O2 | | | | | | | |
| | 4-Cy-Cy-Ph5-O4 | 8 | 5 | | | | | |
| | 5-Cy-Cy-Ph5-O2 | | | | | | | |
| | 5-Cy-Cy-Ph5-O5 | | | | | | | |
| | 2-Cy-Cy-Ph5-O2 | | | 8 | | | | |
| | 1-Cy-Cy-Ph5-O1 | | | 7 | | | | |
| | 4-Cy-Cy-Ph5-O5 | | | | 7 | 7 | | |
| | 1-Cy-Cy-Ph5-O2 | | | | | | | 7 |
| | 2-Cy-Cy-Ph5-O3 | | | | | | | 8 |
| | Polymerizable monomer, formula (8.22) | | | | | | | |
| Evaluation | $T_{NI}$/° C. | 78.5 | 78.4 | 82.5 | 79.2 | 78.4 | 81.3 | 81.8 |
| | $n_e$ | 1.590 | 1.590 | 1.593 | 1.589 | 1.592 | 1.584 | 1.593 |
| | $n_o$ | 1.485 | 1.485 | 1.485 | 1.484 | 1.485 | 1.483 | 1.485 |
| | $\Delta n$ | 0.105 | 0.105 | 0.108 | 0.105 | 0.107 | 0.101 | 0.108 |
| | $\varepsilon_{\parallel}$ | 3.52 | 3.52 | 3.47 | 3.56 | 3.53 | 3.56 | 3.41 |
| | $\varepsilon_{\perp}$ | 6.23 | 6.21 | 6.26 | 6.40 | 6.28 | 6.34 | 6.19 |
| | $\Delta\varepsilon$ | −2.71 | −2.69 | −2.79 | −2.84 | −2.75 | −2.78 | −2.78 |
| | $\eta$/mPa·s | 19.2 | 19.3 | 22.6 | 19.7 | 19.3 | 20.5 | 22.2 |
| | $\gamma_1$/mPa·s | 146 | 145 | 157 | 145 | 144 | 147 | 159 |
| | $\gamma_1/\Delta n^2$ | 13.2 | 13.2 | 13.5 | 13.2 | 12.6 | 14.4 | 13.6 |
| | $\gamma_1/\Delta n^2/|\Delta\varepsilon|$ | 4.89 | 4.89 | 4.82 | 4.63 | 4.57 | 5.18 | 4.90 |
| | VHR (%) | 89 | 90 | 90 | 88 | 88 | 91 | 89 |
| | VHR after heat test (%) | 87 | 87 | 88 | 85 | 85 | 89 | 85 |
| | Ghosting (time) | 550 | 640 | 576 | 530 | 530 | 620 | 504 |
| | Dropping marks | 5 | 5 | 4 | 4 | 4 | 5 | 4 |
| | Process compatibility (100 times) | 855 | 856 | 790 | 770 | 750 | 1005 | 810 |
| | Low-temperature solubility (time) | 630 | 660 | 528 | 504 | 498 | 688 | 530 |
| | Volatility (sec) | 60 | 69 | 55 | 55 | 52 | 65 | 55 |

TABLE 3

| | Sample name | Example 14 | Example 15 | Example 16 | Example 17 | Example 18 | Comparative Example |
|---|---|---|---|---|---|---|---|
| Composition | 3-Cy-Cy-2 | 21 | 25 | 24 | 22 | 24 | 27 |
| | 3-Cy-Cy-4 | 11 | 11 | 10 | 12 | 11 | 7 |
| | 3-Cy-Ph-O1 | 7 | 7 | 7 | 7 | 6 | 9 |
| | 3-Cy-Ph5-O2 | 10 | 13 | 13 | 14 | 14 | 13 |
| | 2-Cy-Ph-Ph5-O2 | 6 | 5 | 5 | 6 | 8 | 5 |
| | 3-Cy-Ph-Ph5-O2 | 12 | 11 | 10 | 12 | 9 | 11 |
| | 3-Ph-Ph5-Ph-2 | 12 | 11 | 10 | 12 | 14 | 11 |
| | 3-Cy-Cy-Ph5-O$_3$ | 6 | 8 | 8 | 7 | | |
| | 4-Cy-Cy-Ph5-O2 | 2 | 9 | 13 | 8 | 7 | 7 |
| | 3-Cy-Cy-Ph5-O5 | | | | | | |
| | 3-Cy-Cy-Ph5-O4 | | | | | | |
| | 3-Cy-Cy-Ph5-O2 | | | | | | |
| | 4-Cy-Cy-Ph5-O4 | | | | | | |

TABLE 3-continued

| | Sample name | Example 14 | Example 15 | Example 16 | Example 17 | Example 18 | Comparative Example |
|---|---|---|---|---|---|---|---|
| | 5-Cy-Cy-Ph5-O2 | | | | | | 10 |
| | 5-Cy-Cy-Ph5-O5 | | | | | | |
| | 2-Cy-Cy-Ph5-O2 | | | | | | |
| | 1-Cy-Cy-Ph5-O1 | | | | | | |
| | 4-Cy-Cy-Ph5-O5 | | | | | 7 | |
| | 1-Cy-Cy-Ph5-O2 | 6 | | | | | |
| | 2-Cy-Cy-Ph5-O3 | 7 | | | | | |
| | Polymerizable monomer, formula (8.22) | | 0.15 | 0.25 | 0.2 | 0.3 | |
| Evaluation | $T_{NI}/°$ C. | 82.7 | 78.3 | 81.3 | 78.9 | 78.4 | 77.7 |
| | $n_e$ | 1.593 | 1.585 | 1.584 | 1.591 | 1.592 | 1.586 |
| | $n_o$ | 1.485 | 1.484 | 1.483 | 1.485 | 1.485 | 1.484 |
| | $\Delta n$ | 0.108 | 0.101 | 0.101 | 0.106 | 0.107 | 0.102 |
| | $\varepsilon_{\parallel}$ | 3.43 | 3.49 | 3.56 | 3.56 | 3.53 | 3.51 |
| | $\varepsilon_{\perp}$ | 6.22 | 6.08 | 6.34 | 6.31 | 6.28 | 6.04 |
| | $\Delta\varepsilon$ | -2.79 | -2.59 | -2.78 | -2.75 | -2.75 | -2.53 |
| | $\eta/mPa \cdot s$ | 22.3 | 18.8 | 20.5 | 19.9 | 19.3 | 18.5 |
| | $\gamma_1/mPa \cdot s$ | 161 | 137 | 147 | 144 | 144 | 139 |
| | $\gamma_1/\Delta n^2$ | 13.8 | 13.4 | 14.4 | 12.8 | 12.6 | 13.4 |
| | $\gamma_1/\Delta n^2/|\Delta\varepsilon|$ | 4.95 | 5.19 | 5.18 | 4.66 | 4.57 | 5.28 |
| | VHR (%) | 89 | 89 | 89 | 89 | 88 | 86 |
| | VHR after heat test (%) | 86 | 86 | 86 | 86 | 85 | 80 |
| | Ghosting (time) | 500 | 560 | 624 | 576 | 480 | 410 |
| | Dropping marks | 4 | 5 | 5 | 5 | 4 | 3 |
| | Process compatibility (100 times) | 790 | 1010 | 1000 | 985 | 750 | 540 |
| | Low-temperature solubility (time) | 580 | 660 | 675 | 615 | 486 | 156 |
| | Volatility (sec) | 65 | 65 | 65 | 65 | 55 | 30 |

Tables 1 to 3 confirm that low-temperature solubility is improved and volatility is decreased when compounds of general formula (1) (for example, 3-Cy-Cy-Ph5-O$_3$) and general formula (2) (for example, 3-Ph-Ph5-Ph-2) according to the present invention are contained.

The structures and combinations described in the embodiments above are merely exemplary and addition, omission, substitution, and other modifications to the structures are possible without departing from the essence of the present invention. The embodiments do not limit the scope of the present invention and the present invention is limited only by the claims.

INDUSTRIAL APPLICABILITY

A liquid crystal composition according to the present invention is widely applicable to fields of liquid crystal display devices and liquid crystal displays.

REFERENCE SIGNS LIST

1 second polarizing plate
2 second substrate
3 thin film transistor layer or electrode layer including thin film transistors
4 alignment film
5 liquid crystal layer
6 pixel electrode (common electrode)
7 color filter
8 first substrate
9 first polarizing plate
10 liquid crystal display device
11 gate electrode
12 anodic oxide coating
13 gate insulating layer
14 transparent electrode (layer)
15 drain electrode
16 ohmic contact layer
17 semiconductor layer
18 protective film
19a, 19b source electrode
21 pixel electrode
22 storage capacitor
23 drain electrode
24 data line
25 gate line
26 source electrode
27 gate electrode
101 protective layer

The invention claimed is:
1. A liquid crystal composition comprising:
at least two compounds selected from the group consisting of compounds represented by general formula (1):

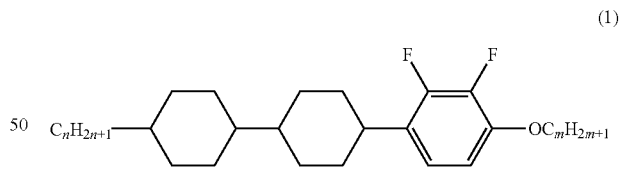

(1)

In general formula (1), n is an integer greater than 1 and less than 6, m is an integer greater than 1 and less than 6, and n is less than or equal to m;
at least one compound selected from the group consisting of compounds represented by general formula (2):

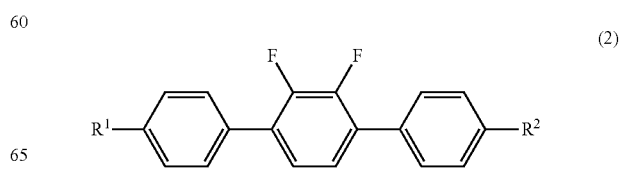

(2)

In general formula (2), $R^1$ and $R^2$ each independently represent an alkyl group having 1 to 15 carbon atoms;

at least one compound selected from the group consisting of compounds represented by general formula (3):

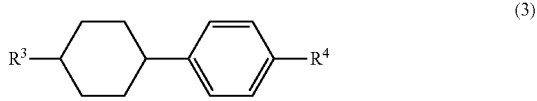
(3)

In general formula (3), $R^3$ and $R^4$ each independently represent a group selected from the group consisting an alkyl group having 1 to 15 carbon atoms, an alkenyl group having 2 to 15 carbon atoms, and an alkoxy group having 1 to 15 carbon atoms;

at least one compound selected from the group consisting of compounds represented by general formula (VI-a-1):

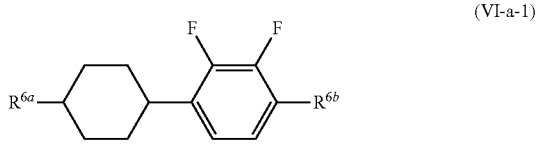
(VI-a-1)

In general formula (VI-a-1), $R^{6a}$ and $R^{6b}$ each independently represent an alkyl group having 1 to 5 carbon atoms, an alkenyl group having 2 to 5 carbon atoms, an alkoxy group having 1 to 8 carbon atoms, or an alkenyloxy group having 2 to 8 carbon atoms; and a compound represented by general formula (5.1) below:

(5.1)

wherein 5 to 35% by mass of a compound represented by general formula (1) is contained.

2. The composition according to claim 1, further comprising:

at least one compound selected from the group consisting of compounds represented by general formula (4):

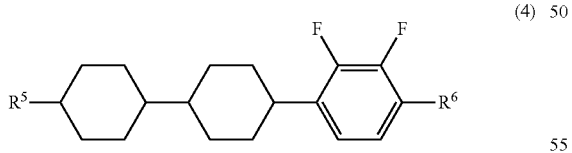
(4)

in general formula (4), $R^5$ and $R^6$ each independently represent one selected from the group consisting of an alkyl group having 1 to 15 carbon atoms, an alkenyl group having 2 to 15 carbon atoms, and an alkoxy group having 1 to 15 carbon atoms; however, the compounds represented by general formula (1) are excluded from the compounds represented by general formula (4).

3. The composition according to claim 1, wherein $R^3$ represents an alkyl group having 1 to 15 carbon atoms and $R^4$ represents an alkoxy group having 1 to 15 carbon atoms.

4. The liquid crystal composition according to claim 1, further comprising:

at least one compound selected from the group of compounds represented by general formula (5):

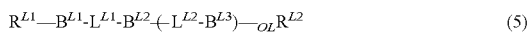
(5)

In general formula (5), $R^{L1}$ and $R^{L2}$ each independently represent an alkyl group having 1 to 8 carbon atoms, one —$CH_2$— or two or more nonadjacent —$CH_2$— in the alkyl group may each independently be substituted with —CH=CH—, —O—, —CO—, —COO—, or —OCO—, OL represents 0, 1, 2, or 3, $B^{L1}$, $B^{L2}$, and $B^{L3}$ each independently represent a group selected from the group consisting of (a) and (b) below:

(a) a 1,4-cyclohexylene group one —$CH_2$— or two or more nonadjacent —$CH_2$— present in this group may be substituted with —O—

(b) a 1,4-phenylene group one —CH= or two or more nonadjacent —CH= present in this group may be substituted with —N=, hydrogen atoms in the groups (a) and (b) above may each independently be substituted with a cyano group, a chlorine atom, or a fluorine atom, $L_{L1}$ and $L_{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and when OL is 2 or 3 and two or more $L^{L2}$ are present, they may be the same or different and when OL is 2 or 3 and two or more $B^{L3}$ are present, they may be the same or different provided that compounds represented by general formula (1), compounds represented by general formula (2), compounds represented by general formula (3), compounds represented by general formula (VI-a-1), and compounds represented by general formula (5.1) are excluded from the compounds represented by general formula (5).

5. The liquid crystal composition according to claim 1, further comprising:

at least one compound selected from the group consisting of compounds represented by general formula (6):

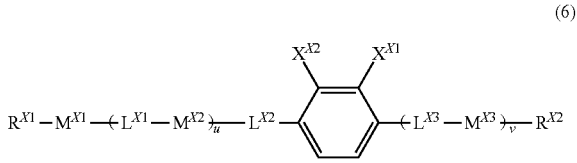
(6)

In general formula (6), $R^{X1}$ and $R^{X2}$ each independently represent an alkyl group having 1 to 10 carbon atoms, an alkoxy group having 1 to 10 carbon atoms, or an alkenyl group having 2 to 10 carbon atoms, one methylene group or two or more nonadjacent methylene groups present in these groups may each be substituted with —O— or —S—, and one or more hydrogen atoms present in these groups may each be substituted with a chlorine atom and/or a fluorine atom;

u and v each independently represent 0, 1, or 2 where u+v is 2 or less;

$M^{X1}$, $M^{X2}$ and $M^{X3}$ each independently represent one selected from the group consisting of (a) and (b) below:

(a) a trans-1,4-cyclohexylene group one methylene group or two or more nonadjacent methylene groups present in this group may be substituted with —O— or —S—

(b) a 1,4-phenylene group one —CH= or two or more nonadjacent —CH= present in this group may be substituted with —N=;

hydrogen atoms contained in the group (a) or (b) may each be substituted with a group selected from the group consisting of a cyano group, a fluorine atom, a trifluoromethyl group, and a trifluoromethoxy group, and when two or more $M^{X2}$ and/or $M^{X3}$ are present, they may be the same or different;

$L^{X1}$, $L^{X2}$, and $L^{X3}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —CH=CH—, or —C≡C—, and when two or more $L^{X1}$ and/or $L^{X3}$ are present, they may be the same or different, $X^{X1}$ and $X^{X2}$ each independently represent a trifluoromethyl group, a trifluoromethoxy group, or a fluorine atom and one of $X_{31}$ and $X_{32}$ represents a fluorine atom; however, compounds represented by general formula (1) compounds represented by general formula (2), compounds represented by general formula (3), compounds represented by general formula (VI-a-1), and compounds represented by general formula (5.1) are excluded from the compounds represented by general formula (6).

6. The liquid crystal composition according to claim 1, further comprising a polymerizable monomer.

7. A liquid crystal display device that uses the liquid crystal composition according to claim 1.

8. A liquid crystal display comprising the liquid crystal display device according to claim 7.

9. A liquid crystal display device that uses the liquid crystal composition according to claim 3.

* * * * *